US012238507B2

(12) United States Patent
Lyren et al.

(10) Patent No.: US 12,238,507 B2
(45) **Date of Patent: *Feb. 25, 2025**

(54) ASSIGNING ROOM IMPULSE RESPONSES (RIRs) TO ZONES AROUND A USER

(71) Applicants: Philip Scott Lyren, Rincon, PR (US); Glen A. Norris, Lakewood, OH (US)

(72) Inventors: Philip Scott Lyren, Rincon, PR (US); Glen A. Norris, Lakewood, OH (US)

( * ) Notice: Subject to any disclaimer, the term of this patent is extended or adjusted under 35 U.S.C. 154(b) by 170 days.

This patent is subject to a terminal disclaimer.

(21) Appl. No.: 17/988,808

(22) Filed: Nov. 17, 2022

(65) Prior Publication Data

US 2023/0072131 A1 Mar. 9, 2023

Related U.S. Application Data

(63) Continuation of application No. 17/169,481, filed on Feb. 7, 2021, now Pat. No. 11,510,022, which is a continuation of application No. 16/558,088, filed on Aug. 31, 2019, now Pat. No. 10,917,737, which is a continuation of application No. 16/401,251, filed on May 2, 2019, now Pat. No. 10,750,308, which is a continuation of application No. 15/635,166, filed on Jun. 27, 2017, now Pat. No. 10,587,981, which is a continuation of application No. 15/429,131, filed on Feb. 9, 2017, now Pat. No. 9,699,583, which is a continuation of application No. 15/365,880, filed on Nov. 30, 2016, now Pat. No. 9,800,990.

(60) Provisional application No. 62/348,164, filed on Jun. 10, 2016.

(51) Int. Cl.
*H04S 7/00* (2006.01)
*H04R 5/033* (2006.01)
*H04S 3/00* (2006.01)

(52) U.S. Cl.
CPC ............ *H04S 7/304* (2013.01); *H04R 5/033* (2013.01); *H04S 3/008* (2013.01); *H04S 7/303* (2013.01); *H04S 2400/01* (2013.01); *H04S 2400/11* (2013.01); *H04S 2420/01* (2013.01)

(58) Field of Classification Search
CPC .......... H04S 7/304; H04S 3/008; H04S 7/303; H04S 2400/01; H04S 2400/11; H04S 2420/01; H04R 5/033
See application file for complete search history.

(56) References Cited

U.S. PATENT DOCUMENTS

| | | | | |
|---|---|---|---|---|
| 5,715,317 A * | 2/1998 | Nakazawa | H04S 1/007 | 381/17 |
| 2012/0002024 A1* | 1/2012 | Choi | H04N 13/30 | 348/54 |
| 2013/0163765 A1* | 6/2013 | De Jong | H04S 7/304 | 381/17 |
| 2014/0064526 A1* | 3/2014 | Otto | H04R 5/04 | 381/300 |
| 2016/0227338 A1* | 8/2016 | Oh | H04S 3/008 | |

* cited by examiner

*Primary Examiner* — Akelaw Teshale

(57) ABSTRACT

A wearable electronic device (WED) includes a display that displays a virtual image on a physical object located in an area around a user and speakers that play sound as binaural sound that originates from the virtual image. One or more processors scan the area around the user to locate the physical object, divide the area around the user into different zones, assign room impulse responses (RIRs) to the zones, and process the sound with the RIRs.

20 Claims, 18 Drawing Sheets

Assign different SLPs and/or different zones to different sources of sound and/or to different types of sound.
300

↓

Store in memory the assignments of the different SLPs and/or the different zones to the different sources of sound and/or the different types of sound.
310

500A

| Sound Source | Sound Type | ID | SLP and/or Zone | Transfer Function or Impulse Response | Date | Duration |
|---|---|---|---|---|---|---|
| Telephone Call | Speech | Bob (human) | SLP2 | HRIR | 01/01/16 | 53 sec |
| Internet | Speech and Music | Ad | SLP64 | Internal (Mono) | 01/01/16 | 30 sec |
| Smartphone Program | Speech | Hal (IPA) | SLP1 | HRTF | 01/01/16 | 38 sec |
| Cloud Memory (Movies Folder) | Speech, Music, Sound Effects | E.T. | SLP50-SLP58 | HRTFs | 01/02/16 | 2 hours 4 min |
| Satellite Radio | Speech | Howard Stern | SLP16-SLP20 | HRTFs | 01/02/16 | 22 min |

Figure 5A

500B

| Sound Source | Sound Type | SLP and/or Zone |
|---|---|---|
| Tel: +852 6343 0155 | Speech and Non-Speech | SLP1: (1.0 m, 10°, 10°) |
| VR Game (Battle for Mars) | Speech and Music | Speech: Zone 17<br>Music: SLP3 – SLP5 |
| Charlie (telephone call) | Speech and Non-Speech | SLP6: Internal |
| Teleconference (Multi-Party) | Speech and Non-Speech | Speaker1: SLP20<br>Speaker2: SLP21<br>Speaker3: SLP22<br>Speaker4: SLP23 |
| Media Player | All | Zones 7 - 9 |

Figure 5B

500C

| **Sound Source (Miscellaneous)** | **Sound Type** | **SLP and/or Zone** |
|---|---|---|
| BBC Archives | Speech and Non-Speech | Speech: SLP30 - SLP35<br>Music: SLP40<br>Other: Internal |
| YouTube | Music Videos | Zones 6 - 19 |
| Advertisements | Speech and Non-Speech | Zone 22: Internal<br>(Block external localization) |
| Appliances | Speech and Non-Speech | Speech: SLP50<br>Non-Speech: SLP51 (warnings/alerts)<br>Non-Speech: Internal (Other) |
| Intelligent Personal Assistant (Hal) | Speech | SLP60 |
| Stones.mp3 | Music | SLP99 |
| Website (Apple.com) | All | Zone91 |

Figure 5C

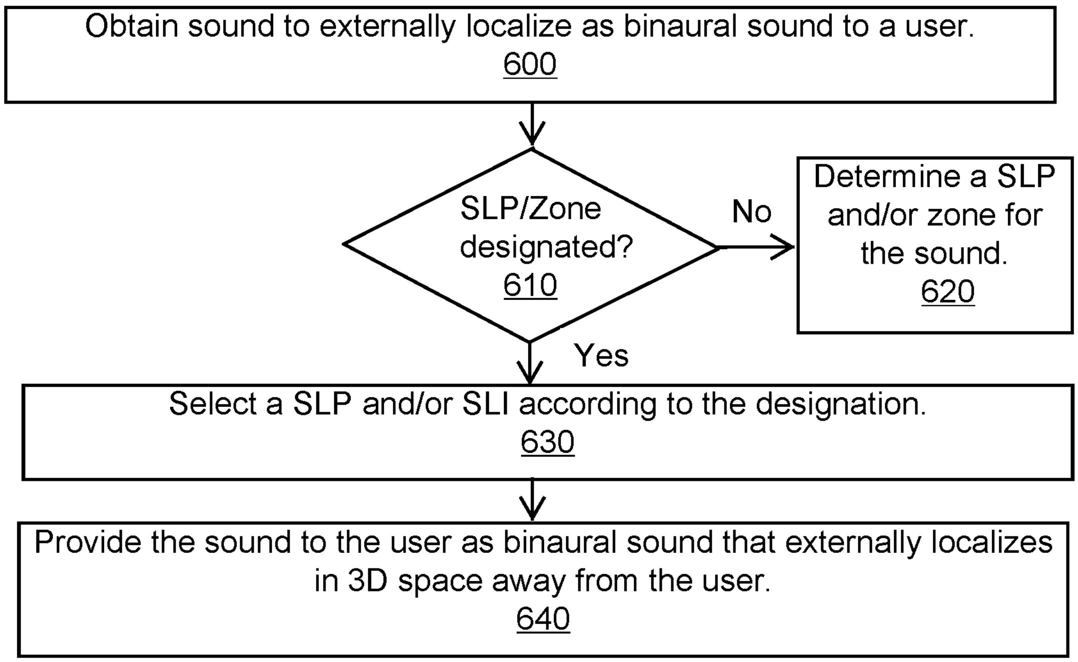

Figure 6

ASSIGNING ROOM IMPULSE RESPONSES (RIRs) TO ZONES AROUND A USER

BACKGROUND

Three-dimensional (3D) sound localization offers people a wealth of new technological avenues to not merely communicate with each other but also to communicate more efficiently with electronic devices, software programs, and processes.

As this technology develops, challenges will arise with regard to how sound localization integrates into the modern era. Example embodiments offer solutions to some of these challenges and assist in providing technological advancements in methods and apparatus using 3D sound localization.

SUMMARY

One example embodiment is a method that selects a location where binaural sound localizes to a listener. Sounds are assigned to different zones or different sound localization points (SLPs) and are convolved so the sounds localize as binaural sound into the assigned zone or to the assigned SLP.

Other example embodiments are discussed herein.

BRIEF DESCRIPTION OF THE DRAWINGS

FIG. 5A shows a table of example historical audio information that can be stored for a user in accordance with an example embodiment.

FIG. 5B shows a table of example SLP and/or zone designations or assignments of a user for localizing different sound sources in accordance with an example embodiment.

FIG. 5C shows a table of example SLP and/or zone designations or assignments of a user for localizing miscellaneous sound sources in accordance with an example embodiment.

FIG. 6 is a method to select a SLP and/or zone for where to localize sound to a user in accordance with an example embodiment.

DETAILED DESCRIPTION

Example embodiments include method and apparatus that provide binaural sound to a listener.

Example embodiments include methods and apparatus that improve performance of a computer, electronic device, or computer system that executes, processes, convolves, transmits, and/or stores binaural sound that externally localizes to a listener. These example embodiments also solve a myriad of technical problems and challenges that exist with executing, processing, convolving, transmitting, and storing binaural sound.

Figure 1:
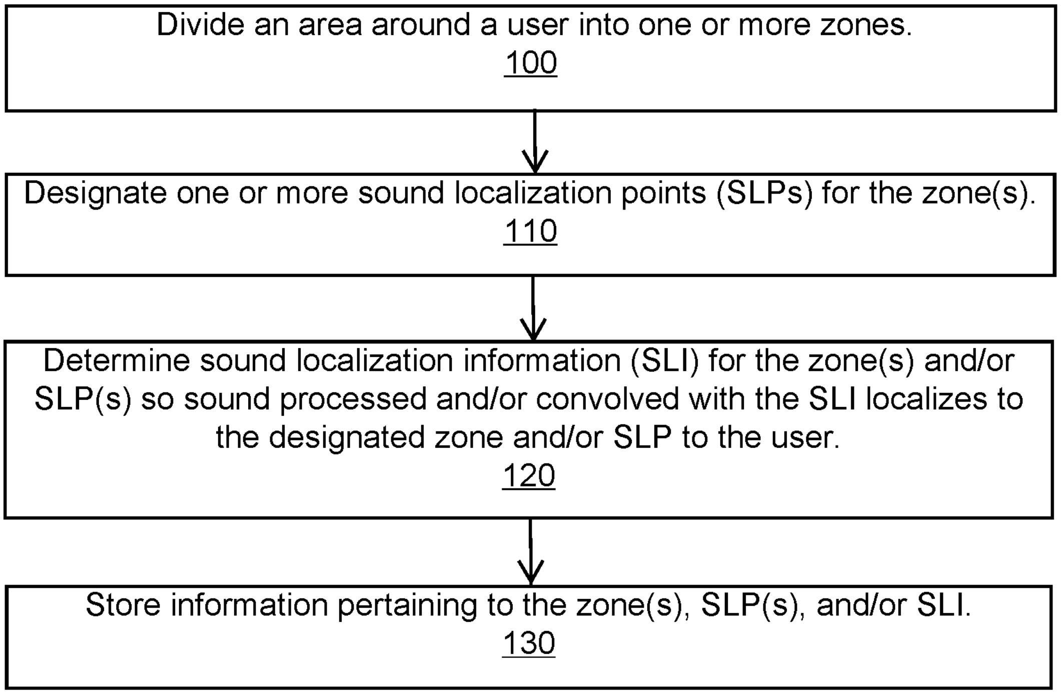
FIG. 1 is a method to divide an area around a user into zones in accordance with an example embodiment.

FIG. 1 is a method to divide an area around a user into zones in accordance with an example embodiment.

Block 100 states divide an area around a user into one or more zones.

The area or space around the user is divided, partitioned, separated, mapped, or segmented into one or more three-dimensional (3D) zones, two-dimensional (2D) zones, and/or one-dimensional (1D) zones defined in 3D space with respect to the user.

These zones can partially or fully extend around or with respect to the user. For example, one or more zones extend fully around all sides of a head and/or body of the user. As another example, one or more zones exist within a field-of-view of the user. As another example, an area above the head of the user includes a zone.

Consider an example in which a head of a listener is centered or at an origin in polar coordinates, spherical coordinates, 3D Cartesian coordinates, or another coordinate system. A 3D space or area around the head is further divided, partitioned, mapped, separated, or segmented into multiple zones or areas that are defined according to coordinates in the coordinate system.

The zones can have distinct boundaries, such as volumes, planes, lines, or points defined with coordinates, functions or equations (e.g., defined per a function of a straight line, a curved line, a plane, or other geometric shape). For example, X-Y-Z coordinates or spherical coordinates define a boundary or perimeter of a zone or define one or more sides or edges or starting and/or ending locations.

Zones are not limited to having a distinct boundary. For example, zones have general boundaries. For instance, a 3D volume around a head of a listener is separated into one or more of a front area (e.g., an area in front of the face of the listener), a top area (e.g., a region above the head of the listener), a left side area (e.g., a section to a left of the listener), a right side area (e.g., a volume to a right of the listener), a back area (e.g., a space behind a head of the listener), a bottom area (e.g., an area below a waist of the listener), an internal area (e.g., an area inside the head or between the ears of a listener).

A zone can encompass a unique or distinct area, such as each zone being separate from other zones with no overlapping area or intersection. Alternatively, one or more zones can share one or more points, line segments, areas or surfaces with another zone, such as one zone sharing a boundary along a line or plane with another zone. Further, zones can have overlapping or intersecting points, lines, 2D and/or 3D areas or regions, such as a zone located in front of a face of a listener overlapping with a zone located to a right side of a head of the listener.

Zones can have a variety of different shapes. These shapes include, but are not limited to, a sphere, a hemisphere, a cylinder, a cone (including frustoconical shapes), a box or a cube, a circle, a square or rectangle, a triangle, a point or location in space, a prism, curved lines, straight lines or line segments, planes, planar sections, polygons, irregular 2D or 3D shapes, and other 1D, 2D and 3D shapes.

Zones can have similar, same, or different shapes and sizes. For example, a user has a dome-shaped zone or hem i-spherical shaped zone above a head, a first pie-shaped zone on a left side, a second pie-shaped zone on a right side, and a partial 3D cylindrically-shaped zone behind the head.

Zones can have a variety of different sizes. For example, zones include near-field audio space (e.g., 1.0 meter or less from the listener) and/or far-field audio space (e.g., 1.0 meter or more away from the listener). A zone can extend or exist within a definitive distance around a user. For instance, the zone extends from 1.0 meter to 2.0 meters away from a head or body of a listener. Alternatively, a zone can extend or exist within an approximate distance. For instance, the zone extends from about 1.0 meter (e.g., 0.9 m-1.1 m) to about 3.0 meters (e.g., 2.7 m-3.3 m) away from a head of a listener. Further, a zone can extend or exist within an uncertain or variable distance. For instance, a zone extends from approximately 3 feet from a head of a listener to a farthest distance that the particular listener can localize a sound, with such distance differing from one listener to another listener.

Zones can vary in number, such as having one zone, two zones, three zones, four zones, five zones, six zones, etc. Further, a number of zones can differ from one user to another user (e.g., a first user has three zones, and a second user has five zones).

The shape, size, and/or number of zones can be fixed or variable. For example, a listener has a front zone, a left zone, a right zone, a top zone, and a rear zone; and these zones are fixed or permanent in one or more of their size, shape, and number. As another example, a listener has a top zone, a left zone, and a right zone; and these zones are changeable or variable in one or more of their size, shape, and number.

The shape, size, and/or number of zones can be customized or unique to a particular user such that two users have a different shape, size, and/or number of zones. The definition of the customized zones and other information can be stored and retrieved (e.g., stored as user preferences).

Block 110 states designate one or more sound localization points (SLPs) for the zone(s).

As one example, one or more SLPs define the boundaries or area of a zone. Here, the locations of the SLPs define the zone, the endpoints of a zone, the perimeter of the zone, the boundary of the zone, the vertices of a zone, or represent a zone defined by a function that fits the locations (e.g., a zone defined by a function for a smooth curving plane in which the locations are included in the range). For example, three SLPs form an arc that partially extends around a head of a listener. This arc is a zone. As another example, four SLPs are on a parabolic surface that partially extends around a head of a listener. This surface is a zone, and the SLPs are included in the range of the function that defines this zone. As another example, the four SLPs are on the surface of an irregular volume zone that is partially defined by the SLPs. As another example, the locations represent a zone defined by the space that is included within one foot of each SLP.

As another example, a perimeter or boundary of a 2D or 3D area defines a zone, and SLPs located in, on, or near this area are designated for the zone. For example, a zone is defined as being a cube whose sides are 0.3 m in length and whose center is located 1.5 meters from a face of a user. SLPs located on a surface or within a volume of this cube are designated for the zone.

A SLP and likewise a zone can be defined with respect to the location and orientation of the head or body of the listener, or the physical or virtual environment of the listener. For example, the location of the SLP is defined by a general position relative to the listener (e.g., left of the head, in front of the face, behind the ears, above the head, right of the chest, below the waist, etc.), or a position with respect to the environment of the listener (e.g., at the nearest exit, at the nearest person, above the device, at the north wall, at the crosswalk). This information can also be more specific with X-Y-Z coordinates, spherical coordinates, polar coordinates, compass direction, distance direction, etc.

Consider an example in which each SLP has a spherical or Cartesian coordinate location with respect to a head orientation of a user (e.g., with an origin at a point midway between the ears of a listener), and each zone is defined with coordinate locations or other boundary information (e.g., a geometric formula or algebraic function) with respect to the head of the user.

Consider an example in which a zone is defined relative to a listener without regard to existing SLPs. By way of example, zone A is defined with respect to a head of the listener in which the listener is at an origin. Zone A includes the area between 1.0 m-2.0 m from the head of the listener with azimuth coordinates between 0°-45° and with elevation coordinates between 0°-30°. SLPs having coordinates within this defined area are located in Zone A.

Zones can also be defined by the location of SLPs. For example, Zone A is defined by a series or set of SLPs that are along a line segment that is defined in an X-Y-Z coordinate system. The SLPs along or near this line segment are designated as being in Zone A. As another example, Zone B is defined by a series or set of SLPs that localize sound from a particular sound source (e.g., a telephony application) or that localize sound of a particular type (e.g., voices).

Consider an example in which a zone and corresponding SLPs are defined according to a geometric equation or geometric 2D or 3D shape. For example, a zone is a hemisphere having a radius (r) with a head of a user located at a center of this hemisphere. SLPs within Zone A are defined as being in a portion of the hemisphere with 0 m≤r≤1.0 m; and SLPs within Zone B are defined as being in another portion of the hemisphere with 1.0 m≤r≤2.0 m.

In an example embodiment, a zone can be or include one or more SLPs. For example, a top zone located above a head of a listener is defined by or located at a single SLP with spherical coordinates (1.0 m, 0°, 90°). As another example, two or more SLPs each within one foot of each other define a zone. As another example, a group of SLPs between the azimuth angles of 0° and 45° define a zone. These examples are provided to illustrate a few of the many different ways SLPs and zones can be arranged.

A zone can have a distinct or a definitive number of SLPs (e.g., one SLP, two SLPs, three SLPs, . . . ten SLPs, . . . fifty SLPs, etc.). This number can be fixed or variable. For example, a number of SLPs in a zone vary over time, vary based on a physical or virtual location of the listener, vary based on which type of sound is localizing to the zone (e.g., voice or music or alert), vary based on which software application is requesting sound to localize, etc.

A zone can have no SLPs. For example, some zones represent areas or locations where sound should not be externally localized to a listener. For instance, such areas or locations include, but are not limited to, directly behind a head of a person, in an area known as a cone of confusion of a person, beneath or below a person, or other locations deemed inappropriate or undesirable for external localization of binaural sound, or a particular sound, sound type, or sound source, for a particular time of day, or geographic or virtual location, or for a particular listener. Further, areas where binaural sound is designated not to localize may be temporary or change based on one or more factors. For example, binaural sound does not localize to a zone or area behind a head of a person when a wall or other physical obstruction exists in this area.

A zone can have SLPs but one or more of these SLPs are inactive or not usable. For example, zone A has twenty SLPs, but only three of these SLPs are available for locations to localize sound from a particular software application that provides a voice to a user. The other seventeen SLPs are available for locations to localize music from a music library of the user or available to localize other types of sound or sound from other software applications or sound sources.

Block 120 states determine sound localization information (SLI) for the zone(s) and/or SLP(s) so sound processed and/or convolved with the SLI localizes to the designated zone and/or SLP to the user.

Sound localization information (SLI) is information that is used to process or convolve sound so the sound externally localizes as binaural sound to a listener. Sound localization information includes all or part of the information necessary to describe and/or render the localization of a sound to a listener. For example, SLI is in the form of a file with partial localization information, such as a direction of localization from a listener, but without a distance. An example SLI file includes convolved sound. Another example SLI file includes the information necessary to convolve the sound or in order to otherwise achieve a particular localization. As another example, a SLI file includes complete information as a single file to provide a computer program (such as a media player or a process executing on an electronic device) with data and/or instructions to localize a particular sound along a complex path around a particular listener.

Consider an example of a media player application that parses various SLI components from a single sound file that includes the SLI incorporated into the header of the sound file. The single file is played multiple times, and/or from different devices, or streamed. Each time the SLI is played to the listener, the listener perceives a matching localization experience. An example SLI or SLI file is altered or edited to adjust one or more properties of the localization in order to produce an adjusted localization (e.g., changing one or more SLP coordinates in the SLI, changing an included HRTF to a HRTF of a different listener, or changing the sound that is designated for localized).

The SLI can be specific to a sound, such as a sound that is packaged together with the SLI, or the SLI can be applied to more than one sound, any sound, or without respect to a sound (e.g., an SLI that describes or provides an RIR assignment to the sound). SLI can be included as part of a sound file (e.g., a file header), packaged together with sound data such as the sound data associated with the SLI, or the SLI can stand alone such as including a reference to a sound resource (e.g., link, uniform resource locator or URL, filename), or without reference to a sound. The SLI can be specific to a listener, such as including HRTFs measured for a specific listener, or the SLI can be applied to the localization of sound to multiple listeners, any listener, or without respect to a listener. Sound localization information can be individualized, personal, or unique to a particular person (e.g., HRTFs obtained from microphones located in ears of a person). This information can also be generic or general (e.g., stock or generic HRTFs, or ITDs that are applicable to several different people). Furthermore, sound localization information (including preparing the SLI as a file or stream that includes both the SLI and sound data) can be modeled or computer-generated.

Information that is part of the SLI can include but is not limited to, one or more of localization information, impulse responses, measurements, sound data, reference coordinates, instructions for playing sound (e.g., rate, tempo, volume, etc.), and other information discussed herein. For example, localization information provides information to localize the sound during the duration or time when the sound plays to the listener. For instance, the SLI specifies a single SLP or zone at which to localize the sound. As another example, the SLI includes a non-looping localization designation (e.g., a time-based SLP trajectory in the form of a set of SLPs, points or equation(s) that define or describes a trajectory for the sound) equal to the duration of the sound. For example, impulse responses include, but are not limited to, impulse responses that are included in convolution of the sound (e.g., head related impulse responses (HRIRs), binaural room impulse responses (BRIRs)) and transfer functions to create binaural audial cues for localization (e.g., head related transfer functions (HRTFs), binaural room transfer functions (BRTFs)). Measurements include data and/or instructions that provide or instruct distance, angular, and other audial cues for localization (e.g., tables or functions for creating or adjusting a decay, volume, interaural time 10 difference (ITD), interaural level difference (ILD) or interaural intensity difference (IID)). Sound data includes the sound to localize, particular impulse responses or particular other sounds such as captured sound. Reference coordinates include information such as reference volumes or intensities, localization references (such as a frame of reference for the specified localization (e.g., a listener's head, shoulders, waist, or another object or position away from the listener) and a designation of the origin in the frame of reference (e.g., the center of the head of the listener) and other references.

Sound localization information can be obtained from a storage location or memory, an electronic device (e.g., a server or portable electronic device), a software application (e.g., a software application transmitting or generating the sound to externally localize), sound captured at a user, a file, or another location. This information can also be captured and/or generated in real-time (e.g., while the listener listens to the binaural sound).

Block 130 states store information pertaining to the zone(s), SLP(s), and/or SLI.

The information discussed in connection with blocks 100, 110, and 120 is stored in memory (e.g., a portable electronic device (PED) or a server), transmitted (e.g., wirelessly transmitted over a network from one electronic device to another electronic device), and/or processed (e.g., executed in an example embodiment with one or more processors).

Figure 2:
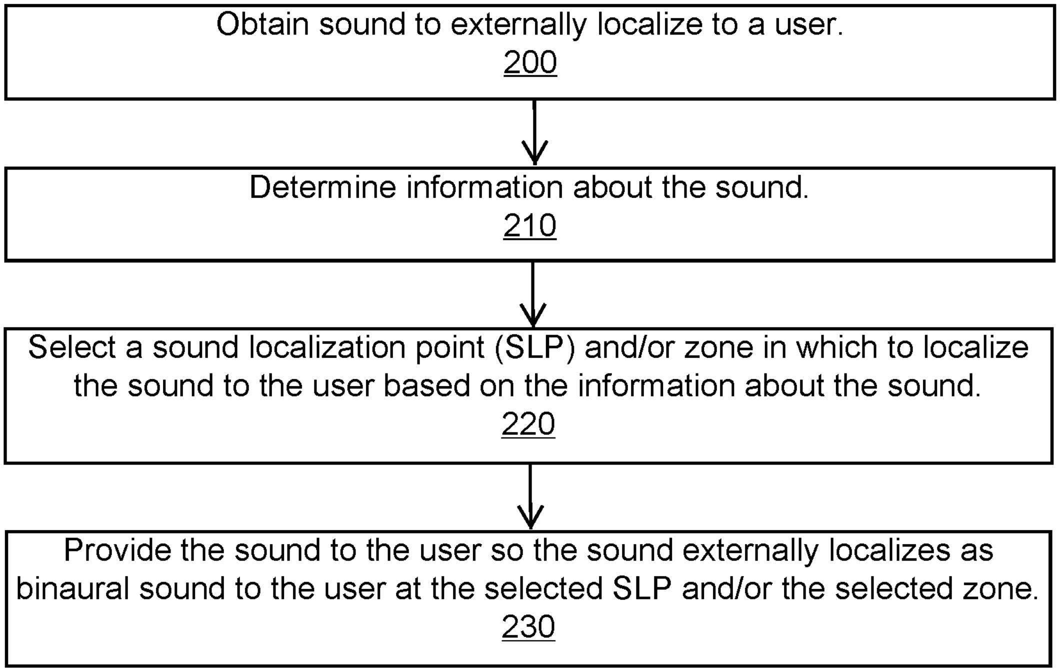
FIG. 2 is a method to select where to externally localize binaural sound to a listener based on information about the sound in accordance with an example embodiment.

FIG. 2 is a method to select where to externally localize binaural sound to a listener based on information about the sound in accordance with an example embodiment.

Block 200 states obtain sound to externally localize to a user.

By way of example, the sound is obtained as being retrieved from storage or memory, transmitted and received over a wired or wireless connection, generated from a locally executing or remotely executing software application, or obtained from another source or location. As one example, a user clicks or activates a music file or link to music to play a song that is the sound to externally localize to the user. As another example, a user engages in a verbal exchange with a bot, intelligent user agent (IUA), intelligent personal assistant (IPA), or other software program via a natural language user interface; and the voice of this software application is the sound obtained to externally localize to the user. Other examples of obtaining this sound include, but are not limited to, receiving sound as a voice in a telephone call (e.g., a Voice over Internet Protocol (VoIP) call), receiving sound from a home appliance (e.g., a wireless warning or alert), generating sound from a virtual reality (VR) game executing on a wearable electronic device (WED) such as a head mounted display or HMD, retrieving a voice message stored in memory, playing or streaming music from the internet, etc.

The sound is obtained to externally localize to the user as binaural sound such that one or more SLPs for the sound occur away from the user. For example, the SLP can occur at a location in 3D space that is proximate to the user, near-field to the user, far-field to the user, in empty space with respect to the user, at a virtual object in a software game, or at a physical object near the user.

In an example embodiment, the sound that is obtained is mono sound (e.g., mono sound that is processed or convolved to binaural sound), stereo sound (e.g., stereo sound that is processed or convolved to binaural sound), or binaural sound (e.g., binaural sound that is further processed or convolved with room impulse responses or RIRs, and/or with altered audial cues for one or more segments or parts of the sound).

Block 210 states determine information about the sound.

Information about the sound includes, but is not limited, to one or more of the following: a type of the sound, a source of the sound, a software application from which the sound originates or generates, a purpose of the sound, a file type or extension of the sound, a designation or assignment of the sound (e.g., the sound is assigned to localize to a particular zone or SLP), user preferences about the sound, historical or previous SLPs or zones for the sound, commands or instructions on localization from a user or software application, a time of day or day of the week or month, an identification of a sender of the sound or properties of the sender (e.g., a relationship or social proximity to the user), an identification of a recipient of the sound, a telephone number or caller identification in a telephone call, a geographical location of an origin of the sound or a receiver of the sound, a virtual location where the sound will be heard or where the sound was generated, a file format of the audio, a classification or type or source of the audio (e.g., a telephone call, a radio transmission, a television show, a game, a movie, audio output from a software application, etc.), monophonic, stereo, or binaural, a filename, a storage location, a URL, a length or duration of the audio, a sampling rate, a bit resolution, a data rate, a compression scheme, an associated CODEC, a minimum, maximum, or average volume, amplitude, or loudness, a minimum, maximum, or average wavelength of the encoded sound, a date when the audio was recorded, updated, or last played, a GPS location of where the audio was recorded or captured, an owner of the audio, permissions attributed to the audio, a subject matter of the content of the audio, an identify of voices or sounds or speakers in the audio, music in the audio input, noise in the audio input, metadata about the audio, an IP address or International Mobile Subscriber Identity (IMSI) of the audio input, caller ID, an identity of the speech segment and/or non-speech segment (e.g., voice, music, noise, background noise, silence, computer-generated sounds, IPA, IUA, natural sounds, a talking bot, etc.), and other information discussed herein.

By way of example, a type of sound includes, but is not limited to, speech, non-speech, or a specific type of speech or non-speech, such as a human voice (e.g., a voice in a telephony communication), a computer voice or software generated voice (e.g., a voice from an IPA, a voice generated by a text-to-speech (TTS) process), animal sounds, music or a particular music, type or genre of music (e.g., rock, jazz, classical, etc.), silence, noise or background noise, an alert, a warning, etc.

Sound can be processed to determine a type of sound. For example, speech activity detection (SAD) analyzes audio input for speech and non-speech regions of audio input. SAD can be a preprocessing step in diarization or other speech technologies, such as speaker verification, speech recognition, voice recognition, speaker recognition, et al. Audio diarization can also segment, partition, or divide sound into non-speech audio and/or speech audio into segments.

In some example embodiments, sound processing is not required for sound type identification because the sound is already identified, and the identification is accessible in order to consider in determining a localization for the sound. For example, the type of sound can be passed in an argument with the audio input or passed in header information with the audio input or audio source. The type of sound can also be determined by referencing information associated with the audio input designated. A type of sound can also be determined from a source or software application (e.g., sound from an incoming telephone call is voice or sound in a VR game is identified as originating from a particular character in the VR game). An example embodiment identifies a sound type of a sound by determining a sound ID for the sound and retrieving the sound type of a localization instance in the localization log that has a matching sound ID.

By way of example, a source of sound includes, but is not limited to, a telephone call or telephony connection or communication, a music file or an audio file, a hyperlink, URL, or proprietary pointer to a network or cloud location or resource (e.g., a website or internet server that provides music files or sound streams, a link or access instructions to a source of decentralized data such as a torrent or other peer-to-peer (P2P) resource), an electronic device, a security system, a medical device, a home entertainment system, a public entertainment system, a navigational software application, the internet, a radio transmission, a television show, a movie, audio output from a software application (including a VR software game), a voice message, an intelligent personal assistant (IPA) or intelligent user agent (IUA), and other sources of sound.

Block 220 states select a sound localization point (SLP) and/or zone in which to localize the sound to the user based on the information about the sound.

The information about the sound indicates, provides, or assists in determining where to externally localize the binaural sound with respect to the user. Based on this information, the computer system, electronic system, software application, or electronic device determines where to localize the sound in space away from the user. This information also indicates, provides, or assists in determining what sound localization information (SLI) to select to process and/or convolve the sound so it localizes to the correct location and also includes the correct attributes, such as loudness, RIRs, sound effects, background noise, etc.

Consider an example in which an audio file or information about the sound includes or is transmitted with an identification, designation, preference, default, or one or more specifications or requirements for the SLP and/or the zone. For example, this information is included in the packet, header, or forms part of the metadata. For instance, the information indicates a location with respect to the listener, coordinates in a coordinate system, HRTFs, a SLP, or a zone for where the sound should or should not localize to the listener.

Consider an example embodiment in which a SLP and/or a zone is selected based on one or more of the following: information about sound stored in a memory (e.g., a table that includes an identification or location of a SLP and/or zone for each software application that externally localizes binaural sound), information in an audio file, information about sound stored in user preferences (e.g., preferences of the user that indicate where the user prefers to externally localize a type of sound or sound from a particular software application), a command or instruction from the user (e.g., the listener provides a verbal command that indicates the SLP), a recommendation or suggestion from another software program (e.g., an IUA or IPA of another user, who is not the listener, provides a recommendation based on where the other user selected to externally localize the sound), a collaborative decision (e.g., weighing recommendations for the SLP from multiple different users, including other listeners and/or software programs), historical placements (e.g., SLPs or zones where the user previously localized the same or similar sound, or previously localized sound from a same or similar software application), a type of sound, an identity of the sound (e.g., an identified sound file, piece of music, voice identity), and an identification of the software application generating the sound or playing the sound to the user.

Block 230 states provide the sound to the user so the sound externally localizes as binaural sound to the user at the selected SLP and/or the selected zone.

The sound is processed and/or convolved so it externally localizes away from the user at the selected SLP and/or selected zone, such as a SLP in 3D audio space away from a head of the user. In order for the user to hear the sound as originating or emanating from an external location, the sound transmits through or is provided through a wearable electronic device or a portable electronic device. For example, the user wears electronic earphones in his or her ears, wears headphones, or wears an electronic device with earphones or headphones, such as an optical head mounted display (OH MD) or HMD with headphones. A user can also listen to the binaural sound through two spaced-apart speakers that process the sound to generate a sweet-spot of cross-talk cancellation.

Consider an example in which information about the sound provides that the sound is a Voice over Internet Protocol (Vo IP) telephone call being received at a handheld portable electronic device (HPED), such as a smartphone. VoIP telephone calls are designated to one of SLP1, SLP2, SLP3, or SLP4. These SLPs are located in front of the face of the user about 1.0 meter away. The software application executing the VoIP calls selects SLP2 as the location for where to place the voice of the caller. The user is not surprised or startled when the voice of the caller externally localizes to the user since the user knows in advance that telephone calls localize directly in front of the face 1.0 meter away.

An example embodiment assigns unique sound identifications (sound IDs) to unique sounds in order to query the localization log to determine the sound type and/or sound source of a unique sound. Examples of unique sounds include but are not limited to the voice of a particular person or user (e.g., voices in a radio broadcast or a voice of a friend), the voice of an IPA, computer-generated voice, a TTS voice, voice samples, particular audio alerts (chimes, ringtones, warning sounds), particular sound effects, a particular piece of music. The example embodiment stores the sound IDs in the SLP table and/or localization log or database associated with the record of the localization instance. The localization record also includes the sound source or origins and sound type.

The example embodiment determines or obtains the unique sound identifier (sound ID) for a sound from or in the form of a voiceprint, voice-ID, voice recognition service, or other unique voice identifier such as one produced by a voice recognition system. The example embodiment also determines or obtains the sound ID for the sound from or in the form of an acoustic fingerprint, sound signature, sound sample, a hash of a sound file, spectrographic model or image, acoustic watermark, or audio based Automatic Content Recognition (ACR). The example embodiment queries the localization log for localization instances with a matching sound ID in order to identify or assist to identify a sound type or sound source of the sound, and/or in order to identify a prior zone designation for the sound. For example, the sound ID of an incoming voice from an unknown caller matches a sound ID associated with the contact labeled as "Jeff" in the user's contact database. The match is a sufficient indication that the identity of the caller is Jeff. The SLP selector looks up the zone selected in a previous conversation with Jeff, and assigns a SLP in the zone to the sound.

The example embodiment allows the user or software application executing on the computer system to assign sound IDs to zones in order to segregate sounds with a matching sound ID with respect to one or more zones. For example, sounds matching one sound ID are assigned to localize in one zone and sounds matching another sound ID are prohibited from another zone.

Figures 3, 4:
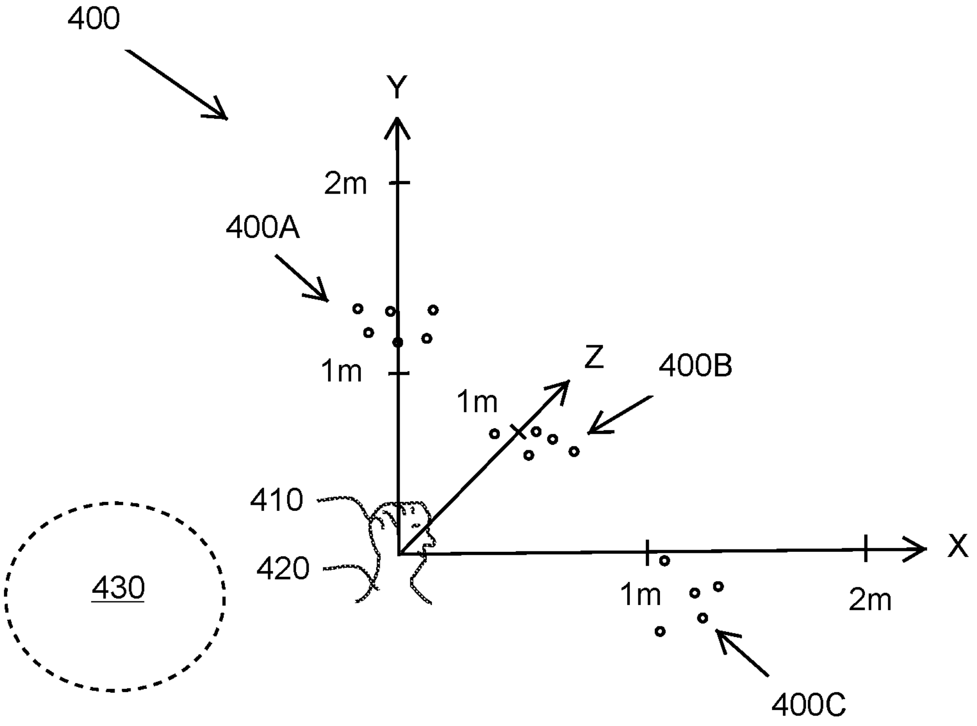
FIG. 3 is a method to store assignments of SLPs and/or zones in accordance with an example embodiment.
FIG. 4 shows a coordinate system with zones or groups of SLPs around a head of a user in accordance with an example embodiment.

FIG. 3 is a method to store assignments of SLPs and/or zones in accordance with an example embodiment.

Block 300 states assign different SLPs and/or different zones to different sources of sound and/or to different types of sound.

An example embodiment assigns or designates a single SLP, multiple SLPs, a single zone, or multiple zones for one or more different sources of sound and/or different types of sound. These designations are retrievable in order to determine where to externally localize subsequent sources of sound and/or types of sound.

For example, each source of sound that externally localizes as binaural sound and/or each type of sound that externally localizes as binaural sound are assigned or designated to one or more SLPs and/or zones. Alternatively, one or more SLPs and/or zones are assigned or designated to each source of sound that externally localizes as binaural sound and/or each type of sound that externally localizes as binaural sound.

Consider an example in which zone A includes five SLPs; zone B includes one SLP; and zone C includes thirty SLPs. Each zone is located between 1.0 m-1.3 m away from a head of the listener. Zones A, B, and C are audibly distinct from each other such that a listener can distinguish or identify from which zone sound originates. For instance, the listener can distinguish that sound originates from zone A as opposed to originating from zones B or C, and such a distinction can be made for zones B and C as well. Telephony software applications are assigned to zone A; a voice of an intelligent personal assistant (IPA) of the listener is assigned to zone B; and music and/or musical instruments are assigned to zone C. The listener can memorize or become familiar with these SLP and zone designations. As such, when a voice in a telephone call originates from the location around the head of the listener at zone A, the listener knows that the voice belongs to a caller or person of a telephone call. Likewise, the listener expects the voice of the IPA to localize to zone B since this location is designated for the IPA. When the voice of the IPA speaks to the listener from the location in zone B, the listener is not startled or surprise and can determine that the voice is a computer-generated voice based on the voice localizing to the known location.

The example above of zones A, B, and C further illustrates that zones can be separated such that sounds or software applications assigned to one zone are distinguishable from sounds or software applications assigned to another zone. These designations assist the listener in organizing different sounds and software applications and reduces confusion that can occur when different sounds from different software applications externally localize to varied locations, overlapping locations, or locations that are not known in advance to the listener.

Block 310 states store in memory the assignments of the different SLPs and/or the different zones to the different sources of sound and/or the different types of sound.

The assignments or designations are stored in memory and retrieved to assist in determining a location for where to externally localize binaural sound to the listener.

Consider an example in which a user clicks or activates or an IPA selects playing of an audio file, such as a file stored in MP3, MPEG-4 AAC (advanced audio coding), WAV, or another format. The user or IPA designates the audio file to play at an external location away from the user at a SLP with coordinates (1.1 m, 10°, 0°) without respect to head movement of the user. A digital signal processor (DSP) convolves the audio file with HRTFs of the listener so the sound localizes as binaural sound to the designated SLP. The audio file is updated with the coordinates of the SLP and/or the HRTFs for these coordinates. The assignment of the SLP is thus stored and associated with the audio file. Later, the user again clicks or activates or the IPA selects the audio file to play. This time, however, the assignment information is known and retrieved with or upon activation of the audio file. The audio file plays to the user and immediately localizes to the SLP with coordinates (1.1 m, 10°, 0°) since this assignment information was stored (e.g., stored in a table, stored in memory, stored with or as part of the audio file, etc.). When the audio file plays to the assigned location, the user is not surprised when sound externally localizes to this SLP since the sound previously localized to the same SLP.

In this example of the user or IPA playing the audio file, the user expects, anticipates, or knows the location to where the audio file will localize since the same audio file previously localized to the SLP with coordinates at (1.1 m, 10°, 0°). This process can also decrease processing execution time since an example embodiment knows the audio file sound localization information in advance and does not need to perform a query for the sound localization information. Also in case of a query for the same information, this information is stored in a memory location to expedite processing (e.g., storing the information with or as part of the audio file, storing the information in cache memory, or a lookup table). The SLP and/or SLI can be prefetched or preprocessed to reduce process execution time and increase performance of the computer. In addition, in cases where the same sound data (e.g., an alert sound) has been convolved previously with the same HRTF pair or to the same location relative to the user, the SLS plays the convolved file again from cache memory. Playing the cached file does not require convolution and so does not risk decreasing the performance of the computer system in re-executing the same convolution. This increases the performance of the computer system with respect to other processes, such as another convolution.

FIG. 4 shows a coordinate system 400 with zones or groups of SLPs 400A, 400B, 400C around a head 410 of a user 420. The figure shows an X-Y-Z coordinate system to illustrate that the zones or groups of SLPs are located in 3D space away from the user. The SLPs are shown as small circles located in 3D areas that include different zones.

Three zones or groups of SLPs exist, but this number could be smaller (e.g., one or two zones) or larger (four, five, six, . . . ten, . . . twenty, etc.). Zones or group of SLPs 400A, 400B, 400C include one or more SLPs.

A zone can also be, designate, or include a location where sound is prohibited from localizing to a user, or where a sound is not preferred to externally localize to a user. FIG. 4 shows an example of such a zone 430. This zone can have SLPs or be void of SLPs. By way of example, consider zones that prohibit localization specified behind a user, below a user, in an area known as the cone of confusion of a listener, or another area with respect to the user. For illustration, zone 430 is shown with a dashed circle behind a head of the user, but a zone can have other shapes, sizes, and locations as discussed herein.

Consider an example in which the SLS compares the region defined as zone 430 with a region known to be the field-of-view of the user and determines that no part of zone 430 is within the field-of-view of the user. The user requires that external localizations must occur within his or her field-of-view. The SLS thus identifies zone 430 as prohibited for localization. When a software application requests an SLP or zone for a sound, the SLS does not provide zone 430 or a SLP included by zone 430. When a software application requests zone 430 or a SLP included by zone 430, the SLS denies the request.

The SLS can designate a zone as limited or restricted for all localization, for some localization, or for certain software applications or sound sources. For example, the SLS of an automobile control system allows a binaural jazz music player application to select SLPs without reservation, but restricts a telephony application to SLPs that do not exist in a zone defined as outside the perimeter of the car interior. An incoming call requests to localize to the driver at a SLP four meters from the driver. The SLP at four meters is not in use and is permitted by the user preferences. The automobile control system, however, denies the telephony application from selecting the SLP four meters from the driver because the SLP lies in the zone prohibited to the application, being outside the perimeter of the interior of the car. So the SLS of the automobile control system assigns the incoming caller SLP to coordinates at a passenger seat.

Consider an example in which a telephone application executes telephone calls, such as cellular calls and VoIP calls. When the telephony application initiates a telephone call or receives a telephone call, a voice of the caller or person being called externally localizes into a zone that is in 3D space about one meter away from a head of the user. The zone extends as a curved spherical surface with an azimuth (θ) being 330°≤θ≤30° and with an elevation ((p) being 340°≤φ≤20°. Areas in 3D space outside of this zone are restricted from localizing voices in telephone calls to the user. When the user receives a phone call with the telephony application, the user knows in advance that the voice of the caller will localize in this zone. The user will not be startled or surprised to hear the voice of the caller from this zone.

The SLS, software application, or user can designate or enforce a zone as available, restricted, limited, prohibited, designated for, or mandatory or required for localization of all, none, or selected applications or sound sources, and/or sound types, and/or specific or identified sounds or sound IDs. Consider an example in which a user has hundreds or thousands of SLPs in an area located between one meter and three meters away from his or her head. An audio or media player can localize music to any of these SLPs. The media player, for certain music files (e.g., certain songs), restricts or limits sound to localizing at specific SLPs or specific zones. For instance, song A (a rock-n-roll song) is limited to localizing vocals to zone 1 (an area located directly in front of a face of the listener), guitar to zone 2 (an area located about 10°-20° to a right of zone 1), drums to zone 3 (an area located about 10°-20° to a left of zone 1), and bass to zone 4 (an area located inside the head of the listener). Further, different instruments or sound can be assigned to different zones. For example, vocals or voice are assigned to localize inside a head of the listener, whereas bass, guitar, drums, and other instruments are assigned to distinct or separate zones. An audio segmenter creates segments for each instrument so that each segment localizes to a different zone. Alternatively, the music is delivered to the user in a multi-track format with the sound of each instrument on its own track. This delivery allows the media player, the SLS, or the user to assign each instrument track to a zone.

Restricted, limited, or prohibited SLPs and/or zones can be stored in memory and/or transmitted (e.g., as part of the sound localization information or information about the sound as discussed herein).

Placing sound into a designated zone or a designated SLP provides the listener with a consistent listening experience. Such placement further helps the listener to distinguish naturally occurring binaural sound (e.g., sounds occurring in his or her physical environment) from computer-generated binaural sound because the listener can restrict or assign computer-generated binaural sound to localize in expected zones.

Consider an example of a HPED such as a digital audio player (DAP) or smartphone in which the SLS and/or SLP selector restrict localization of sound to a safe zone for one or more sound sources (e.g., any or all sound sources). For example, if a SLP is requested that is not within the safe zone then the sound is adjusted to localize inside the safe zone, switched to localize internally to the user, not output, or output with a visual and/or audio warning. For example, the user understands or determines that the safe zone is the zone or area in his field-of-view (FOV). The user designates the area of his FOV and/or allows the electronic system to determine or measure or calculate the FOV. For example, a software application executing on the HPED generates a test sound with a gradually varying ITD that begins at 0 ms and gradually becomes greater. The user experiences a localization of the sound starting at 0° azimuth and moving slowly to his or her left. The user listens for the moment when the gradually panning test sound reaches a left limit of the safe zone, such as the point before which the sound seems to emanate from beyond the limit of his or her left side gaze (e.g., −60° to −100°). Then, at that moment, the user activates a control, issues a voice command, or otherwise makes an indication to the software application. At the time of the indication, the software application saves the ITD value and assigns the value as a maximum ITD for binaural sound played to the user. Similarly, the software application uses different binaural cues or methods to determine other limits of the safe zone (e.g., a minimum and maximum elevation, minimum and maximum distance, etc.). As another example, the user controls the azimuth, elevation, and distance of a SLP playing a test sound, such as by using a dragging action or knob or dial turning action or motion on a touch screen or touch pad in order to move the SLP to designate the borders of the zone or safe zone.

The software application saves the safe zone limits to the HPED and/or the user's preferences. Alternatively, a default safe zone is included encoded in the hardware, firmware, or write-protected software of the HPED. A software application that controls or manages sound localization for the HPED (such as the SLS and/or SLP selector) thereafter does not allow localization except inside the safe zone. The user can be confidant that no software application will cause a sound localization outside of the area that he or she can confirm visually for a corresponding event or lack of event in the physical environment. Consequently, the user is confident that sounds perceived by him or her outside the safe zone are sounds occurring in the physical environment, and this process improves the user functionality for default binaural sound designation.

As another level of localization safety, a safety switch on the HPED is set to activate a manual localization limiter. For example, a three-position hardware switch or software interface control has three positions (e.g., the switch appears on the display of a GUI of a HPED or HMD). The control is set to a "mono" position in order to output a single-channel or down-mixed sound to the user. Alternatively, this switch is set to a position labeled "front" in order to limit localization to the safety zone, or the switch is set to a position called "360°" to allow binaural sound output that is not limited to a safety zone. In order to execute "front" or safe zone localization limitation, the SLS, firmware, or a DSP of the HPED monitors the ITD of the binaural signal as it is output from the sound sources, operating system, or amplifier. For example, the SLS monitors binaural audial cues and observes a pattern of successive impulse patterns in the right channel and matching impulse patterns in the left channel a few milliseconds (ms) later that have a slightly lower level or intensity. The differences in the left and right channels indicate to the SLS that the sound is binaural sound, and the SLS measures the ITD and/or ILD from the differences. The SLS compares the ITD/ILD against a maximum ITD/ILD and/or otherwise calculates an azimuth angle of a SLP associated with the matching impulses. If or when the ITD/ILD exceeds a limit, the SLS, firmware, or DSP corrupts or degrades the signal or the binaural audial cues of the signal (e.g., the ITD is limited or clipped or zeroed) in order to prevent the perception of an externalized sound beyond the limit or beyond an azimuth limit.

Consider an example in which the HPED is a WED (such as headphones or earphones), and the safety switch and SLS that monitors the audial cues are included in the headphones or earphones. The user of the WED couples the headphones to an electronic device providing binaural sound, sets the switch to “front” and is confident that even if the coupled electronic device produces binaural sound, he or she will hear localization only in the safe zone.

FIG. 5A shows a table 500A of example historical audio information that can be stored for a user in accordance with an example embodiment.

The audio information in table 500A includes sound sources, sound types, and other information about sounds that were localized to the user with one or more electronic devices (e.g., sound localized to a user with a smartphone, HPED, PED, or other electronic device). The column labeled Sound Source provides information about the source of the audio input (e.g., telephone call, internet, smartphone program, cloud memory (movies folder), satellite radio, or others shown in example embodiments). The column labeled Sound Type provides information on what type of sound was in the sound or sound segment (e.g., speech, music, both, and others). The column labeled ID provides information about the identity or identification of the voice or source of the audio input (e.g., Bob (human), advertisement, Hal (IPA), a movie (E.T.), a radio show (Howard Stern), or others as discussed in example embodiments. The column labeled SLP and/or Zone provides information on where the sounds were localized to the user. Each SLP (e.g., SLP2) has a different or separate localization point for the user. The column labeled Transfer Function or Impulse Response provides the transfer function or impulse response processed to convolve the sound. The column can also provide a reference or pointer to a record in another table that includes the transfer function or impulse response, and other information. The column labeled Date provides the timestamp that the user listened to the audio input (shown as a date for simplicity). The column labeled Duration provides the duration of time that the audio input was played to the user.

Example embodiments store other historical information about audio, such as the location of the user at the time of the playing of the sound, a position and orientation of the user at the time of the sound, and other information. An example embodiment stores one or more contexts of the user at the time of the sound (e.g., driving, sleeping, GPS location, software application providing or generating the binaural sound, in a VR environment, etc.). An example embodiment stores detailed information about the event that stopped the sound (e.g., end-of-file was reached, connection was interrupted, another sound was given priority, termination was requested, etc.). If termination is due to the prioritization of another sound, the identity and other information about the prioritized sound can be stored. If termination was due to a request, information about the request can be stored, such as the identity of the user, application, device, or process that requested the termination.

As one example, the second row of the table 500A shows that on Jan. 1, 2016 (Date: Jan. 1, 2016) the user was on a telephone call (Sound Source: Telephone call) that included speech (Sound Type: Speech) with a person identified as Bob (Identification: Bob (human)) for 53 seconds (Duration 53 seconds). During this telephone call, the voice of Bob localized with a HRIR (Transfer Function or Impulse Response: HRIR) of the user to SLP2 (SLP: SLP2). This information provides a telephone call log or localization log that is stored in memory and that the SLS and/or SLP selector consults to determine where to localize subsequent telephone calls. For example, when Bob calls again several days later, his voice is automatically localized to SLP2. After several localizations, the listener will be accustomed to having the voice of Bob localize to this location at SLP2.

FIG. 5B shows a table 500B of example SLP and/or zone designations or assignments of a user for localizing different sound sources in accordance with an example embodiment.

By way of example and as shown in table 500B, both speech and non-speech for a sound source of a specific telephone number (+852 6343 0155) localize to SLP1 (1.0 m, 10°, 10°). When a person calls the user from this telephone number, sound in the telephone call localizes to SLP1.

Sounds from a VR game called “Battle for Mars” localize to zone 17 for speech (e.g., voices in the game) and SLP3-SLP 5 for music in the game.

Consider an example wherein the zone 17 for the game is a ring-shape zone around the head of the user with a radius of 8 meters, and a zone 16 for voice calls is a smaller ring-shape zone around the head of the user with a radius of 2 meters. As such, the voices of the game in the outer zone 17 and the voices of the calls localized in the inner zone 16 localize from any direction to the user.

The user perceives the game sounds from zone 17 from a greater distance than the voice sounds from zone 16. The user is able to distinguish a game voice from a call voice because the call voices sound closer than the game voices. The user speaks with friends whose voices are localized within zone 16, and also monitors the locations of characters in the game because he or she hears the game voices farther off. After some time, the user wishes to concentrate on the game rather than the calls with his friends, so the user issues a single command to swap the zones. The swap command moves the SLPs of zone 16 to zone 17, and the SLPs of zone 17 to zone 16. Because the zones have similar shapes and orientations to the user, the SLP distances from the user changes, but the angular coordinates of the SLPs are preserved. After the swap, the user continues the game with the perception of the game voices closer to him, in zone 16. The user is able to continue to monitor and hear the voices of the calls from zone 17 farther off.

This example illustrates the advantage of using zones to segregate SLPs of different sound sources. Although the zones are different sizes, their like shapes allow SLPs to be mapped from one zone to the other zone at corresponding SLPs that the user can understand. This example embodiment improves functionality for the user who triggers the swap of multiple active SLPs with a single command referring to two zones, without issuing multiple commands to move multiple phone call and game SLPs. The SLS that performs the swap recognizes the similar or like geometry of the zones. The SLS performs the multiple movements of the SLPs with a batch-update of the coordinates of the SLPs in a zone, and this accelerates and improves the execution of the movement of multiple SLPs. The SLS reassigns a single coordinate (distance) rather than complete coordinates of the SLPs, and this reduces execution time of the moves. As a further savings in performance, because the adjustment of the distance coordinates is a single value (6 m), the SLS loads the value of the update register once, rather than multiple times, such as for each SLP in the zones 16 and 17.

This table further shows that sounds from telephone calls from or to Charlie or telephone calls with Charlie internally localize to the user (shown as SLP6). Teleconference calls or multi-party calls localize to SLP20-SLP23. Each speaker identified in the call is assigned a different SLP (shown by way of example of assigning unique SLPs for up to four different speakers, though more SLPs can be added). Calls to or from unknown parties or unknown telephone numbers localize internally and in mono.

All sounds from media players localize within zones 7-9.

Different sources of sound (shown as Sound Source) and different types of sound (shown as Sound Type) localize to different SLPs and/or different zones. These designations are provided to, known to, or available to the user. Localization to these SLPs/zones provides the user with a consistent user experience and provides the user with the knowledge of where computer-generated binaural sound is or will localize with respect to the user.

FIG. 5C shows a table 500C of example SLP and/or zone designations or assignments of a user for localizing miscellaneous sound sources in accordance with an example embodiment.

As shown in table 500C, audio files or audio input from BBC archives localizes at different SLPs. Speech in the segmented audio localizes to SLP30-SLP35. Music segments (if included) localize to SLP40, and other sounds localize internally to the user.

As further shown in the table, YOUTUBE music videos localize to Zone 6-Zone 19 for the user, and advertisements (speech and non-speech) localize internally. External localization of advertisements is blocked. For example, if an advertisement requests to play to the user at a SLP with external coordinates, the request is denied. The advertisement instead plays internally to the user, is muted, or not played since external coordinates are restricted, not available, or off-limits to advertisements. Sounds from appliances are divided into different SLPs for speech, non-speech (warnings and alerts), and non-speech (other). For example, a voice message from an appliance localizes to SLP50 to the user, while a warning or alert (such as an alert from an oven indicating a cooking timer event) localizes to SLP51. The table further shows that the user's intelligent personal assistant (named Hal) localizes to SLP60. An MP3 file (named "Stones") is music and is designated to localize at SLP99. All sound from a sound source of a website (Apple.com) localizes to Zone91.

The information stored in the tables and other information discussed herein assists a user, an electronic device, and/or a software program in making informed decisions on how to process sound (e.g., where to localize the sound, what transfer functions or impulse responses to provide to convolve the sounds, what volume to provide a sound, what priority to give a sound, when to give a sound exclusive priority, muting or pausing other sounds, such as during an emergency or urgent sound alert, or other decisions, such as executing one or more elements in methods discussed herein). Further, information in the tables is illustrative, and the tables include different or other information fields, such as other audio input or audio information or properties discussed herein.

Decisions on where to place sound are based on one or more factors, such as historical localization information from a database, user preferences from a database, preferences of other users, the type of sound, the source of the sound, the source of the software application generating or transmitting the sound, the duration of the sound, a size of space around the user, a position and orientation of a user within or with respect to the space, a location of user, a context of a user (such as driving a car, on public transportation, in a meeting, in a visually rendered space such as wearing VR goggles), historical information or previous SLPs (e.g., information shown in table 500A), conventions or industry standards, consistency of a user sound space, and other information discussed herein.

Consider an example in which each user, software application, or type of sound have a unique set of rules or preferences for where to localize different types of sound. When it is time to play a sound segment or audio file to the user, an example embodiment knows the type of sound (e.g., speech, music, chimes, advertisement, etc.) or software application (e.g., media player, IPA, telephony software) and checks the SLP and/or zone assignments or designations in order to determine where to localize the sound segment or audio file for the user. This location for one user or software application can differ for another user or software application since each user can have different or unique designations for SLPs and zones for different types of sound and sources of sound.

For example, Alice prefers to hear music localize inside her head, but Bob prefers to hear music externally localize at an azimuth position of +15°. Alice and Bob in identical contexts and locations and presented with matching media player software playing matching concurrent audio streams can have different SLPs or zones designated for the sound by their SLP selectors. For instance, Bob's preferences indicate localizing sounds to a right side of his head, whereas Alice's preferences indicate localizing these sounds to a left side of her head. Although Alice and Bob localize the sound differently, they both experience consistent personal localization since music localizes to their individually preferred zones.

FIG. 6 is a method to select a SLP and/or zone for where to localize sound to a user in accordance with an example embodiment.

Block 600 states obtain sound to externally localize as binaural sound to a user.

By way of example, the sound is obtained from memory, from a file, from a software application, from microphones, from a wired or wireless transmission, or from another way or source (e.g., discussed in connection with block 200).

Block 610 makes a determination as to whether a SLP and/or zone is designated.

The determination includes analyzing information and properties of the sound (such as the source of the sound, type of the sound, identity of the sound, and other sound localization information discussed herein), information and properties of the user (such as the user preferences, localization log, and other information discussed herein), other information about this instance and/or past instances of the localization request or similar requests, and other information.

If the answer to this question is "no" then flow proceeds to block 620 that states determine a SLP and/or a zone for the sound.

When the SLP and/or zone is not known or not designated, an electronic device, user, or software application determines where to localize the sound. In case the electronic device or software application cannot measure or calculate a best, preferred, desired, or optimal selection of a SLP or zone with a high degree of likelihood or probability, then some example actions that can be taken by the software application or electronic device include, but are not limited to, the following: selecting a next or subsequent SLP or zone from an availability queue;

randomly selecting a SLP or zone from those available to a user; querying a user (such as the listener or other user) to select a SLP or zone; querying a table, database, preferences, or other properties of a different remote or past user, software application or electronic device; and querying the IUA of other users as discussed herein.

As another example, the software application or electronic device selects a default location. For example, when the SLP and/or zone is not known for an incoming sound, the software application or electronic device selects a predetermined SLP and convolves the sound so it localizes to this predetermined or preset SLP. As another example, the software application providing the sound designates the default or preset SLP. For example, a VoIP chat application specifies a default planar zone defined by points with a −10° elevation, and within 15° of 0° azimuth, and within two meters of the user. As another example, a device specifies a default SLP or zone (e.g., a WED specifies a default localization of "any point in a safe zone"). As another example, the file or media to be played designates a SLP or zone. Consider an example of an audiobook that includes a header tag that specifies a default localization in spherical coordinates of (1.5 m, 0°, 12°) for the voice of the narrator.

As another example, the software application or electronic device analyzes previous or historical SLPs and/or zones for sound and selects one based on this analysis. For example, historical sound localization information provides sufficient information to predict a zone that the user will find satisfying, logical, informative, expected, familiar, seamless, unobtrusive, or otherwise appropriate.

As another example, the software application or electronic device determines the location based on collaboration or recommendations from user agents, IUAs, IPAs, or other software applications. For example, example embodiments include methods to select a SLP and/or zone based on collaborative learning or information exchange between user agents, such as different user agents of the user, and/or information exchange between user agents of other users.

As another example, the software application or electronic device asks the user where to localize the sound. For example, a natural language user interface generates speech that asks a user, "Where do you want to place the sound?"

and interprets vocal responses from the user such as, "to the left of the screen," "between Alice and Bob," "behind me," "far in the back," etc.

If the answer to this determination is "yes" then flow proceeds to block 630 that states select a SLP and/or sound localization information according to the designation.

When the designation is known, the software application or electronic device selects the SLP and/or zone according to the designation or assignment. Examples of the SLP and/or zone being known or designated include, but are not limited to, being designated or provided by the software application (e.g., the software application generating or providing the sound), provided by or with a file (e.g., provided in or with an audio recording), provided based on a type of sound (e.g., localizing voice to one SLP, localizing music to another SLP, localizing alarms to yet another SLP, etc.), provided by a user (e.g., a voice command or gesture command specifies the SLP and/or zone), provided by a third party (e.g., a user transmitting the sound designates where to localize the sound), provided by an IPA or IUA (e.g., an IPA selects where to localize the sound for the user), provided from memory (e.g., the SLP and/or zone is retrieved from a lookup table or cache), provided by an electronic device (e.g., provided by a robot or avatar), provided with another method or apparatus discussed herein, or provided with a known designation (e.g., provided with a specific SLP, zone, HRTFs, identification, etc.).

Block 640 states provide the sound to the user as binaural sound that externally localizes in the 3D space away from the user.

The SLS or SLP selector retrieves sound localization information corresponding to the selected SLP or zone. For example, the SLP selector provides a zone identification of a selected zone to the SLS. The SLS scans a SLP table for a first available SLP of, included in, or matching the zone, and retrieves an HRTF pair corresponding to coordinates of the SLP. The SLS convolves the sound with the HRTF pair and provides the sound to the user. By way of example, earphones, headphones, speakers with crosstalk cancellation, or a wearable electronic device with speakers in or at both ears of the user provide the sound to the user as the binaural sound. Alternatively, a WED worn by the user includes positional head tracking (PHT) sensors, and the SLS retrieves the PHT data in order to compensate for the position and orientation of the head of the user in the selection of the HRTF pair that the SLS retrieves for convolution.

In an example embodiment, zones indicate a social or business relationship between a source of the sound and the user. For example, voices of family and friends localize in one zone; voices of business associates localize in another zone; and voices of strangers localize in another zone. This type of localization improves the functionality of binaural communication since the user aurally perceives the relationship with the voice or sound based on where in 3D space the sound localizes with respect to the user.

Consider an example in which a SLS determines a new sound that generates from a telephony application executing on an HPED of a user. The SLS retrieves an identity of the sound or sound ID and passes the sound ID and the sound source (the telephony application) to the SLP selector with a request for a SLP for the sound. The SLP selector examines the sound ID, queries a contact list of the user with the sound ID (such as the telephone number) and finds a matching contact record. The contact record designates a family member of the user. The SLP selector queries the SLP table for a zone designated to family members and finds a matching zone tagged "family." The SLP selector selects an available SLP that is included in the family zone and assigns the incoming voice localization to the SLP. The SLP selector returns the SLP selection for the sound to the SLS and stores the localization instance (e.g., the SLP, sound source, sound type, timestamp, and other information) to the localization log. The SLS determines HRTFs for the selected SLP and passes the sound (the voice) and the HRTFs to a DSP that convolves the sound. The user hears the voice of the family member localized in the family zone.

In an example embodiment, zones indicate a phone call disposition or state of connection with other callers on a telephone call. For example, a caller on hold, a caller that has placed the user on hold, or an inactive caller (e.g., a caller who has not spoken or transmitted sound in the last three minutes) localize to a hold zone, such as a zone located above the head of the user or farther from the user.

Consider an example where the SLS monitors the sound of a connected caller and determines that the caller has been quiet for over three minutes.

Alternatively, the SLS determines that the same sound (such as hold music) has been playing for one minute. The SLS passes the sound source (a phone application) and the new state of the call (quiet) to the SLP selector with a request for the SLP to re-evaluate the SLP for the sound given the updated state of the sound or call (quiet). The SLP selector queries the SLP table for a zone designated to the sound source and to the new state (quiet). The SLP selector selects a SLP that is included in the quiet zone and available, updates the coordinates of the SLP of the caller, and notifies the SLS and/or DSP of the update. The SLS determines HRTFs for the updated SLP coordinates and passes the new HRTFs to the DSP. The DSP continues to convolve the sound, now with the updated HRTFs, and the user hears the quiet sound or hold music of the call in the quiet zone.

Consider an example where the SLP selector receives a SLP request for an incoming sound but the sound type and sound source of the request are unknown, not supplied, or not determinable. The SLP selector has no basis to select a SLP or zone, so the SLP selector examines the SLP table to determine a region that does not include SLPs, defines a zone for the region, and creates a SLP in the zone. The SLP selector notifies the SLS of the approved and active status of the SLP record. The notification triggers the SLS to commence the localization of the sound according to the new SLP. The user hears the sound localized in the newly defined zone.

In an example embodiment, sound sources do not request the SLP selector to assign a SLP or zone, but instead submit SLP or HRTF coordinates to the SLP selector for approval. The sound sources execute as sound objects that independently determine their localization and/or execute their own convolution. The sound objects or sound sources request localization approval as part of their operation. For example, sound source objects execute with a game application on the HPED and submit requested or default SLPs that the sound objects attempt to localize to the user. In this example, the sound objects or sound sources communicate to the SLP selector and not through the SLS. The SLP selector, based on the received sound source and coordinates, evaluates the requested coordinates prior to or during the localization of the sound and approves or denies the request, or returns alternative coordinates such as proximate to the coordinates or in an allowed zone for the sound source and/or sound type. In the case of a denial, if the sound is already localizing, the SLP selector directs the sound object or SLS to halt localization of the sound. In the latter case, the SLS triggers the DSP or processor to halt convolution of the sound source or sound object.

Consider an example where the game application generates a sound object and the sound object assigns HRTF or SLP coordinates to the sound it supplies. The sound object and/or game application sends the coordinates, the identity of the sound, and source of the sound (the identity of the game application and/or sound object) to the SLP selector. The SLP selector examines the identity and source of the sound and queries the SLP table for active SLPs at or near the requested SLP. Finding the coordinates available, the SLP selector further queries the SLP table for zones that include the SLP. The SLP selector evaluates each zone to determine that such a sound type and sound source are allowed to localize to the zone according to the rules designated to the zones. If no zone prohibits localizations of the sound object or the application (the game), or the sound type, then the SLP selector responds to the request from the sound object with an approval of the SLP request. The SLP selector creates or updates a SLP record for the sound and notifies the SLS of the approved and active status of the SLP record. The notification triggers the sound object to commence its localization or the SLS to direct the convolution of the sound according the approved SLP. The user hears the game sound at the spot requested by the sound object.

A problem can occur when an electronic device, software application, or user designates a zone or SLP for external sound localization but this zone or SLP is not available or appropriate for a location to localize binaural sound. For example, a user or a software application designates a particular location where sound will localize to a listener while another software application is already localizing sound to this location. As another example, a physical obstruction (e.g., a wall or a person) exists at the location that prevents the visual experience from matching the auditory experience of the user (e.g., two sounds coming from one point or an unfitting reverberation or attenuation). As another example, the location poses a hazard or danger to the user if binaural sound localizes to this area (e.g., localizing binaural sound behind or in a blind spot of a user while the user drives an automobile).

Example embodiments solve these problems and others and resolves conflicts that occur with respect to designations of a SLP or zone.

Figure 7:
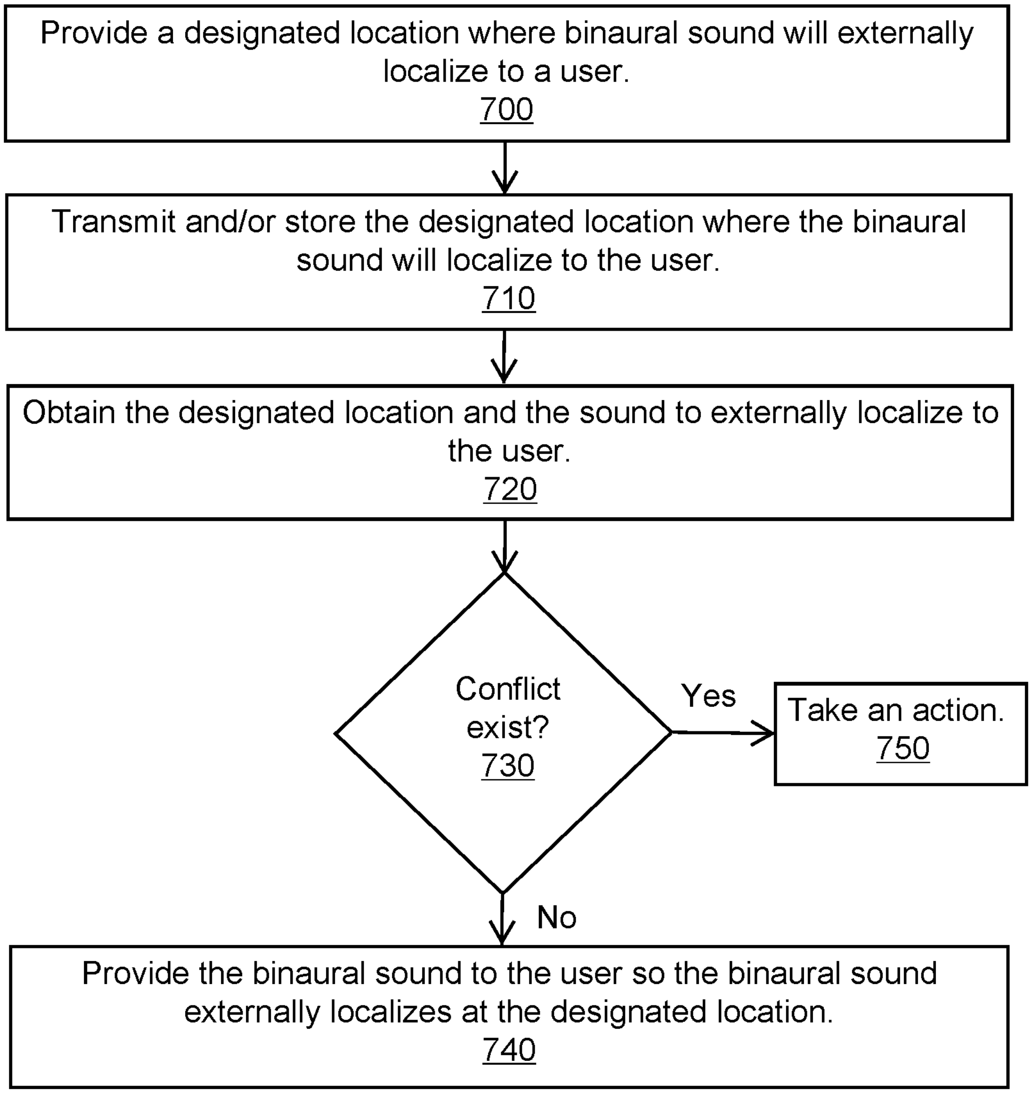
FIG. 7 is a method to resolve a conflict with a designation of a SLP and/or zone in accordance with an example embodiment.

FIG. 7 is a method to resolve a conflict with a designation of a SLP and/or zone in accordance with an example embodiment.

Block 700 states provide a designated location where binaural sound will externally localize to a user.

A software application, electronic device, or a user provides a SLP, a zone, HRTFs, coordinates, sound localization information, or other information that designates a location where binaural sound will externally localize to the user. This location can be a preferred or desired location. For example, a caller telephones a user, and the caller (or the software application executing the telephone call) provides a desired location where the voice of the caller should localize with respect to the user. As another example, a user clicks or activates a music file to play a song, and the music file or media player executing the music file includes a default location (e.g., the default location is specified by an SLI component included in the music file) where the song will externally localize to the listener. As another example, a voice personal assistant (VPA) speaks through earphones to a user and automatically attempts to have its voice localize to a particular SLP away from the user. As another example, a VR software program provides binaural sound to localize at designated locations to a user while the user wears a head mounted display and plays a VR game associated with the software program.

Block 710 states transmit and/or store the designated location where the binaural sound will localize to the user.

The designated location can be stored in memory, stored in a file such as a SLI file, and/or transmitted (e.g., wirelessly transmitted over one or more networks). The designated location can be stored and/or transmitted with the sound, or stored and/or transmitted separately from the sound. For example, a sound file includes the designated location, and these two items are transmitted together over the internet. As another example, the sound file is transmitted without the designated location, but the designated location is stored at or generated by an electronic device or software program receiving the sound file. As another example, the designated location is transmitted, without the sound, to a server, a handheld portable electronic device (HPED), portable electronic device (PED), or wearable electronic device (WED) that stores or generates the sound upon receiving the designated location.

Consider an example in which the SLP, zone, and/or SLI (e.g., HRTFs, ILD, and/or ITDs, and/or localization instructions) are wirelessly transmitted along with or together with the sound that will be played to the user and localize as binaural sound in 3D space away from the user. This information can be transmitted at a same time as the sound in a same file or same stream as the sound or in a separate file as the sound. For example, the information is sent together or along with the sound. As another example, the SLI file includes the sound data, or the sound data includes the SLI. As yet another example, the localization data is encoded with the sound data. Alternatively, this information can be transmitted separately from the sound, at a different time than the sound, or with different packets than the sound or over a different network connection or session.

Block 720 states obtain the designated location and the sound to externally localize to the user.

The designated location or locations (e.g., a set or series of SLPs or a description of a path followed by the SLP over time) and/or sound is retrieved or received by an application executing in the electronic system from a location in memory, a file, a transmission, or a capture (of the sound). Further, the designated location and/or sound can be generated or produced (e.g., generated in real time upon execution of a software program). For example, the software application or another process executing in the electronic system creates a sound rendered by the application (e.g., a TTS sound), specifies a localization, and assembles a SLI file. The SLI file includes the description of the specified localization packaged together with the sound. As another example, during a telephone call with a caller, a user provides voice commands to designate locations. A natural language user interface interprets the voice commands as location or zone descriptions around the head of the user. The SLS designates zones from the zone descriptions, receives the voice of the caller from a telephone application, and moves the voice of the caller to the zones located around the head of the user.

Block 730 makes a determination as to whether a conflict exists with the designated location where the binaural sound will localize to the user.

Examples of a conflict include, but are not limited to, one or more of the following: another sound is already localizing at the designated location, a virtual microphone point (VMP) is designated at the location, another sound is scheduled or planned to localize at the designated location, a physical or virtual object obstructs or exists at the designated location, there is another pending request to localize binaural sound to the designated location, a property or permission restricts or prohibits localizing external sound to the user (such as a property of the designated location, physical environment, sound source, application, device, or user), HRTFs or other sound localization information or resources cannot be obtained or are not available to convolve sound to the designated location, the user or a software application has previously instructed or commanded that binaural sound not localize to the designated location, the user or a software application instructs or commands that binaural sound localizes to a location that is different than the designated location, localizing the sound to the designated location has, is, or would consume or exceed available, allotted, or recommended bandwidth or processing power, the designated location is different than a location recommended by a software application (e.g., IPAs or IUAs), another sound is not localizing at the designated location but is localizing to a nearby SLP and the listener would not be able to audibly distinguish between the SLP and a SLP at the designated location, or other conflicts.

If the answer to this question is “no” flow proceeds to block 740 that states provide the binaural sound to the user so the binaural sound externally localizes at the designated location.

For example, a digital signal processor (DSP) or other processor convolves and/or processes the sound so it externally localizes as binaural sound away from the user to the designated location that is in 3D space.

If the answer to this question is “yes” flow proceeds to block 750 that states take an action.

Execution of the action resolves the conflict, renders the conflict moot, alters the conflict, delays the conflict, avoids the conflict, proceeds in spite of the conflict, or produces another result. By way of further example, such actions include, but are not limited to, the following: moving the designated location to another SLP and/or zone (e.g., altering an azimuth angle (8) of the SLP, an elevation angle ((p) of the SLP, and/or a distance (r) of the SLP from the user), switching or changing the sound to another form of sound (e.g., providing the sound to the user in mono sound or stereo sound instead of binaural sound), delaying execution of the sound until the conflict is resolved (e.g., waiting a period of time until the conflict no longer exists), informing the user of the conflict (e.g., providing the user with an audio warning, an audio alert, an audio notification, a visual warning, a visual alert, a visual notification, etc.), altering the sound to the user (e.g., increasing a volume of the sound, decreasing a volume of the sound), stopping or preventing the sound from localizing to the user, augmenting the sound (e.g., convolve a RIR with the sound, add background noise to the sound, add music to the sound, etc.), or taking another action.

When a conflict occurs, the user, electronic device, and/or software application is informed about the conflict and how it was resolved or not. Further, this information is stored in memory, such as the localization log. The SLP selector or other process with permission to access the storage retrieves and analyzes the instances of conflicted, failed, or changed zone or SLP requests in order to assist in resolving a subsequent conflict that occurs at a later time in the future. For example, facts surrounding a conflict and the resolution to the conflict are stored in the localization log. When a subsequent conflict occurs in a same zone and/or with a same sound source, the SLP selector searches the log for failed localizations with a matching zone or sound source or other similarity with the current conflict. The SLP selector analyzes the localization records returned by the searches to determine a resolution to the current conflict. Consulting previous conflicts or failed or delayed localization or zone requests and the resolution or recorded final state of the requests improves performance of the computer executing the binaural sound. For instance, this consulting improves the delivery time of zone or localization requests by preventing re-execution of conflict resolution processes. Binaural sound convolved to conflicting locations that is extraneous, unnecessary, unappreciated, or interrupting does not improve user experience and so the convolution or processing that produces the sound is wasted, and slows important convolution or processes that share resources. Reducing this waste improves computer performance. In addition, multiple sounds convolved to a same SLP can result in a user failing to localize the sounds due to mixed audial cues. Reducing this destructive localization improves functionality of the computer or computer system executing the binaural sound. Example embodiments reduce the time required to halt the tax on resources of such processes. Reducing the time further improves the performance and functionality gains of eliminating the destructive localization.

Consider an example in which an electronic device of a user stores restrictions (including rules, or priorities) for where binaural sound externally localizes to the user in 3D space. The restrictions govern SLPs and zones for different types of sound, different software applications that generate or produce the sound, different sources of the sound, different times of day when the sound is played or requested to be played, different users sending the sound, etc. Before binaural sound is played to the user, the software program executing the binaural sound consults the restrictions to determine if a conflict exists. For example, a determination is made as to whether a proposed SLP or zone for where the binaural sound is intended or is programmed to localize with respect to the user conflicts with one or more of the restrictions. When the electronic device or software application detects a conflict, it executes an action to resolve or avoid the conflict.

Consider an example in which a person sends a voice message to a user and requests that the voice message localizes to zone 1 of the user that is located at (1.0 m, 10°, 0°). This location (i.e., zone 1) transmits with and/or is tagged or attached to the audio file. This location, however, produces an audio conflict since the user is listening to music that externally localizes to this location when the voice message is received. A smartphone of the user changes the coordinates of the voice message localization to zone 2 at (1.0 m, 330°, 20°), convolves the voice message with HRTFs corresponding to these coordinates, and plays the voice message to the user. The new location at zone 2 is available for sound localization since no music or other sounds were being convolved and localized to this zone.

Consider an example in which an advertiser records an audio advertisement in binaural sound so the advertisement plays and localizes to a user in an area located in front of a face of the user. In accordance with a local regulation, the advertiser must also make available the HRIRs convolved with the advertisement audio. This location, however, conflicts with audio preferences of the user that provide advertisements cannot externally localize to the user but must be provided in stereo sound or mono sound to the user. A wearable electronic device (WED) of the user discovers this conflict before the advertisement plays to the user through earphones. In response to this conflict, the WED processes or deconvolves the advertisement audio from the HRIRs made available so the advertisement audio plays without localization to the user through the earphones and hence does not violate the user preferences regarding audio advertisement localization.

One or more example embodiments increase or improve performance of a computer, an electronic device, or computer system executing an example embodiment. One or more example embodiments also improve the ability to execute instructions and/or increase a speed to execute instructions that provide binaural sound to localize to one or more SLPs that are external to a head or body of the listener.

Convolving or processing sound in real time for multiple SLPs or SLPs that move with respect to the face of the user (such as when a convolution is subject to adjustment according to head-tracking) is process intensive when the user and/or the SLP is moving. A large number of process executions are required, and the vastness of these executions slow or hinder sound localization to the user.

An example embodiment employs one or more of several techniques to solve this problem and improve execution performance of a computer. Example embodiments further include various solutions to increase performance of a computer, electronic device, and/or computer system executing binaural sound with example embodiments.

As one example, some types of sound or sources of sound are processed with servers in a network while the sound is in transit from a source electronic device to the electronic device of a user. Servers (such as those in a cloud or network) offer faster processing or convolving of sound than local processors (e.g., a processor on a HPED or PED). For instance, for some sources of sound (e.g., telephone calls), the voice of the caller originates from the electronic device of the caller, transmits across one or more networks (e.g., the Internet), and arrives at the electronic device of the user. The electronic device of the user processes and convolves the voice of the caller with HRTFs of the user (or other sound localization information) and provides the binaural sound to the user. This process, however, can be expedited or processing resources conserved or limited at the electronic device of the user. Specifically, as the voice of the caller transmits across the network, servers process and/or convolve the sound with the HRTFs of the user (or other sound localization information) to zones pre-designated by the user, and provide the binaural sound to the electronic device of the user already including binaural cues that localize to the zone. One or more faster processors of the network or cloud servers convolve the voice after it leaves the electronic device of the caller but before it arrives to the electronic device of the user. The electronic device of the user saves processing resources.

As another example, sound automatically switches from binaural to mono or stereo and from mono or stereo to binaural sound based on head orientations of the user. For example, when a user tilts his or her head beyond a predetermined elevation angle or azimuth angle, the SLS takes an action, such as automatically internalizing the sound to the user or maintaining the SLP at a consistent point relative to the face of the user. For instance, the SLS decides not to move the SLP farther than the predetermined elevation or azimuth angle or ceases to adjust the SLP location for head orientation. These actions reduce processing and/or convolution of the sound.

Similarly, the SLS of an example embodiment refers to zones defined by a user, application, or device to halt convolution of SLPs that move outside of the zones, and this conserves and/or improves allocation of processing in agreement with the user thereby improving the experience of the user.

As another example, when a predetermined number of SLPs are already being convolved or when a predetermined level of processor activity is reached, the SLS takes an action to limit further processing or convolution to reduce process execution. For example, when this level is reached, the SLS ceases or stops processing or convolving of additional SLPs, or SLPs in a zone designated as a low priority zone.

As another example, when a number of SLPs are exceeded, the SLS changes or adjusts a localization priority for certain SLPs or zones, triggering adjustments as to the localization priority or sound quality of sounds or zones. For example, a zone 1 has a high localization priority and SLPs of zone 1 are convolved with the convolver (e.g., a processor or DSP). A zone 2 has a medium localization priority and SLPs of zone 2 are convolved with the convolver when the convolver resources allow, and otherwise are processed for spatialization by adjustment of ITD. A zone 3 has a low localization priority and SLPs of zone 3 are convolved with the convolver when the convolver resources allow, and otherwise are provided to the user in their native spatialization without adjustment. When a number of SLPs in zone 1 are exceeded, the SLS changes the localization priority of zone 2 to a low priority and this triggers a change in processing allocation to zone 1 and zone 2, and performance improvement for binaural sound processing of the SLPs in zone 1.

Consider an example in which the user designates particular zones for which audio quality is prioritized over spatiality or localization accuracy or quality, and other zones in which accurate localization is prioritized over audio quality.

As another example, electronic devices (such as HPEDs, WEDs, or PEDs) of users share responsibility of convolving sound or convolve sound that plays at electronic devices of other users. For example, Alice and Bob talk to each other during a VoIP telephone call. The electronic device of Alice convolves the voice of Bob with her HRTFs and provides this voice as binaural sound that externally localizes to Alice to zone 1 at the front-left of Alice. The electronic device of Alice also convolves the outbound voice of Alice with the HRTFs of Bob, and transmits her convolved voice to the electronic device of Bob that in turn provides her voice to Bob as binaural sound that externally localizes to Bob. The electronic device of Alice thus performs processing tasks for Bob as opposed to the electronic device of Bob performing these processing tasks for Bob, and this processing improves the performance of the device of Bob for execution of Bob's other tasks.

In the example above, the device of Alice convolves her voice to a zone of Bob that Bob designated by prearrangement. Alternatively, Alice selects the zone of Bob from which Bob will localize the voice of Alice. In both cases, Alice and/or Bob are required to complete and confirm the task of making the zone or SLP designation, and this task is bothersome or interruptive to their objective of a mutually binaural conversation. An example embodiment performs tasks of making the selection of the zone of Bob for the voice of Alice and eliminates the need for the participation of Alice and Bob. This process simplifies the establishment of the mutual binaural conversation for Alice and/or Bob and improves the functionality of binaural telephony. For example, the SLP selector makes an intelligent selection based on the localization of the voice of Bob to Alice. For example, the zone 1 at the left-front of Alice is already designated for the localization of the voice of Bob. The SLP selector refers to the localization table to find the coordinates of the voice of Bob relative to Alice and finds that the coordinates are in the zone 1 at the left-front of Alice. With this information, the SLP selector calculates the coordinates of the head of Alice relative to the coordinates of the voice of Bob. The SLP selector assigns these calculated coordinates to the localization of the voice of Alice to Bob. As the voice of Bob localizes to the front-left zone of Alice, the SLP selector sets the coordinates for the voice of Alice for Bob to the calculated coordinates (in this case at the front-left zone of Bob). Bob and Alice experience and understand their complementary positions relative to each other, matching the positional experience of a face-to-face conversation. Carrying out the conversation in a mutually understood face-to-face orientation improves the functionality of their binaural phone conversation. Further, neither Alice nor Bob is prompted or interrupted in the establishment of their conversation owing to the improved functionality that makes such a prompt unnecessary.

In another example embodiment, the SLS predicts SLP movement (e.g., when a user moves his head) and pre-convolves sounds to the predicted SLPs during times of low processor activity. If or when sound is requested at the SLPs, then delivery of the sound is expedited due to the pre-convolution. Localization zones improve performance of pre-convolution. For example, based on recent activity, a predictor indicates that a repeating beep sound at a SLP in a zone 1 will move a distance d within half a meter ($0\ m \le d \le 0.5\ m$), in an unknown direction. The predictor submits tasks to convolve the sound in the multiple directions at the multiple points 0.5 m or less from the SLP. As the direction is unknown, the task includes convolution for multiple points in a sphere with a 1 m diameter. However, the SLP in zone 1 lies on the edge of zone 1 and according to a rule is not permitted to move outside of zone 1. When the SLS receives the convolution tasks specifying coordinates outside of zone 1, the convolution is not performed (due to the rule) and the SLS evaluates a next task. A 50% reduction in convolution is gained in this example where pre-convolution processing is limited to the intersection of predicted points and points of the zone 1 that confine the SLP. Reducing the background pre-convolution activity increases the performance of the foreground real-time binaural sound processing.

The use of zones of localization improves functionality in other ways. Consider an example wherein the user designates common labels to zones (e.g., "business," "personal," etc.) such as designating as "alerts" a zone 1 of forward-looking elevation angles between 45° and 75°. The SLP selector receives a zone request for an incoming call alert. A telephone application sending the zone request follows a convention of specifying the alert zone by the label "alerts" instead of specifying coordinates. The SLP selector, receiving the request, searches the localization table and finds that the user has a zone 1 labeled as "alerts" and so limits the selection of a SLP for the alert to available SLPs included in the zone 1. This example illustrates the following user functionality improvements. The user hears the alert in an expected zone. The user was not required to configure a localization for the alert in or for the telephone application or other applications. In spite of some of the SLPs in the zone 1 being in use, the zone 1 has additional SLPs that are available, avoiding an SLP conflict, and avoiding prompting or involving the user. Further, allowing the provision of labels or tags or categories to zones improves interoperability between software applications and/or users (e.g., the phone application of the user and the phone application of the caller) and thereby improves overall performance of binaural telephony for multiple users and software applications. In addition, since the number of SLPs in a zone is limited, for a zone designated to play sounds that have been localized in the zone before (such as alerts), pre-convolution of the sounds is effective, as well as caching convolutions for the localizations that are frequent. Allowing the provision of labels or tags or categories to zones improves the performance of pre-convolution and eliminates some pre-convolution altogether when the localizations are cached.

Figure 8:
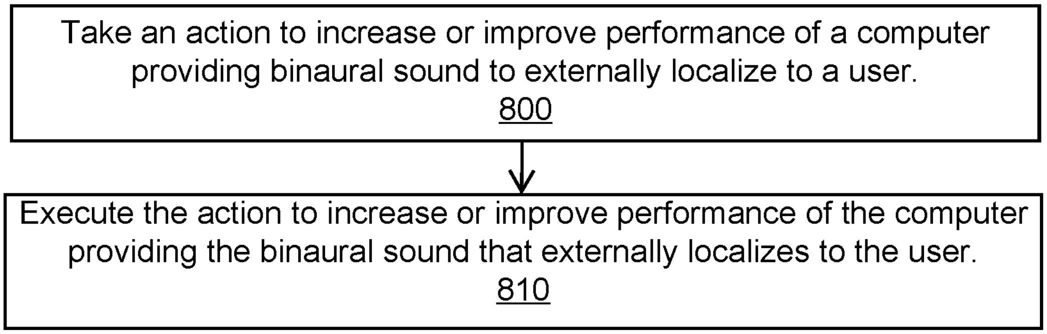
FIG. 8 is a method to execute an action to increase or improve performance of a computer providing binaural sound to externally localize to a user in accordance with an example embodiment.

FIG. 8 is a method to execute an action to increase or improve performance of a computer providing binaural sound to externally localize to a user in accordance with an example embodiment.

Block 800 states take an action to increase or improve performance of a computer providing binaural sound to externally localize to a user.

The computer includes electronic devices such as a computer system or electronic system, wearable electronic devices, servers, portable electronic devices, handheld portable electronic devices, and hardware (e.g., a processor, processing unit, digital signal processor, controller, memory, etc.).

Example actions include, but are not limited to, one or more of the following: storing HRTFs and/or other SLI in cache memory, local memory, or other memory or registers near or close to the processor (e.g., a DSP) executing an example embodiment, mapping and storing coordinates and/or locations of SLPs and/or zones of users so this coordinate information is known in advance (e.g., before sound for a requesting software application convolves to a SLP or zone), storing coordinates and/or locations of SLPs and/or zones in cache memory, local memory, or other memory near or close to the processor (e.g., a DSP) executing an example embodiment, prefetching HRTFs and/or SLI, prefetching coordinates and/or locations of SLPs and/or zones of users, storing HRTFs and/or SLI in a lookup table, storing HRTFs and/or SLI with or as part of an audio file, wirelessly transmitting the HRTFs, SLI, SLPs, and/or zones with or as part of the audio file, predicting where a user will externally localize sound and prefetching or preprocessing HRTFs and/or SLI and coordinates of SLPs and/or zones in response this prediction, configuring specialized or customized hardware to execute one or more of these actions (e.g., configuring logic gates or logic blocks in a FPGA to executes blocks in figures, as opposed to executing software instructions in a processor to execute the blocks in the figures), and taking other actions discussed herein (e.g., with respect to hardware such as the DSP, cache memory, and prefetcher).

Block 810 states execute the action to increase or improve performance of the computer providing the binaural sound that externally localizes to the user.

The action can be executed with software and/or one or more hardware elements, such as a processor, controller, processing unit, digital signal processor, and other hardware (e.g., FPGAs, ASICs, etc.).

As one example, the external location where to localize the sound and/or the SLI are included with the audio file (e.g., in the header, one or more packets being transmitted or received, metadata, or other data or information). This situation reduces processing execution time or processing cycles (e.g., DSP execution times and/or cycles) since the localization information and/or SLI is included with the sound.

Consider an example in which a telephony software application provides users with video chat and voice call services, such as telephone calls or electronic calls. When an electronic device (e.g., a smartphone) of a user receives an incoming call, the call includes coordinate locations where the voice of the caller should localize to the user receiving the call. Furthermore, the incoming call also includes SLI or information to convolve the sound (e.g., HRTFs, ILDs, ITDs). The smartphone simultaneously receives the incoming call and localization information. The smartphone is not required to execute processing steps in determining locations of SLI resources, establishing connections to the resources, and retrieving the SLI data to determine how to convolve the sound. The smartphone is also not required to execute processing to determine where to externally localize the call in binaural sound to the user since the coordinates for the location and/or the SLI are provided together with or included in the sound and/or video data. Further, instead of providing this information as coordinates, the incoming call includes the indication of the location as a zone or SLP such as a label or name or description.

Consider an example of a telephone call in which the electronic device or software application executing the call transmits a call along with one or more of the following: SLPs and/or zones where the caller will localize the voice of the other party or parties to the call, the SLPs and/or zones where the other party or parties to the call will localize the voice of the caller, SLI (e.g., HRTFs, ITDs, and/or ILDs) in order to externally localize the voice of the caller as binaural sound to the party or parties, and SLI (e.g., HRTFs, ITDs, and/or ILDs) in order to externally localize the voice of the party or parties as binaural sound to the caller. Transmission of this information assists in speeding up execution of the telephone call but also provides an information exchange so the electronic devices and/or software programs of the call have shared information on coordinate locations of voices and convolving instructions in the form of SLI. This information, for example, assists in expediting execution of telephone calls in which participants see each other in VR rooms or VR environments.

As another example, the sound or sound file includes sound localization information (SLI) as discussed herein. For example, information being transmitted with the sound includes the sound localization information needed to process or convolve the sound into binaural sound so the binaural sound externally localizes to the listener. For instance, the sound is transmitted with or includes the localization coordinates or zones, and HRTFs, ILDs, and/or ITDs for convolving or processing the sound. This situation reduces processing execution time (e.g., DSP execution times) since SLI for processing and/or convolving the sound is included with the sound (e.g., included with the file or stream header or the beginning of the file, included with handshake or initial transmission of the sound file or audio file/stream/data).

Consider an example in which a music audio file stores or includes SLI. When a user downloads, streams, clicks, or activates the audio file to play the music, this SLI is immediately available since it is included with or is part of the audio file. The software application executing the audio file (e.g., playing the music to the listener) is not required to execute processing steps to determine the location of or assemble the user specific data (e.g., HRTFs). It is also not required to execute processing to determine sound specific and/or localization specific (e.g., HRTF pairs, coordinates, SLPs, zones) data in order to convolve or process the sound so it externally localizes to the listener. Instead, this information is included with, embedded with, packaged with, or is part of the audio file or the information in its transmission.

As yet another example, SLI, SLPs, zones, and/or coordinate information is stored in a lookup table. When a user or software application requests to externally localize sound, the information necessary for determining the sound location or executing the convolution or localization is retrieved from the lookup table. A lookup table is an array that replaces runtime computation with an array indexing operation in order to expedite processing time. For example, the lookup table stores the HRTFs, ILD, ITD, and/or coordinates of the SLP and thus saves execution of a computation or input/output (I/O) operation.

For example, the lookup table is stored as a file or component of a file or data stream. Alternatively, the file also includes the sound, such as the sound data and/or a pointer to a location of the sound or sound data and/or other sounds. For example, the file includes the sound data and also includes a URL to the sound data stored in a separate location. As another example, the lookup table included in the data or sound stream includes a pointer to or identification of the sound (e.g. a filename such as a local filename). In this example, an application or a process executing the sound localization operating on the computer system or electronic device receives the lookup table with the SLI at the start of the transmission of the stream. In the event of network congestion or fault, the application refers to the pointer in order to find an alternate source of the sound or sound data. The application continues to localize the sound retrieved from the alternate source without relying on the timely delivery of the sound from the stream. In addition, the application fetches the sound data from the alternate source in advance of the playing of the sound in order to pre-convolve the sound and/or analyze the sound to improve the performance of the delivery of localized sound to the user. This prefetched data can also be cached, such as caching in L1 or L2 memory.

As yet another example, a 3D area away from a user includes tens, hundreds, or thousands of SLPs. Retrieving and processing such a large number of SLPs and associated sound localization information are process intensive, are process expensive, and consume local memory space. SLPs and sound localization information in a restricted zone or area are ignored in order to significantly reduce process execution steps and time. For instance, SLPs in and/or sound localization information for an active or predicted zone for an executing software application (or software application about to execute) are prefetched and/or preprocessed. SLPs and/or sound localization information are not prefetched when a determination is made that they exist in an inactive zone, a restricted zone, or a zone to which the software application is not localizing sound, is not predicted or permitted to localize sound, or will not localize sound.

Consider an example in which a user previously provided instructions or commands to externally localize a voice in a telephone call or VR software game to SLP 1 and SLP 7. When the user executes the telephone application or VR software game, the application prefetches SLI for SLP 1 and SLP 7 before the user makes a command or a request that requires this information. If the user thereafter instructs or commands to externally localize the voice to SLP 1 or SLP 7, then this information is already retrieved and preprocessed to expedite convolution of the voice. For example, the SLP selector queries a localization log to find prior localization instances of localization to SLP 1 and SLP 7, and retrieves the SLI associated with those instances such as the HRTFs or HRTF pairs and/or the sound or resource reference or link to the sound. The SLP selector retrieves the sound for preprocessing. The SLP selector also retrieves the HRTFs, parses the HRTFs for the HRTF pairs that were used in the instance, and processes the HRTF pairs in the preprocessing.

Figure 9:
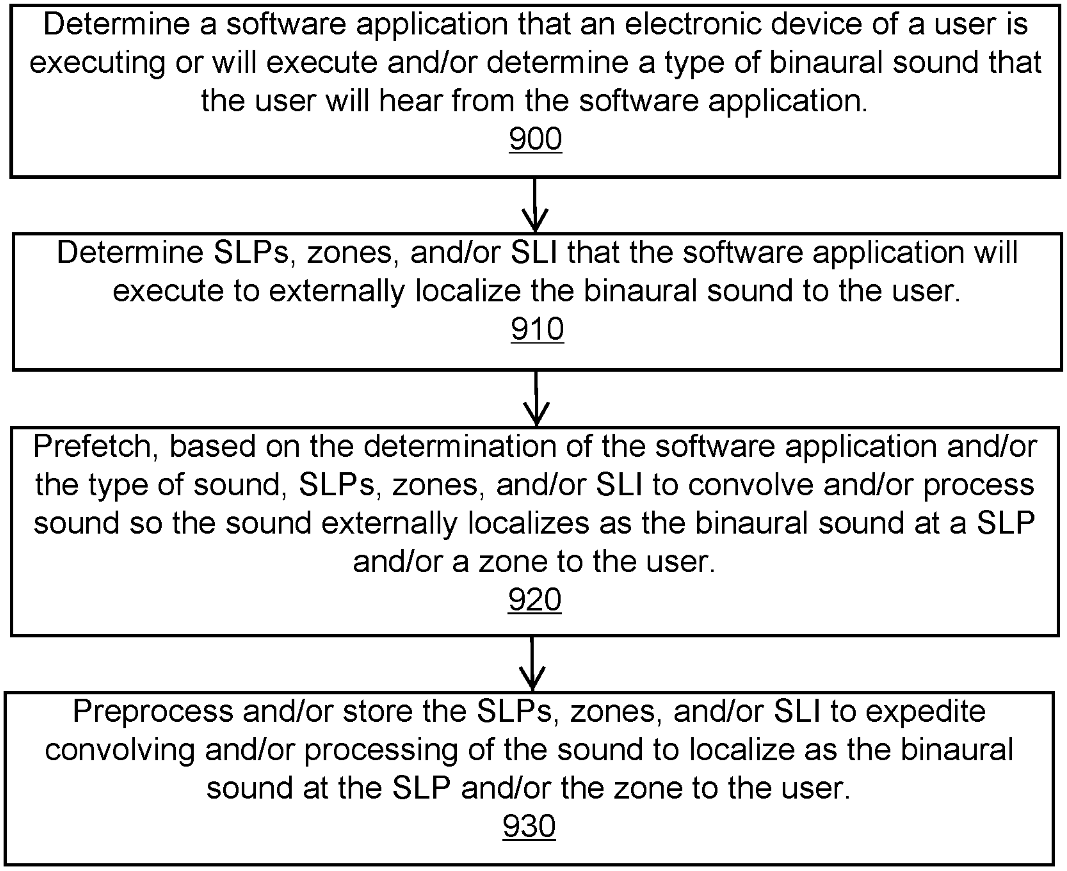
FIG. 9 is a method to increase or improve performance of a computer by expediting convolving and/or processing of sound to localize at a SLP in accordance with an example embodiment.

FIG. 9 is a method to increase or improve performance of a computer by expediting convolving and/or processing of sound to localize at a SLP in accordance with an example embodiment.

Block 900 states determine a software application that an electronic device of a user is executing or will execute and/or determine a type of binaural sound that the user will hear from the software application.

By way of example, this determination includes, but is not limited to, one or more of the following: what software application is currently executing on the electronic device (e.g., a user opens, in a smartphone, a messaging application that provides binaural sound to the user), what type of binaural sound the user is currently hearing with the software application (e.g., voice, music, voice and music, segmented audio or diarized audio, recorded binaural sound, streaming binaural sound, convolved binaural sound, unconvolved binaural sound that requires convolution, mono sound convolved to binaural sound, stereo sound convolved to binaural sound, etc.), what type of binaural sound the user previously or historically heard with the software application, what type of binaural sound other users heard with the software application, what type of binaural sound the software application can execute and/or provide to the user, what software application is stored on the electronic device (e.g., what software applications that externally localize binaural sound to the user), what window is open or active or has focus on the electronic device (e.g., a user moves a window from a background to a foreground on a display for a HMD or HPED), what software application is making a request to the electronic device (e.g., the user receives a phone call on a VoIP software application that externally localizes voices in binaural sound), what information or data is being transmitted to or transmitted from the electronic device (e.g., a WED of the user downloads a file that includes binaural sound), a time of day or date (e.g., binaural sound is scheduled to externally localize to the user at a known time in the future), a geographical location (e.g., the user is walking toward a store location that provides advertisements in binaural sound to users passing-by), a command or request to another electronic device or another software application (e.g., a user makes a verbal command to an IPA executing on a smart speaker and the smart speaker will provide a response in binaural sound to earphones of the user), and other examples discussed herein.

Block 910 states determine SLPs, zones, and/or SLI that the software application will execute to externally localize the binaural sound to the user.

An example embodiment assigns or designates one or more SLPs, zones, and/or other SLI to software applications. These assignments or designations and accompanying information are retrieved from memory or otherwise obtained (e.g., received over a wired or wireless transmission, received from a file, received from a software application, etc.).

Block 920 states prefetch, based on the determination of the software application and/or the type of sound, SLPs, zones, and/or SLI to convolve and/or process sound so the sound externally localizes as the binaural sound at a SLP and/or a zone to the user.

By way of example, the SLPs, zones, and/or SLI include, but are not limited to, one or more of HRTFs, HRIRs, RIRs, SLPs, BR IRs, user preferences for SLPs, coordinate locations of the SLP and/or zone, user preferences of SLPs and/or zones, and other information (such as information discussed in connection with information about sound and sound localization information).

Block 930 states preprocess and/or store the SLPs, zones, and/or SLI to expedite convolving and/or processing of the sound to localize as the binaural sound at the SLP and/or the zone to the user.

In an example embodiment, a processor or preprocessor executes or processes the data relating to sound localization of binaural sound (e.g., SLPs, zones, and/or SLI).

A preprocessor is a program that processes the retrieved data to produce output that is used as input to another program. This output can be generated in anticipation of the use of the output data. For example, an example embodiment predicts a likelihood of requiring the output data for binaural sound localization and preprocesses the data in anticipation of a request for the data. For instance, the program retrieves one or more files including HRTF pairs and extracts data from the files that will be used to convolve the sound to localize as binaural sound at a location specified with the HRTF pair data. This extracted or preprocessed data is quickly or more efficiently provided to a DSP in the event the sound is convolved with the HRTF pair.

This preprocessing also includes multiple different SLPs that are anticipated or predicted to be used by a software application. For example, a user dons a HMD and activates a conference calling VR program that enables the user to execute telephone calls in a VR environment. An example embodiment reviews SLPs that were previously used by the VR program and retrieves SLI so sound can be convolved and localized to these SLPs. The retrieval of this binaural sound information occurs before a request is made for binaural sound to localize to a SLP.

As another example, the processor requests a data block (or an instruction block) from main memory before the data block is actually needed. The data block is placed or stored in cache memory or local memory so the data is quickly accessed and processed to externally localize binaural sound to the user. Prefetching of this data reduces latency associated with memory access. This data block includes SLPs, zones, and/or SLI. For example, the data block includes coordinate locations of one or more SLPs and HRTFs, ITDs, and/or ILDs for the SLPs at these coordinate locations and coordinates that define zones.

Consider an example in which the location of the user with respect to an object is used to prefetch data. For example, a user is 1.5 meters away from an object or other external localization point that might serve as a SLP for a telephone call, game, voice of an IPA. The object is at a same elevation as a head of the user. This distance of 1.5 meters remains relatively fixed, though the head orientation of the user changes or moves. In response to this information, the system prefetches SLPs and corresponding HRTF pairs that have a distance of 1.5 meters with an elevation of zero degrees. For example, the system prefetches SLPs and/or HRTFs corresponding to (1.5 m, X°, 0°), where X is an integer. Here, the X represents different azimuth angles to which the user might move his or her head when sound convolving commences. For instance, the system retrieves HRTF data corresponding to (1.5 m, 0°, 0°), (1.5 m, 5°, 0°), (1.5 m, 10°, 0°), (1.5 m, 15°, 0°), . . . (1.5 m, 355°, 0°). Alternatively, the system retrieves other azimuth intervals, such as retrieving HRTF data for every 3°, 6°, 10°, 15°, 20°, or 25°. When convolution commences, the data for the particular azimuth angle has already been retrieved and is available in cache or local memory for the processor to quickly expedite convolution of the sound.

Consider an example in which a user has a smart speaker that includes a VPA or an intelligent personal assistant (named Hal) that answers questions and performs other tasks via a natural language user interface and speaker located inside the smart speaker. When the user is proximate to the smart speaker, the user can ask Hal questions (e.g., What time is it?) or ask Hal to play music (e.g., Play Beethoven). Sound emanates from one or more speakers in the smart speaker so the user can hear the answer, listen to music, etc. When the user wears wireless earphones, however, the sound does not emanate from speakers located inside the smart speaker. Instead, the sound is provided to the user through the earphones, and the sound convolves such that it externally localizes at the location of the smart speaker. In this instance, speakers in the smart speaker actually do not play any sound. Instead, the sound is convolved to a SLP located at the physical object, which is the smart speaker itself. The sound is also convolved to externally localize at other SLPs, such as SLPs in 3D space around the user or other SLPs or zones discussed herein.

Consider further this example of the smart speaker with an IPA named Hal. When the user wears wireless earphones and walks into the room near the smart speaker, the computer system recognizes that sound will be provided through the earphones and not through the speaker of the smart speaker. Even though the user has not yet made a verbal request or command to Hal, the computer system (or an electronic device on the user, such as smartphone) tracks a location of the user with respect to the smart speaker and retrieves sound data based on this location information. For example, this sound data includes a volume of sound to provide to the user based on the distance, an azimuth and/or elevation angle of the user with respect to the fixed location of the smart speaker, HRTF pairs that are specific to or individualized to the user, and/or information about coordinates, SLPs, and/or zones where sound from the IPA such as the voice of Hal can or might localize to the user. This information is stored in a cache with or near the DSP. If the user makes a verbal request to Hal (e.g., What time is it?), the distance/SLP and HRTF data are already retrieved and cached. In this instance, a cache hit occurs since the requested data to convolve the sound has already been retrieved. The DSP quickly convolves the data based on the location of the user with respect to the smart speaker so the voice of Hal localizes to the physical speaker of the smart speaker. By way of example, the DSP includes a Harvard architecture or modified Harvard architecture with shared L2, split L1!-cache and/or D-cache to store the cached data.

Consider further this example of the smart speaker with an IPA, Hal. As the user walks around a room where the smart speaker is located, a head orientation of the user is continually or continuously tracked with respect to the physical location of the smart speaker. This head orientation includes an azimuth angle to the smart speaker, an elevation angle to the smart speaker, and a distance from the head of the user to the smart speaker. Sound localization information (e.g., including a HRTF pair) is continuously or continually retrieved for each new head orientation. For instance, the coordinates of the HRTF pair match or correspond to the azimuth angle, elevation angle, and distance of the smart speaker with respect to the head orientation of the user. If the user asks Hal a question at any moment in time, the corresponding SLI is already retrieved so that the voice of Hal can be convolved according to the current head orientation of the listener.

For instance, electronic earphones on the user provide the voice of Hal such that the voice originates from the location of the smart speaker even though the speakers inside the smart speaker are not providing the voice response. Instead, the earphones provide the voice response to the user who hears the voice of Hal as originating from the location of the smart speaker.

Figure 10:
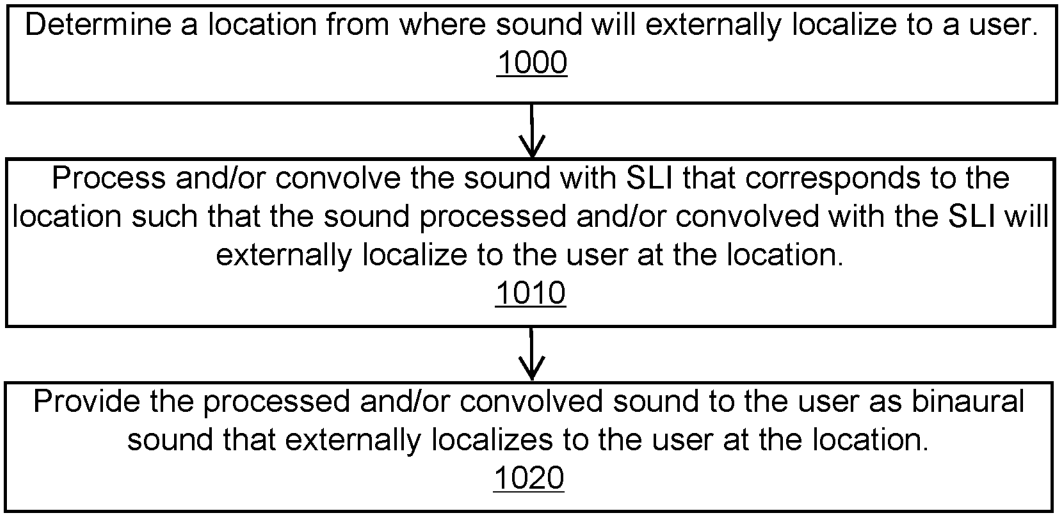
FIG. 10 is a method to process and/or convolve sound so the sound externally localizes as binaural sound to a user in accordance with an example embodiment.

FIG. 10 is a method to process and/or convolve sound so the sound externally localizes as binaural sound to a user in accordance with an example embodiment.

Block 1000 states determine a location from where sound will externally localize to a user.

Binaural sound localizes to a location in 3D space to a user. This location is external to and away from the body of the user.

An electronic device, software application, and/or a user determines the location for a user who will hear the sound produced in his physical environment or in an augmented reality (AR) environment or a virtual reality (VR) environment. The location can be expressed in a frame of reference of the user (e.g., the head, torso, or waist), the physical or virtual environment of the user, or other reference frames. Further, this location can be stored or designated in memory or a file, transmitted over one or more networks, determined during and/or from an executing software application, or determined in accordance with other examples discussed herein. For example, the location is not previously known or stored but is calculated or determined in real-time. As another example, the location of the sound is determined at a point in time when a software application makes a request to externally localize the sound to the user or executes instructions to externally localize the sound to the user. Further, the location can be in empty or unoccupied 3D space or in 3D space occupied with a physical object or a virtual object.

The location where to localize the sound can also be stored at and/or originate from a physical object or electronic device that is separate from the electronic device providing the binaural sound to the user (e.g., separate from the electronic earphones, HMD, WED, smartphone, or other PED with or on the user). For instance, the physical object is an electronic device that wirelessly transmits its location or the location where to localize sound to the electronic device processing and/or providing the binaural sound to the user. Alternatively, the physical object can be a non-electronic device (e.g., a teddy bear, a chair, a table, a person, a picture in a picture frame, etc.).

Consider an example in which the location is at a physical object (as opposed to the location being in empty space). In order to determine a location of the physical object and hence the location where to localize the sound, the electronic system executes or uses one or more of object recognition (such as software or human visual recognition), an electronic tag located at the physical object (e.g., RFID tag), global positioning satellite (GPS), indoor positioning system (IPS), Internet of things (loT), sensors, network connectivity and/or network communication, or other software and/or hardware that recognize or locate a physical object.

Zones can be defined in terms of one or more of the locations of the objects, such as a zone defined by points within a certain distance from the object or objects, a linear zone defined by the points between two objects, a surface or 2D zone defined by points within a perimeter having vertices at three or more objects, a 3D zone defined by points within a volume having vertices at four or more objects, etc. Some of the discussed methods and other methods for determining the location of objects determine a location of objects as well as locations near the object location to varying distances. The data that describes the nearby locations can be used to define a zone. For example, a sensor measures the strength of radio signals in an area. A software application analyzes the sensor data and determines two maximum measured strengths at (0, 0, 0), and (0, 1, 0) that correspond to the locations of two signal emitters. The software application reports the two coordinates to the SLP selector, and the SLP selector designates the two coordinates as two SLPs. The SLP selector requests a zone instead of SLP coordinates. In response to the request, the software application analyzes the sensor data and returns the coordinates corresponding to signal strengths of 85% of the maximum strength. The coordinates form a shape of two intersecting spheres, and this shape, the volume enclosed by the two spheres, defines the zone.

Additionally, the location may be in empty space but based on a location of a physical object. For example, the location in empty space is next to or near a physical object (e.g., within an inch, a few inches, a foot, a few feet, a meter, a few meters, etc. of the physical object). The physical object can thus provide a relative location or known location for the location in empty space since the location in empty space is based on a relative position with respect to the physical object.

Consider an example in which the physical object transmits a GPS location to a smartphone or WED of a user. The smartphone or WED includes hardware and/or software to determine its own GPS location and a point of direction or orientation of the user (e.g., a compass direction where the smartphone or WED is pointed or where the user is looking or directed, such as including head tracking). Based on this GPS and directional information, the smartphone or WED calculates a location proximate to the physical object (e.g., away from but within one meter of the physical object). This location becomes the SLP. The smartphone or WED retrieves SLI corresponding to, matching or approximating this SLP, convolves the sound with this SLI, and provides the convolved sound as binaural sound to the user so the binaural sound localizes to the SLP that is proximate to the physical object.

Location can include a general direction, such as to the right of the listener, to the left of the listener, above the listener, behind the listener, in front of the listener, etc. Location can be more specific, such as including a compass direction, an azimuth angle, an elevation angle, a coordinate location (e.g., an X-Y-Z coordinate), or an orientation. Location can also include distance information that is specific or general. For example, specific distance information would be a number, such as 1.0 meters, 1.1 meters, 1.2 meters, etc. General distance information would be less specific or include a range, such as the distance being near-field, the distance being far-field, the distance being greater than one meter, the distance being less than one meter, the distance being between one to two meters, etc.

As one example, a PED (such as a HPED, or a WED) communicates with the physical object using radio frequency identification (RFID) or near-field communication (NFC). For instance, the PED includes a RFID reader or NFC reader, and the physical object includes a passive or active RFID tag or a NFC tag. Based on this communication, the PED determines a location and other information of the physical object with respect to the PED.

As another example, a PED reads or communicates with an optical tag or quick response (QR) code that is located on or near the physical object. For example, the physical object includes a matrix barcode or two-dimensional bar code, and the PED includes a QR code scanner or other hardware and/or software that enables the PED to read the barcode or other type of code.

As another example, the PED includes Bluetooth low energy (BLE) hardware or other hardware to make the PED a Bluetooth enabled or Bluetooth Smart device. The physical object includes a Bluetooth device and a battery (such as a button cell) so that the two enabled Bluetooth devices (e.g., the PED and the physical object) wirelessly communicate with each other and exchange information.

As another example, the physical object includes an integrated circuit (IC) or system on chip (SoC) that stores information and wirelessly exchanges this information with the PED (e.g., information pertaining to its location, identity, angles and/or distance to a known location, etc.).

As another example, the physical object includes a low energy transmitter, such as an iBeacon transmitter. The transmitter transmits information to nearby PEDs, such as smartphones, tablets, WEDs, and other electronic devices that are within a proximity of the transmitter. Upon receiving the transmission, the PED determines its relative location to the transmitter and determines other information as well.

As yet another example, an indoor positioning system (IPS) locates objects, people, or animals inside a building or structure using one or more of radio waves, magnetic fields, acoustic signals, or other transmission or sensory information that a PED receives or collects. In addition to or besides radio technologies, non-radio technologies can be used in an IPS to determine position information with a wireless infrastructure. Examples of such non-radio technology include, but are not limited to, magnetic positioning, inertial measurements, and others. Further, wireless technologies can generate an indoor position and be based on, for example, a Wi-Fi positioning system (WPS), Bluetooth, RFID systems, identity tags, angle of arrival (AoA, e.g., measuring different arrival times of a signal between multiple antennas in a sensor array to determine a signal origination location), time of arrival (ToA, e.g., receiving multiple signals and executing trilateration and/or multi-lateration to determine a location of the signal), received signal strength indication (RSSI, e.g., measuring a power level received by one or more sensors and determining a distance to a transmission source based on a difference between transmitted and received signal strengths), and ultra-wideband (UWB) transmitters and receivers. Object detection and location can also be achieved with radar-based technology (e.g., an object-detection system that transmits radio waves to determine one or more of an angle, distance, velocity, and identification of a physical object).

One or more electronic devices in the IPS, network, or electronic system collect and analyze wireless data to determine a location of the physical object using one or more mathematical or statistical algorithms. Examples of such algorithms include an empirical method (e.g., k-nearest neighbor technique) or a mathematical modeling technique that determines or approximates signal propagation, finds angles and/or distance to the source of signal origination, and determines location with inverse trigonometry (e.g., trilateration to determine distances to objects, triangulation to determine angles to objects, Bayesian statistical analysis, and other techniques).

The PED determines information from the information exchange or communication exchange with the physical object. By way of example, the PED determines information about the physical object, such as a location and/or orientation of the physical object (e.g., a GPS coordinate, an azimuth angle, an elevation angle, a relative position with respect to the PED, etc.), a distance from the PED to the physical object, object tracking (e.g., continuous, continual, or periodic tracking of movements or motions of the PED and/or the physical object with respect to each other), object identification (e.g., a specific or unique identification number or identifying feature of the physical object), time tracking (e.g., a duration of communication, a start time of the communication, a stop time of the communication, a date of the communication, etc.), and other information.

As yet another example, the PED captures an image of the physical object and includes or communicates with object recognition software that determines an identity and location of the object. Object recognition finds and identifies objects in an image or video sequence using one or more of a variety of approaches, such as edge detection or other CAD object model approach, a method based on appearance (e.g., edge matching), a method based on features (e.g., matching object features with image features), and other algorithms.

In an example embodiment, the location or presence of the physical object is determined by an electronic device (such as a HPED, or PED) communicating with or retrieving information from the physical object or an electronic device (e.g., a tag) attached to or near the physical object.

In another example embodiment, the electronic device does not communicate with or retrieve information from the physical object or an electronic device attached to or near the physical object (e.g., retrieving data stored in memory).

Instead, the electronic device gathers location information without communicating with the physical object or without retrieving data stored in memory at the physical object.

As one example, the electronic device captures a picture or image of the physical object, and the location of the object is determined from the picture or image. For instance, when a size of a physical object is known, distance to the object can be determined by comparing a relative size of the object in the image with the known actual size.

As another example, a light source in the electronic device bounces light off the object and back to a sensor to determine the location of the object.

As yet another example, the location of the physical object is not determined by communicating with the physical object. Instead, the electronic device or a user of the electronic device selects a direction and/or distance, and the physical object at the selected direction and/or distance becomes the selected physical object. For example, a user holds a smartphone and points it at a compass heading of 270° (East). An empty chair is located along this compass heading and becomes the designated physical object since it is positioned along the selected compass heading.

Consider another example in which the physical object is not determined by communicating with the physical object. An electronic device (such as a smartphone) includes one or more inertial sensors (e.g., an accelerometer, gyroscope, and magnetometer) and a compass. These devices enable the smartphone to track a position and/or orientation of the smartphone. A user or the smartphone designates and stores a certain orientation as being the location where sound will localize. Thereafter, when the orientation and/or position changes, the smartphone tracks a difference between the stored designated location and the changed position (e.g., its current position).

Consider another example in which an electronic device captures video with a camera and displays this video in real time on the display of the electronic device. The user taps or otherwise selects a physical object shown on the display, and this physical object becomes the designated object. The electronic device records a picture of the selected object and orientation information of the electronic device when the object is selected (e.g., records an X-Y-Z position, and a pitch, yaw and roll of the electronic device).

As another example, a three-dimensional (3D) scanner captures images of a physical object or a location (such as one or more rooms), and three-dimensional models are built from these images. The 3D scanner creates point clouds of various samples on the surfaces of the object or location, and a shape is extrapolated from the points through reconstruction. A point cloud can define the zone. The extrapolated 3D shape can define a zone. The 3D generated shape or image includes distances between points and enables extrapolation of 3D positional information for each object or zone. Examples of non-contact 3D scanners include, but are not limited to, time-of-flight 3D scanners, triangulation 3D scanners, and others.

Block 1010 states process and/or convolve the sound with SLI that corresponds to the location such that the sound processed and/or convolved with the SLI will externally localize to the user at the location.

By way of example, the sound localization information (SLI) are retrieved, obtained, or received from memory, a database, a file, an electronic device (such as a server, cloud-based storage, or another electronic device in the computer system or in communication with a PED providing the sound to the user through one or more networks), etc. For instance, this information includes one or more of HRTFs, ILDs, ITDs, and/or other information discussed herein. As noted, this information can also be calculated in real-time.

An example embodiment processes and/or convolves sound with the SLI so the sound localizes to a particular area or point with respect to a user. The SLI required to process and/or convolve the sound is retrieved or determined based on a location of the SLP. For example, if the SLP is located one meter in front of a face of the listener and slightly off to a right side of the listener, then an example embodiment retrieves the corresponding HRTFs, ITDs, and ILDs and convolves the sound to this location. The location can be more specific, such as a precise spherical coordinate location of (1.2 m, 25°, 15°), and the HRTFs, ITDs, and ILDs are retrieved that correspond to this location. For instance, the retrieved HRTFs have a coordinate location that matches or approximates the coordinate location of the location where sound is desired to originate to the user. Alternatively, the location is not provided but the SLI is provided (e.g., a software application provides the DSP with the HRTFs and other information to convolve the sound).

A central processing unit (CPU), processor (such as a digital signal processor or DSP), or microprocessor processes and/or convolves the sound with the SLI, such as a pair of head related transfer functions (HRTFs), ITDs, and/or ILDs so the sound localizes to a zone or SLP. For example, the sound localizes to a specific point (e.g., localizing to point (R, θ, φ)) or a general location or area (e.g., localizing to far-field location (θ, φ) or near-field location (θ, φ)). As an example, a lookup table that stores a HRTF includes a field/column for HRTF pairs and includes a column that specifies the coordinates associated with each pair, and the coordinates indicate the location for the origination of the sound. These coordinates can include a distance (R) or near-field or far-field designation, an azimuth angel (θ), and/or an elevation angle (φ).

The complex and unique shape of the human pinnae transforms sound waves through spectral modifications as the sound waves enter the ear. These spectral modifications are a function of the position of the source of sound with respect to the ears along with the physical shape of the pinnae that together cause a unique set of modifications to the sound called head related transfer functions or HRTFs. A unique pair of HRTFs (one for the left ear and one for the right ear) can be modeled or measured for each position of the source of sound with respect to a listener. A HRTF is a function of frequency (f) and three spatial variables, by way of example (r, θ, ϕ)) in a spherical coordinate system. Here, r is the radial distance from a recording point where the sound is recorded or a distance from a listening point where the sound is heard to an origination or generation point of the sound; θ (theta) is the azimuth angle between a forward-facing user at the recording or listening point and the direction of the origination or generation point of the sound relative to the user; and ϕ (phi) is the polar angle, elevation, or elevation angle between a forward-facing user at the recording or listening point and the direction of the origination or generation point of the sound relative to the user. By way of example, the value of (r) can be a distance (such as a numeric value) from an origin of sound to a recording point (e.g., when the sound is recorded with microphones) or a distance from a SLP to a head of a listener (e.g., when the sound is generated with a computer program or otherwise provided to a listener).

When the distance (r) is greater than or equal to about one meter (1 m) as measured from the capture point (e.g., the head of the person) to the sound source, the sound attenuates inversely with the distance. One meter or thereabout defines a practical boundary between near field and far field distances and corresponding HRTFs. A "near field" distance is one measured at about one meter or less; whereas a "far field" distance is one measured at about one meter or more. Example embodiments can be implemented with near field and far field distances.

The coordinates for external sound localization can be calculated or estimated from an interaural time difference (ITD) of the sound between two ears. ITD is related to the azimuth angle according to, for example, the Woodworth model that provides a frequency independent ray tracing methodology. The model assumes a rigid, spherical head and a sound source at an azimuth angle. The time delay varies according to the azimuth angle since sound takes longer to travel to the far ear. The ITD for a sound source located on a right side of a head of a person is given according to two formulas:

$$ITD=(a/c)[\theta+\sin(\theta)] \text{ for situations in which } 0\leq\theta\pi/2;$$

and $$ITD=(a/c)[\pi-\theta+\sin(\theta)] \text{ for situations in which } \pi/2\leq\theta\leq\pi,$$

where θ is the azimuth in radians (0≤θ≤π), a is the radius of the head, and c is the speed of sound. The first formula provides the approximation when the origin of the sound is in front of the head, and the second formula provides the approximation when the origin of the sound is in the back of the head (i.e., the azimuth angle measured in degrees is greater than)±90°).

By way of example, the coordinates (r, 0, (I)) for external sound localization can also be calculated from a measurement of an orientation of and a distance to the face of the person when the HRIRs are captured.

The coordinates can also be calculated or extracted from one or more HRTF data files, for example by parsing known HRTF file formats, and/or HRTF file information. For example, HRTF data is stored as a set of angles that are provided in a file or header of a file (or in another predetermined or known location of a file or computer readable medium). This data can include one or more of time domain impulse responses (FIR filter coefficients), filter feedback coefficients, and an ITD value. This information can also be referred to as "a" and "b" coefficients. By way of example, these coefficients can be stored or ordered according to lowest azimuth to highest azimuth for different elevation angles. The HRTF file can also include other information, such as the sampling rate, the number of elevation angles, the number of HRTFs stored, ITDs, a list of the elevation and azimuth angles, a unique identification for the HRTF pair, and other information. This data can be arranged according to one or more standard or proprietary file formats, such as AES69 or a panorama file format, and extracted from the file.

The coordinates and other HRTF information are calculated or extracted from the HRTF data files. A unique set of HRTF information (including r, θ, ϕ) is determined for each unique HRTF.

The coordinates and other HRTF information are also stored in and retrieved from memory, such as storing the information in a look-up table. This information is quickly retrieved to enable real-time processing and convolving of sound using HRTFs and hence improves computer performance of execution of binaural sound.

The SLP represents a location where a person will perceive an origin of the sound. For an external localization, the SLP is away from the person (e.g., the SLP is away from but proximate to the person or away from but not proximate to the person). The SLP can also be located inside the head of the person.

A location of the SLP corresponds to the coordinates of one or more pairs of HRTFs. For example, the coordinates of or within a SLP or a zone match or approximate the coordinates of a HRTF. Consider an example in which the coordinates for a pair of HRTFs are (r, θ, ϕ) and are provided as (1.2 meters, 35°10°. A corresponding SLP or zone for a person thus includes (r, θ, ϕ), provided as (1.2 meters, 35°, 10°). In other words, the person will localize the sound as occurring 1.2 meters from his or her face at an azimuth angle of 35° and at an elevation angle of 10° taken with respect to a forward looking direction of the person. In this example, the coordinates of the SLP and HRTF correspond or match.

The coordinates for a SLP can also be approximated or interpolated based on known data or known coordinate locations. For example, a SLP is desired for coordinate location (2.0 m, 0°, 40°), but HRTFs for this location are not known. HRTFs are known for two neighboring locations, such as known for (2.0 m, 0°, 35°) and (2.0 m, 0°, 45°), and the HRTFs for the desired location of (2.0 m, 0°40°) are approximated from the two known locations. These approximated HRTFs are provided as the SLP desired for the coordinate location (2.0 m, 0°, 40°).

The SLP represents a location where the person will perceive an origin of the sound. Example embodiments designate or include an object at this SLP. For an external localization, the SLP is away from the person (e.g., the SLP is away from but proximate to the person or away from but not proximate to the person).

The SLP can also be located inside the head of the person (e.g., when sound is provided to the listener in stereo or mono sound).

Listeners may not localize sound to an exact or precise location or a location that corresponds with an intended location. In some instances, the location where the computer system or electronic device convolves the sound may not align with or coincide with the location where the listener perceives the source of the sound. For example, the computer-generated SLP may not align with the SLP where the listener localizes the origin of the sound. For example, a listener commands a software application or a process to localize a sound to a SLP having coordinates (2 m, 45°, 0°), but the listener perceives the sound farther to his right at 55° azimuth. This difference in location or error may be slight (e.g., one or two degrees in azimuth and/or elevation) or may be greater.

Consider an example in which the relative coordinates between the physical object and a head orientation of the listener are as follows: the distance from the listener to the physical object is two meters (R=2.0 m); the azimuth angle between the head orientation of the listener and the physical object is twenty-five degrees (θ=25°); and the elevation angle between the head orientation of the listener and the physical object is zero degrees (φ=0°). The computer system or an electronic device in the computer system retrieves or receives a HRTF pair that has an associated sound localization point or SLP of (R, θ, φ)=(2.0 m, 25°, 0°). When sound is convolved with this HRTF pair, the sound will localize to the listener to the SLP at (2.0 m, 25°, 0°).

Block 1020 states provide the processed and/or convolved sound to the user as binaural sound that externally localizes to the user at the location.

Binaural sound can be provided to the listener through bone conduction headphones, speakers of a wearable electronic device (e.g., headphones, earphones, electronic glasses, head mounted display, smartphone, etc.), or the binaural sound can be processed for crosstalk cancellation and provided through other types of speakers (e.g., dipole stereo speakers).

From the point-of-view of the listener, the sound originates or emanates from the object, point, area, or location that corresponds with the SLP. For example, an example embodiment selects a SLP location at, on, or near a physical object, a VR object, or an AR object. When the sound is convolved with the HRTFs corresponding with the SLP, then the sound appears to originate to the listener at the object.

When binaural sound is provided to the listener, the listener will hear the sound as if it originates from the object (assuming an object is selected for the SLP). The sound, however, does not actually originate from the object since the object may be an inanimate object with no electronics or an animate object with no electronics. Alternatively, the object could have electronics but not have the capability to generate sound (e.g., the object has no speakers or sound system). As yet another example, the object could have speakers and the ability to provide sound but is not actually providing sound to the listener. In each of these examples, the listener perceives the sound to originate from the object, but the object does not produce the sound. Instead, the sound is altered or convolved and provided to the listener so the sound appears to originate from the object.

Other technical problems exist with binaural sound, such as how to divide or partition 2D and/or 3D space around a user. How many zones should this space or area include? What sizes should these zones have? What shapes should these zones have? What should be the origin of these zones? What types of sound or software applications should be assigned or designated to the space or area?

Another problem is that listeners may not like or can confuse different sounds if SLPs of these different sounds are too close together. Further, a listener can fail to localize multiple sounds or sounds with differing characteristics when localized to a matching or near matching location. This situation can occur when the relative azimuth and/or elevation distance between two SLPs is too small.

Example embodiments provide solutions to these problems and many others.

These example embodiments not only solve these problems but also improve execution and/or convolution of binaural sound to externally localize to one or more SLPs that are in 3D space around a listener.

FIGS. 11-13 show examples of different SLPs and/or zones that include one or more SLPs. For illustration, a head of a user is positioned at an origin of the coordinate system or location, but example embodiments are not limited to positioning the head of the user at this location. FIGS. 11 and 12 show SLPs and/or zones in a polar coordinate system, but other coordinates systems can be used as well (such as spherical coordinate system, Cartesian coordinate system, etc.). Further, for illustration, some drawings illustrate a clockwise rotation with zero degrees (0°) representing a line-of-sight or direction that a user is facing. Further, when specific values for (r, θ, φ) are provided, example embodiments also include values for about (r, θ, φ).

Figure 11A:
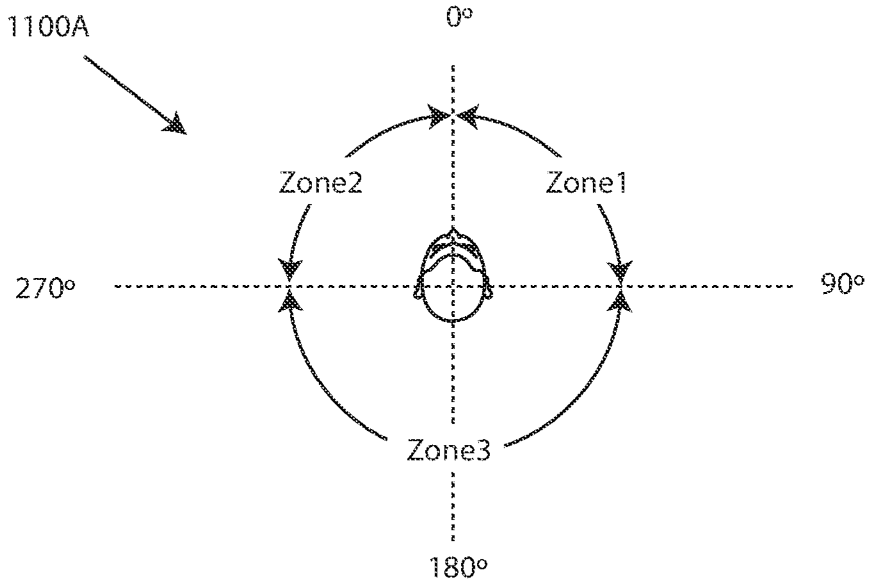
FIGS. 11A-11E show a coordinate system with a plurality of zones having different azimuth coordinates in accordance with an example embodiment.

FIG. 11A shows a coordinate system 1100A with a plurality of zones having different azimuth coordinates in accordance with an example embodiment. By way of example, three zones with different coordinates are shown. These zones include the following:

Zone 1: $\theta=0^\circ$ to $90\pi$ or $0^\circ\le\theta\le 90^\circ$;

Zone 2: $\theta=270^\circ$ to $360^\circ$ or $270^\circ\le\theta\le 360^\circ$; and Zone 3: $\theta=90^\circ$ to $270^\circ$ or $90^\circ\le\theta\le 270^\circ$.

Figure 11B:
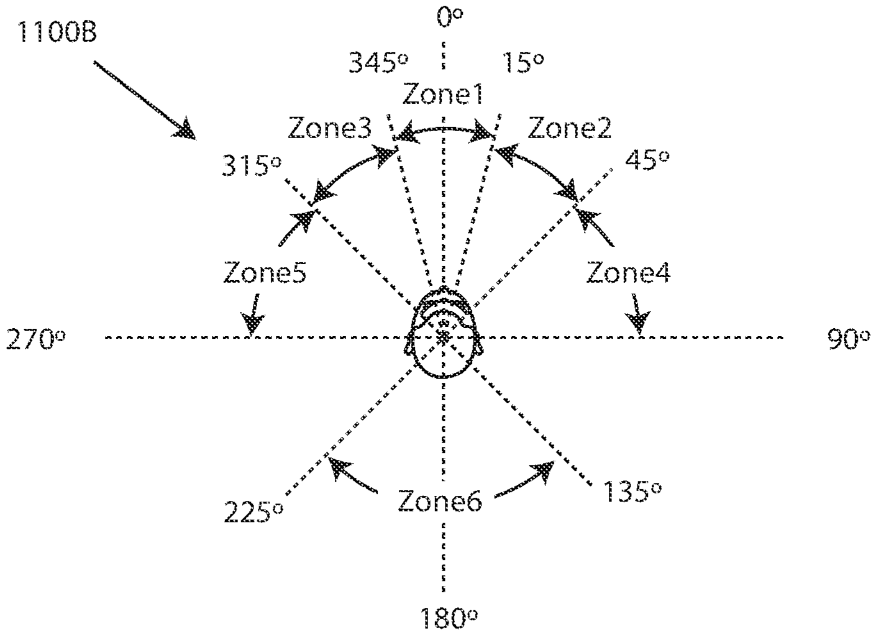

FIG. 11B shows a coordinate system 1100B with a plurality of zones having different azimuth coordinates in accordance with an example embodiment. By way of example, six zones with different coordinates are shown. These zones include the following:

Zone 1: $\theta=345^\circ$ to $15^\circ$ or $345^\circ\le\theta\le 15^\circ$;

Zone 2: $\theta=15^\circ$ to $45^\circ$ or $15^\circ\le\theta\le 45^\circ$;

Zone 3: $\theta=315^\circ$ to $345^\circ$ or $315^\circ\le\theta\le 345^\circ$;

Zone 4: $\theta=45^\circ$ to $90^\circ$ or $45^\circ\le\theta\le 90^\circ$;

Zone 5: $\theta=270^\circ$ to $315^\circ$ or $270^\circ\le\theta\le 315^\circ$; and Zone 6: $\theta=135^\circ$ to $225^\circ$ or $135^\circ\le\theta\le 225^\circ$.

Figure 11C:
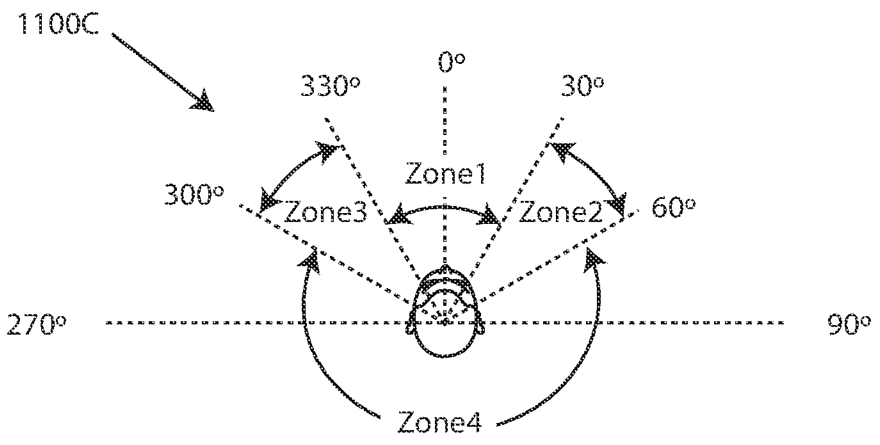

FIG. 11C shows a coordinate system 1100C with a plurality of zones having different azimuth coordinates in accordance with an example embodiment. By way of example, four zones with different coordinates are shown. These zones include the following:

Zone 1: $\theta=330^\circ$ to $30^\circ$ or $330^\circ\le\theta\le 30^\circ$;

Zone 2: $\theta=30^\circ$ to $60^\circ$ or $30^\circ\le\theta\le 60^\circ$;

Zone 3: $\theta=300^\circ$ to $330^\circ$ or $300^\circ\le\theta\le 330^\circ$; and Zone 4: $\theta=60^\circ$ to $300^\circ$ or $60^\circ\le\theta\le 300^\circ$.

Figure 11D:
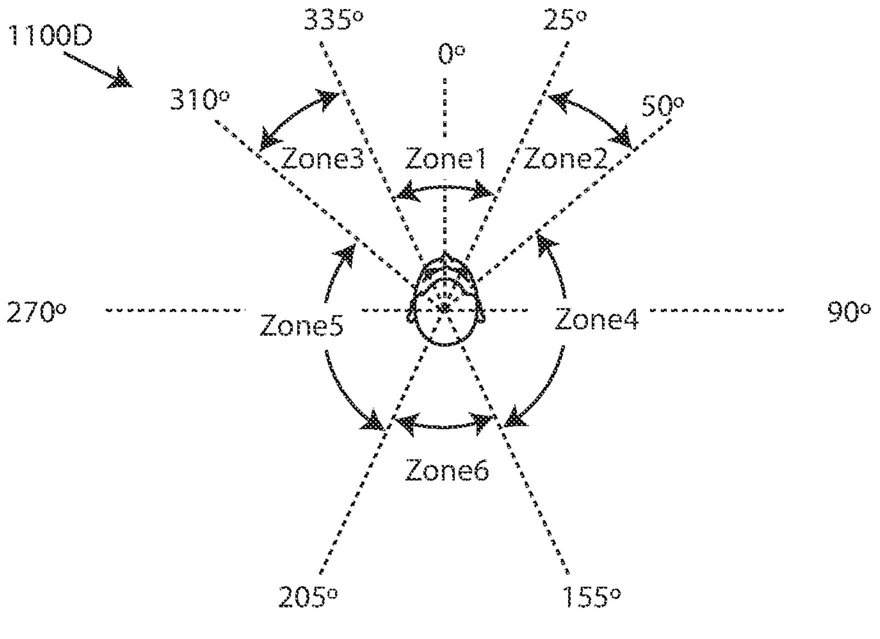

FIG. 11D shows a coordinate system 1100D with a plurality of zones having different azimuth coordinates in accordance with an example embodiment. By way of example, six zones with different coordinates are shown. These zones include the following:

Zone 1: $\theta=335^\circ$ to $25^\circ$ or $335^\circ\le\theta\le 25^\circ$;

Zone 2: $\theta=25^\circ$ to $50^\circ$ or $25^\circ\le\theta\le 50^\circ$;

Zone 3: $\theta=310^\circ$ to $335^\circ$ or $310^\circ\le\theta\le 335^\circ$;

Zone 4: $\theta=50^\circ$ to $155^\circ$ or $50^\circ\le\theta\le 155^\circ$;

Zone 5: $\theta=205^\circ$ to $310^\circ$ or $205^\circ\le\theta\le 310^\circ$; and Zone 6: $\theta=155^\circ$ to $205^\circ$ or $155^\circ\le\theta\le 205^\circ$.

Figure 11E:
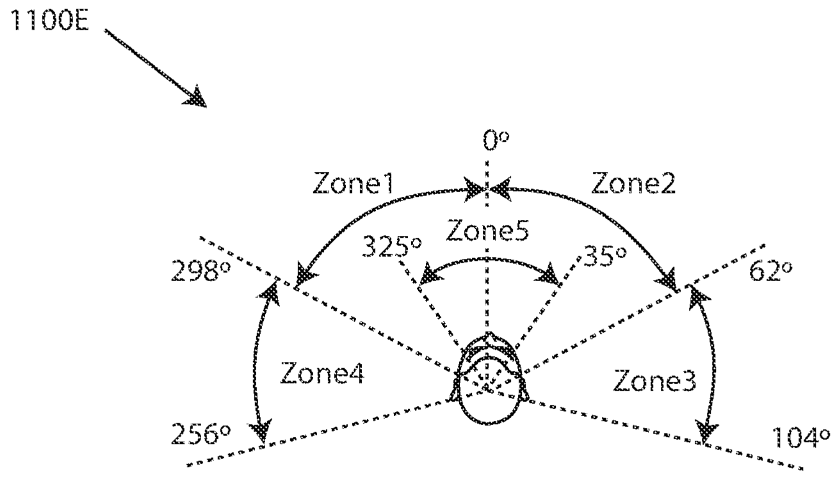

FIG. 11E shows a coordinate system 1100E with a plurality of zones having different azimuth coordinates in accordance with an example embodiment. By way of example, five zones with different coordinates are shown. These zones include the following:

Zone 1: $\theta=298^\circ$ to $0^\circ$ or $298^\circ\theta 0^\circ$;

Zone 2: $\theta=0^\circ$ to $62^\circ$ or $0\le^\circ\le\theta 62^\circ$;

Zone 3: $\theta=62^\circ$ to $104^\circ$ or $62^\circ\le 104^\circ$;

Zone 4: $\theta=256^\circ$ to $298^\circ$ or $256^\circ\theta 298^\circ$; and Zone 5: $\theta=325^\circ$ to $35^\circ$ or $325^\circ\theta 35^\circ$.

Figure 12A:
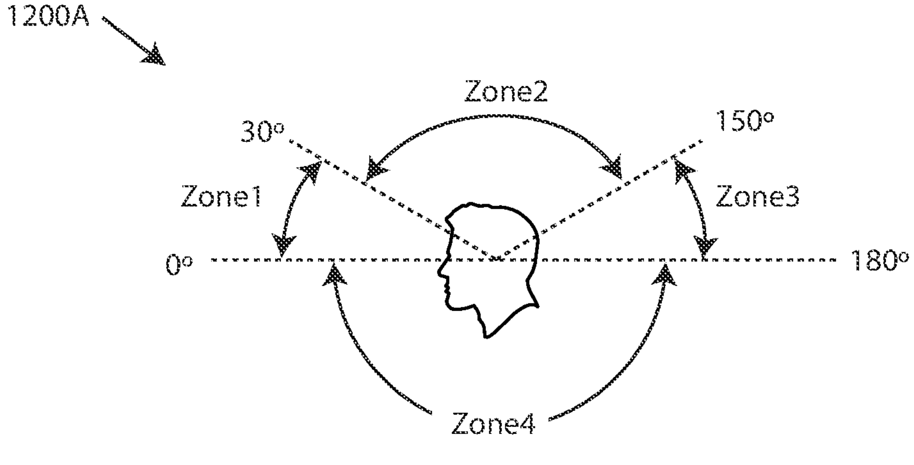
FIGS. 12A-12E show a coordinate system with a plurality of zones having different elevation coordinates in accordance with an example embodiment.

FIG. 12A shows a coordinate system 1200A with a plurality of zones having different elevation coordinates in accordance with an example embodiment. By way of example, four zones with different coordinates are shown. These zones include the following:

Zone 1: $\varphi=0^\circ$ to $30^\circ$ or $0^\circ\le\varphi\le 30^\circ$;

Zone 2: $\varphi=30^\circ$ to $150^\circ$ or $30^\circ\le\varphi\le 150^\circ$;

Zone 3: $\varphi=150^\circ$ to $180^\circ$ or $150^\circ\le\varphi\le 180^\circ$; and Zone 4: $\varphi=180^\circ$ to $360^\circ$ or $180^\circ\le\varphi\le 360^\circ$.

Figure 12B:
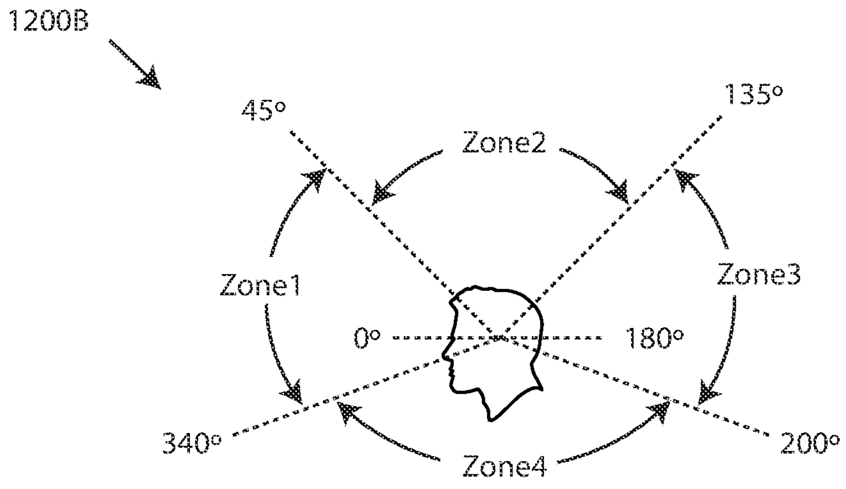

FIG. 12B shows a coordinate system 1200B with a plurality of zones having different elevation coordinates in accordance with an example embodiment. By way of example, four zones with different coordinates are shown. These zones include the following:

Zone 1: $\varphi=340^\circ$ to $45^\circ$ or $340^\circ\le\varphi\le 45^\circ$;

Zone 2: $\varphi=45^\circ$ to $135^\circ$ or $45^\circ\le\varphi\le 135^\circ$;

Zone 3: $\varphi=135^\circ$ to $200^\circ$ or $135^\circ\le\varphi\le 200^\circ$; and Zone 4: $\varphi=200^\circ$ to $340^\circ$ or $200^\circ\le\varphi\le 340^\circ$.

Figure 12C:
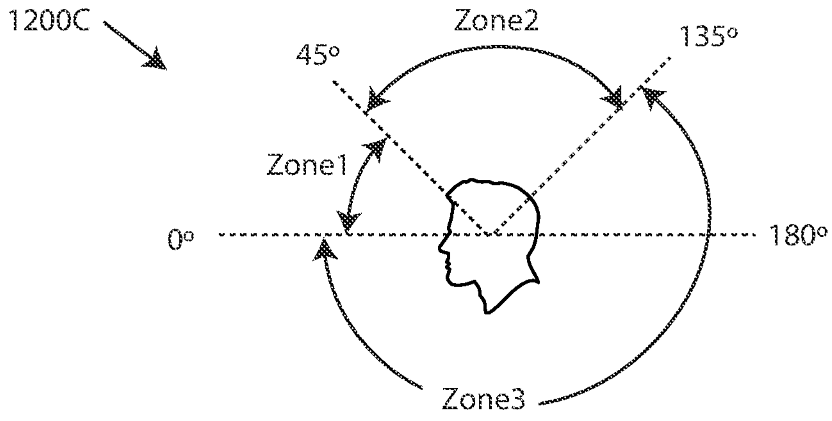

FIG. 12C shows a coordinate system 1200C with a plurality of zones having different elevation coordinates in accordance with an example embodiment. By way of example, three zones with different coordinates are shown. These zones include the following:

Zone 1: $\varphi=0^\circ$ to $45^\circ$ or $0^\circ\le\varphi\le 45^\circ$;

Zone 2: $\varphi=45^\circ$ to $135^\circ$ or $45^\circ\le\varphi\le 135^\circ$; and Zone 3: $\varphi=135^\circ$ to $360^\circ$ or $135^\circ\le\varphi\le 360^\circ$.

Figure 12D:
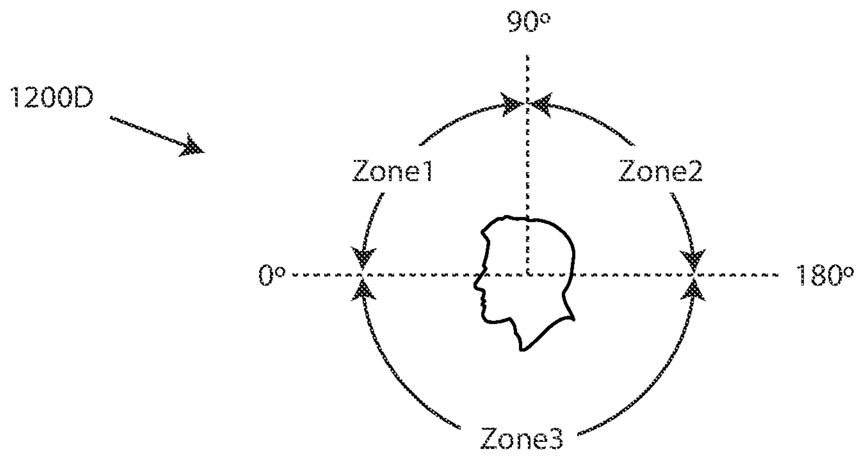

FIG. 12D shows a coordinate system 1200D with a plurality of zones having different elevation coordinates in accordance with an example embodiment. By way of example, three zones with different coordinates are shown. These zones include the following:

Zone 1: $\varphi=0^\circ$ to $90^\circ$ or $0^\circ\le\varphi\le 90^\circ$;

Zone 2: $\varphi=90^\circ$ to $180^\circ$ or $90^\circ\le\varphi\le 180^\circ$; and Zone 3: $\varphi=180^\circ$ to $360^\circ$ or $180^\circ\le\varphi\le 360^\circ$.

Figure 12E:
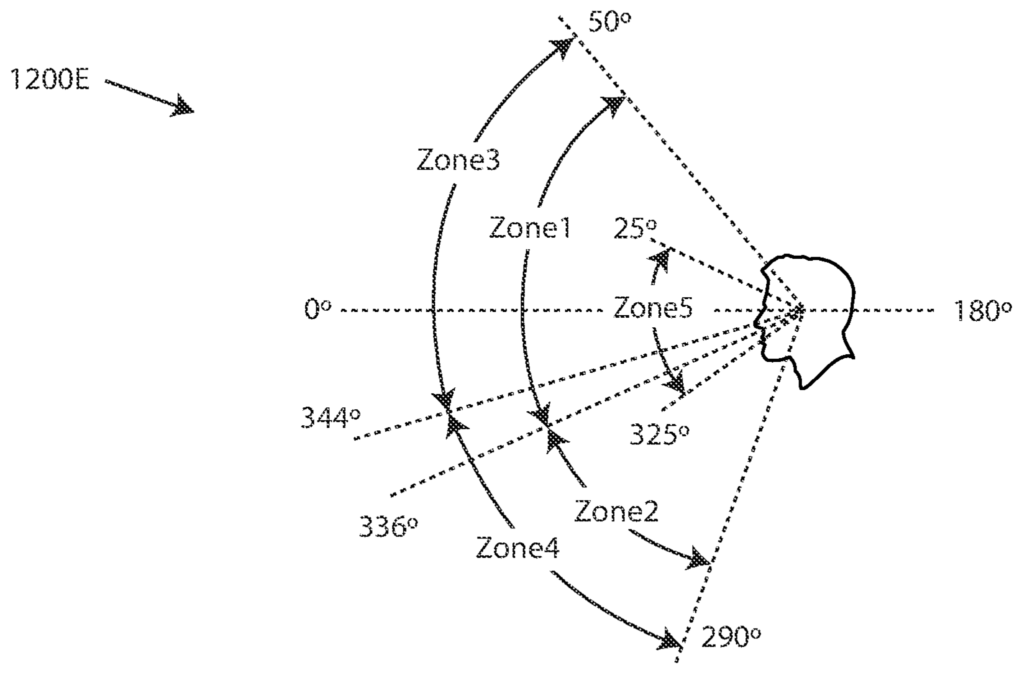

FIG. 12E shows a coordinate system 1200E with a plurality of zones having different elevation coordinates in accordance with an example embodiment. By way of example, five zones with different coordinates are shown. These zones include the following:

Zone 1: $\varphi=336^\circ$ to $50^\circ$ or $336^\circ\le\varphi\le 50^\circ$;

Zone 2: $\varphi=290^\circ$ to $336^\circ$ or $290^\circ\le\varphi\le 336^\circ$;

Zone 3: $\varphi=344^\circ$ to $50^\circ$ or $344^\circ\le\varphi\le 50^\circ$;

Zone 4: $\varphi=290^\circ$ to $344^\circ$ or $290^\circ\le\varphi\le 344^\circ$; and Zone 5: $\varphi=325^\circ$ to $25^\circ$ or $325^\circ\le\varphi\le 25^\circ$.

Consider a reclining user wearing a HMD with PHT and working at a virtual workstation that displays the visual component of the tasks or work at hand such as at a virtual monitor. The user provides input by voice command, gaze, handheld pointing device, and/or other ways that do not require a desk or flat surface (in contrast with a keyboard and mouse). Because the virtual monitor placement is also not dependent on a desk, the visual component of the work is displayed to the user at a more comfortable resting gaze elevation or more natural or preferred line-of-sight. For example, to increase the working comfort of the user and improve his or her performance, the gaze elevation of visual material is centered around $-24^\circ$ from the horizontal when the user sits upright, and centered around $-16^\circ$ from the horizontal when the user reclines.

Accordingly in this example, sound localization zones are defined to correspond to the FOV or to virtual or physical displays or work areas of the reclined user and upright user. The user designates that sound localization is confined to the zone. This designation assists the user to focus on the work at hand in the zone and eliminates distracting localizations outside the zone. Although the user localizes sound outside his FOV or this zone, human error reduces and human accuracy increases when the sound localization zone is confined to the field-of-view of the user. For example, the HMD provides images or visual cues at the coordinates of SLPs in order to minimize perceptional errors, such as front-back flipping. These images or cues also reduce the size of the cone of confusion and reduce difficulty in localizing sound to the median plane. Similarly, sound is localized at images or visual events in order to highlight or draw the attention of the user to the image of a point in space. The audio-visual cue combinations in space or on a display reinforce overall perception and improve overall functionality. Establishing such zones thus improves the functionality of the workspace.

Consider the example of the reclining user wearing the HMD and viewing a virtual monitor. The user does not move his or her head (e.g., the user is supine, rests the head in a headrest, or is in a public place and prefers to keep the head stationary). In this case, the zones are limited to a FOV that is limited by the range of the gaze of the user because the head does not rotate. The HMD renders to the display only the portion of the virtual environment that corresponds to the single head orientation, and the SLS localizes sound only to the zone that matches the portion of the virtual environment. The experience of the user is improved by defining such zones that allow the user to operate in the VR space in which the accuracy of the sound localization is reliably increased.

Consider an example in which a user wears a HMD, keeps his head still, and sees a virtual monitor in a zone defined by a first FOV. The virtual monitor is in the zone. The user then rotates his head 120° to the left and sees a second FOV.

The user cannot see the virtual monitor. The sound localization zone is defined in the frame of reference of the head so that when the head is rotated to the left, the zone also rotates to the left. The user hears localizations in the zone in front of him in the second FOV. The user no longer hears localizations at the virtual monitor 120° to his right in the first FOV. The zone defined this way in the reference frame of the head of the user is useful for localizing only sound in a current FOV, so a user only localizes sound occurring in locations he or she can see. For example, the user describes the effect of the localization zone as "tunnel vision, but for sound, with the size and shape of the tunnel being my FOV."

Consider the example above in which the sound localization zone is defined in the reference frame of the virtual space and not the frame of reference of the head. In this example, when the head is rotated to the left, the zone does not rotate and remains at the first FOV. The zone does not move and still includes the virtual monitor. The user continues to hear sound localize at the virtual monitor 120° to the right, but does not hear sound localized in the second FOV in front of him or her. The zone defined this way in the reference frame of the virtual space allows the user to monitor the sound localization at the first FOV and/or passively prompts the user to return their visual attention to the virtual monitor in the zone.

Some of the figures and example embodiments provide specific numbers, such as specific numbers for coordinates of SLP and/or zones. Example embodiments include these specific numbers but also include approximations or "about" the specific numbers. For example, azimuth coordinates (θ) for a zone that are about or approximately equal to 0° to 90° would include values of θ for ±3° (i.e., plus or minus three degrees). Thus, θ=(357°-3°) to (87°-93°) or from between −3° and 3° to between 87° and 93°.

FIGS. 11 and 12 provide example zones with azimuth and elevation coordinates. These figures can be combined in various combinations to generate example embodiments with zones of two or three dimensions expressed or defined by the combination. The following combinations include examples in accordance with an example embodiment: FIG. 11A provides azimuth coordinates that can be combined with elevation coordinates of FIG. 12A, 12B, 12C, 12D, or 12E. FIG. 11B provides azimuth coordinates that can be combined with elevation coordinates of FIG. 12A, 12B, 12C, 12D, or 12E. FIG. 11C provides azimuth coordinates that can be combined with elevation coordinates of FIG. 12A, 12B, 12C, 12D, or 12E. FIG. 11D provides azimuth coordinates that can be combined with elevation coordinates of FIG. 12A, 12B, 12C, 12D, or 12E. FIG. 11E provides azimuth coordinates that can be combined with elevation coordinates of FIG. 12A, 12B, 12C, 12D, or 12E. Furthermore, all zones from one figure do not have to be shared with all zones from another figure. One or more zones or angles from one figure can be shared or included with one or more zones or angles from another figure.

Further, a zone defined by a combination can extend from an inner radius r1 to an outer radius r2. Each r1 and r2 of these combinations can have a different or same value of distance (r). Examples of distance (r) include, but are not limited to, near-field values, far field values, 1.0 m or about 1.0 m, 1.1 m or about 1.1 m, 1.2 m or about 1.2 m, 1.3 m or about 1.3 m, 1.4 m or about 1.4 m, 1.5 m or about 1.5 m, 1.6 m or about 1.6 m, 1.7 m or about 1.7 m, 1.8 m or about 1.8 m, 1.9 m or about 1.9 m, 2.0 m or about 2.0 m, 2.1 m or about 2.1 m, 2.2 m or about 2.2 m, 2.3 m or about 2.3 m, 2.4 m or about 2.4 m, 2.5 m or about 2.5 m, 2.6 m or about 2.6 m, 2.7 m or about 2.7 m, 2.8 m or about 2.8 m, 2.9 m or about 2.9 m, 3.0 m or about 3.0 m, etc.

For example, combining zone 1 and zone 2 of 1100A with zone 1 of 1200A results in a combination defining two zones; a left zone from 270° to 0° azimuth and 0° to 30° elevation, and a right zone from 0° to 90° azimuth and 0° to 30° elevation. Additional zones are defined by specifying r1 and r2. Consider a first example additional zone bounded by the left zone and extending from r1=1.0 m to r2=2.0 m. This zone has the shape of a rectangular frustum (the top and bottom of the frustum being curved surfaces). Consider an example additional zone that is a curved plane bounded by the right zone and with r1=3.0 m (for an area zone r2 is not specified, or r2=r1).

FIGS. 13A-13E provide example configurations or shapes of zones in 3D space in accordance with example embodiments. For illustration, the configuration includes an origin or center that includes a user. For example, a head or body of the user is positioned at an origin of the configuration. Further, each configuration can include one or more zones or SLPs with a few being shown for illustration. Further yet, different configurations and/or shapes from different figures can be mixed together for example embodiments. Furthermore, as explained herein, zones can include one or more SLPs or can intentionally include no SLPs (e.g., representing an area or location where external sound localization does not occur to the user).

Figure 13A:
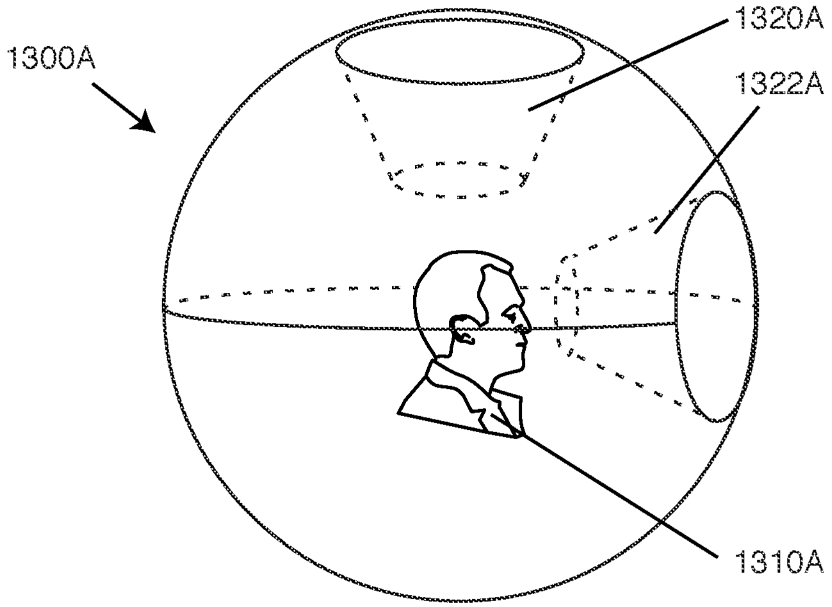
FIGS. 13A-13E provide example configurations or shapes of zones in 3D space in accordance with example embodiments.

FIG. 13A shows a sphere or spherical configuration 1300A with an origin 1310A that represents where a head or body of a user is located in accordance with example embodiments. The configuration 1300A can be divided into a plurality of SLPs and/or zones and include one or more different ways to divide a sphere. By way of example, the configuration is divided into or includes a plurality of frustoconical zones, two such zones being shown at 1320A and 1322A. Zone 1320A is a circular frustoconical zone located above a head of a user and includes one or more SLPs, and zone 1322A is an elliptical frustoconical zone located in front of the user and includes one or more SLPs. For example, zone 1322A is located directly in front of a face of the user or along a line-of-sight of the user, with a left side at 325°, a right side at 35°, an upper side at 25°, a lower side at 325°, and extending from 0.8 m to 1.2 m. The configuration 1300A can include zones with other shapes (e.g., other zones having a conical shape, circular shapes, curved shapes, partial or hemispherical shape, elliptical shapes, irregular shapes, groups of SLPs bunched or located together, a single SLP, or other shapes).

Figure 13B:
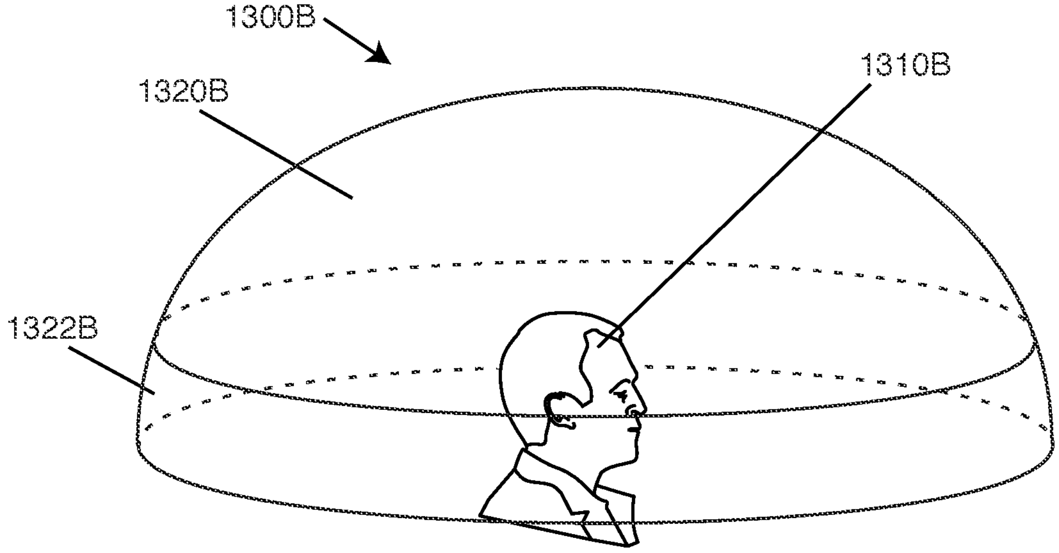

FIG. 13B shows a partial sphere or hemi-spherical configuration 1300B with an origin 1310B that represents where a head or body of a user is located in accordance with example embodiments. The configuration 1300B can be divided into a plurality of SLPs and/or zones and include one or more different ways to divide a partial sphere or hemisphere. By way of example, the configuration is divided into or includes a plurality of spherical cross sections, two such zones being shown at 1320B and 1322B. Zone 1320B is located above a head of a user as a cap or top of the configuration and includes one or more SLPs, and zone 1322B is located around a head of the user and includes one or more SLPs. The configuration 1300B can include zones with other shapes (e.g., other zones having a pie shape, curved planar or curved surface shape, irregular shapes, groups of SLPs bunched or located together, a single SLP, or other shapes).

Figure 13C:
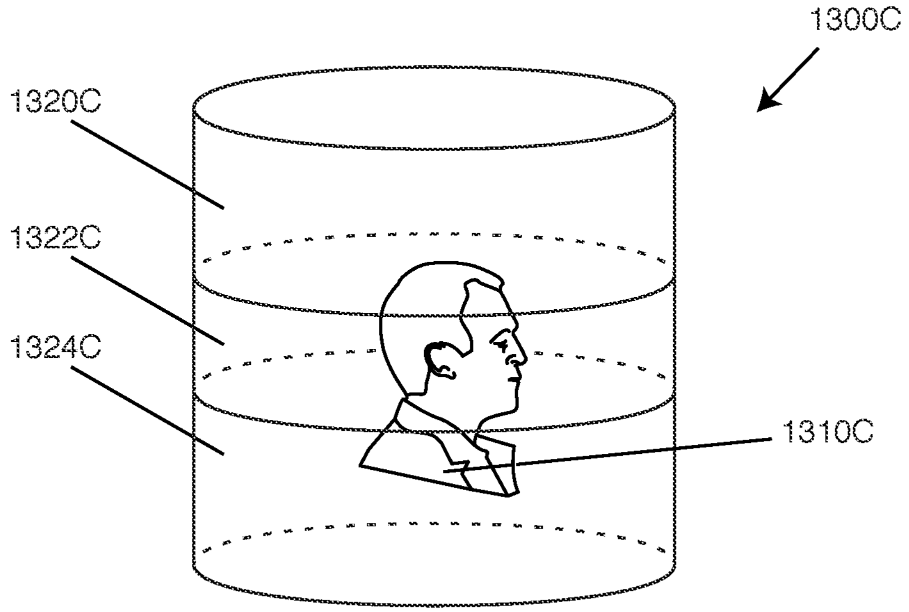

FIG. 13C shows a cylinder or cylindrical configuration 1300C with an origin 1310C that represents where a head or body of a user is located in accordance with example embodiments. The configuration 1300C can be divided into a plurality of SLPs and/or zones and include one or more different ways to divide a cylinder. By way of example, the configuration is divided into or includes a plurality of horizontal and/or vertical cross sections of the cylinder, three example zones being shown at 1320C, 1322C, and 1324C. Zone 1320C is located above a head of a user and includes one or more SLPs; zone 1322C is located around a head of the user and includes one or more SLPs; and zone 1324C is located below the head of the user. The configuration 1300C can include zones with other shapes (e.g., other zones having a pie shape, a circle shape, a curved planar shape, a cylindrical shape, irregular shapes, groups of SLPs bunched or located together, a single SLP, or other shapes).

Figure 13D:
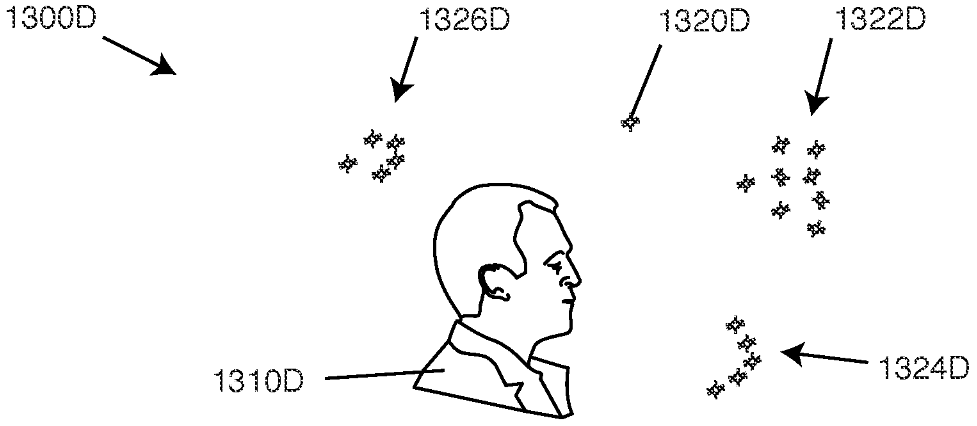

FIG. 13D shows an irregular shaped configuration 1300D with an origin 1310D that represents where a head or body of a user is located in accordance with example embodiments. The configuration 1300D includes a plurality of SLPs and/or zones. By way of example, the configuration includes one or more SLPs that form a zone, such as a single SLP 1320D located above a head of the user and three bunches or groups of SLPs 1322D, 1324D, 1326D positioned away from the head of the user. For example, the group of SLPs 1324D define an arc-shaped zone.

Figure 13E:
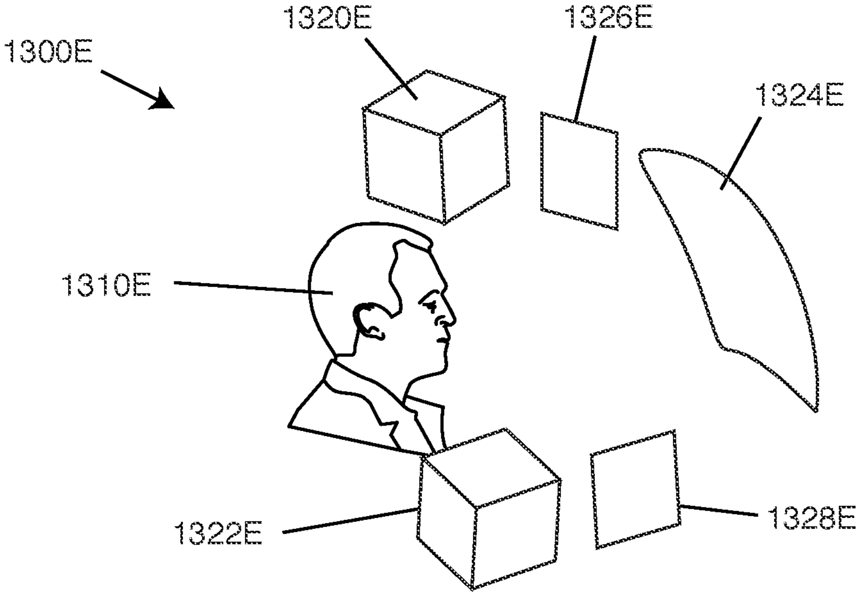

FIG. 13E shows an irregular shaped configuration 1300E with an origin 1310E that represents where a head or body of a user is located in accordance with example embodiments. The configuration 1300E includes a plurality of SLPs and/or zones. By way of example, the configuration includes one or more SLPs that form a cube-shaped zone 1320E located on a left side of a head of the user, a cube-shaped zone 1322E located on a right side of the head of the user, a curved planar zone 1324E located in front of a face of the user, a planar zone 1326E located to a left side and in front of the face of the user, and a planar zone 1328E located to a right side and in front of the face of the user.

In an example embodiment, zones can start and/or end at a definitive or specific location (e.g., a location defined per a coordinate system). Zones can also extend for an indefinite or undeterminable location. For example, a zone extends away from a listener for a distance equivalent to an edge of audible space of the listener, which can be different for individual listeners, and for different physical and virtual environments.

Some technical challenges with binaural sound include how to determine where to place the origin of the sounds (e.g., where to place the sound localization points for a listener). For example, when a user talks to another person on a VoIP telephone call, where should the computer system, electronic device, or software application place the voice of the person (In front of the listener? Beside the listener? At an object near the listener?). As another example, where should sounds be placed in physical or VR space? As yet another example, electronically generated binaural sound can be indistinguishable from sound originating in the physical environment of the user. Where or how should this binaural sound be placed so as not to surprise, startle, or confuse the listener?

As another example, where should binaural sound be placed with respect to a listener when these sounds originate from different software applications, different origins, have unknown sound types, or unknown sources. Example embodiments solve many of the new technological challenges with binaural sound.

In one or more example embodiments, a software program (such as an intelligent user agent (IUA), a machine-learning user agent, or an intelligent personal assistant (IPA)) manages the binaural sound and makes decisions with regard to binaural sound. Such decisions include, but are not limited to, one or more of defining a size, a shape, a location, and/or a number of zones or sound localization points (SLPs) around a head of listener; deciding what designations to make for each of the zones or SLPs (such as designating one zone or SLP for receiving calls, one zone or SLP for a virtual microphone point (VMP), one zone or SLP for audio warnings, one zone or SLP for a voice from an intelligent personal assistant, one zone or SLP for messages, such as voice messages from humans or machines, etc.); deciding into which zone or SLP to place a voice or other sound (such as placing friends in one zone or SLP, business colleagues in another zone or SLP, music in another zone or SLP, alarms in another zone or SLP, etc.); deciding where to position a SLP for sound when information about the sound is known or not known; deciding when to move a SLP for sound from one zone to another zone or from one SLP to another SLP; deciding when to turn on or turn off a SLP for sound; deciding when to switch sound among stereo sound, binaural sound, and mono sound; deciding what size or shape to make a zone or group of SLPs; deciding what volume of sound to provide with a zone or SLP; deciding what path or trajectory to move or transition sound through 3D space around a user (such as moving a SLP of sound playing to a listener from one zone to another zone or through a zone); and executing example embodiments.

The software program acts on a decision or causes an action to occur with regard to the decision. For example, the IUA causes or assists in executing the decision, informs a user of the decision, informs other IUAs of the decision, informs a program or process of the decision, stores or transmits the decision, or executes example embodiments.

IUAs (or other software programs) share decisions and information with each other. By way of example, decisions or decision trees are stored in a database. The IUA compares a current decision or information for formulating a decision with stored decisions or previously executed decisions, and analyzes or weighs the information to arrive at a designation for the SLP or zone. For instance, the IUA makes the decision based on collaborative data, the personal preferences of the user, personal and/or private data in the user profile of the user, and other information. As more IUAs share data with each other, the more informed or better the decisions are for the users. The system builds models to assist in making decisions with regard to binaural sound and updates these models to improve predictions and decision-making.

IUAs also form groups, such as two or more IUAs of different users aligning and sharing information with each other (e.g., two IUAs sharing sound localization information, selections of SLPs and/or zones where to place sound, assignments or designations of types of sound and/or sources of sound to SLPs and/or zones, and other methods and blocks discussed herein). IUAs consult each other and assist each other in making informed decisions for their users. For instance, a group of IUAs and their experiences are collectively more intelligent than a single IUA. The groups are based on a commonality of the users and their preferences, or based on a commonality of the IUAs (such as the IUAs having certain characteristics, features, personalities, etc.).

IUAs gather, analyze, and share data on localization, zones, and SLPs for users (including human users, software programs, and processes). This data includes, but is not limited to, user preferences for where binaural sounds should be localized, at or on which objects binaural sounds should be localized, volumes for different binaural sounds, zone or SLP locations for different binaural sounds, distances from the listener for binaural sounds, and other information based on user preferences and past and present placement of sound localization points. This data is stored in local or global user preferences that are shared among different intelligent user agents that serve different listeners.

Consider an example in which an IUA named Hal executes for a user named Alice. Alice wears her headphones when a home appliance sends her an audio warning that the food in the oven is finished cooking. Hal intercepts the warning but does not know where to localize this sound to Alice. Hal consults with other IUAs of other users that Alice does not know and determines that these other users prefer to have this warning localize at (1.0 m, 145°, 20°). Based on this collaborative information, Hal selects HRTFs to convolve the sound so the warning localizes to Alice at (1.0 m, 145°, 20°).

An area around a user can be divided into multiple 1D, 2D or 3D areas or zones to where sound localizes to the user. These areas represent locations where a user perceives sound to originate or localize and include locations in empty space and locations occupied by physical objects. The number of zones, the size of the zones, the shape of the zones, the number of SLPs in a zone, and the location of the zones can vary. Further, this information can be predetermined (e.g., established per a convention, or an industry standard), or established by a user, electronic device, process, or software application, such as an IUA.

The zones can be carved out or divided out from a larger zone. By way of example, a sphere (or partial sphere, such as a hemisphere) defines an area proximate to and around a head of a listener that is positioned within a center of the sphere. For instance, this sphere has a radius in a range from one foot or less to about six feet or more. This sphere is divided into a plurality of smaller spheres or other shapes (such as cones, truncated cones, cylinders, rectangles, etc.) that represent zones.

As noted, zones can also have different sizes and shapes. For instance, one zone exists as a cone of confusion adjacent a left ear of the listener, and another zone of similar or same size and shape exists as a cone of confusion adjacent a right ear of the listener. For example, a zone exists in front of the user in the shape of a rectangular solid with a center of a vertical face being one meter from the user and the face extending from −35° to 35° azimuth and from −25° to 20° elevation. For example, a half-watermelon shape zone exists in front of the user, a first truncated cone exists along an azimuth from 30° to 45° at a right side of the user, a second truncated cone exists along an azimuth from −30° to −45° at a left side of the user, a cylindrical zone exists above a head of the listener, and a rectangular zone exists behind the listener. These shapes and locations provide an example illustration how an area around a person can be divided into zones of different sizes and shapes.

Consider an example in which an area around a head of a user is divided into one or more of eight different zones as follows: zone 1 being inside a head of a user, zone 2 being above the ears of the listener (e.g., above a head of the listener), zone 3 being directly in front of a face of the listener, zone 4 being 45 degrees left of the face of the listener, zone 5 being 45 degrees right of the face of the listener, zone 6 being adjacent a left ear of the listener, zone 7 being adjacent a right ear of the listener, and zone 8 being behind a listener (such as being behind a head of the listener).

Sound localization points for different binaural sounds are placed in one of the multiple zones based on various factors, such as a GPS location of the listener, a type of sound, a meaning or purpose of the sound, a location of the sender of the sound, a software application that generates, provides, or transmits the sound, etc.

Consider an example in which a SLP for a sound is placed in a zone based on a type of sound. The sound localization system (SLS) manages where the sounds are placed. The SLS retrieves head related transfer functions (HRTFs) so the sounds are convolved to localize in the selected SLP. For instance, the SLS places voice recordings to play back in zone 1, places human voices in a VoIP telephone call in zone 3, places warnings or alerts in zone 8, places sound logos through several zones, etc.

IUAs choose a location to place a sound based on shared data along with personal or private data of a listener (such as user preferences, historical or previous placements of sounds et al.). For example, the IUA determines a type of incoming binaural sound and then makes an intelligent determination as where to place the localization point for this sound. This intelligent determination is based not only on historical preferences of the listener but also on historical preferences of other listeners under similar conditions. Thus, intelligent user agents collectively share and refine information and learn as more users and more user preferences originate.

As explained herein, an area around a head or body of a listener is divided into different zones or SLPs with different physical/virtual sizes, shapes, and locations. Each zone or each SLP is associated with a meaning or designation and tag that is different than another zone or another SLP. For example, a sound localizing in zone A has a different meaning to the listener than the same sound localizing in zone B. For instance, when the sound localizes in zone A, the sound implies or signifies a reminder or alert. When the same sound later localizes in zone B, the sound implies a warning that requires immediate attention of the listener. The user, an application, or an IUA assigns labels or tags to zones or SLPs. For example, a property of the zones and SLPs (such as a field/column in the zone or SLP table) stores labels or tags. For example, the property is called "tags" and the user chooses to store as tags (in the tag property or field of the zone) words associated with categories of information or types of sound. The user stores "personal" to the tag property of a zone close to his face, and stores "alerts" to the tag property of a zone above the head. The tag field includes zero, one, or multiple such words or labels. The labels are any data and are not limited to words, phrases, characters, strings, or ASCII. The labels have a meaning or use to one or more users, IUAs, or applications, or no meaning or use.

Consider an example in which sounds appearing in zone 1 are VoIP calls, voice messages, SMS messages, and other telecommunications. Sounds appearing in zone 2 are information (voice or other sounds) from machines, such as home appliances, motorized vehicles, etc. Sounds appearing in zone 3 are from an intelligent personal assistant (such as the voice of Hal localizing into this zone). Sounds appearing in zone 4 are reminders for action items, such as calendar events, items from a To-Do list, etc. Sounds appearing in zone 5 are warnings or alerts. Sounds appearing in zone 6 are reserved for computer-generated sounds, such as a startup sound of an electronic device, a logo-sound or sound that identifies a company (such as "swish" sound that identifies ABC company to all listeners). Example embodiments are not limited to providing the sounds with these noted zones. Instead, the example is provided to illustrate that zones can be designated with sounds that have a particular meaning.

Multiple zones or multiple SLPs have a unique meaning. For example, a binaural sound that moves from zone A to zone D has a different meaning to the user than the same sound that moves from zone A to zone E. Binaural sounds traverse through multiple zones or SLPs in a predetermined pattern or sequence that provides the listener with a unique or predetermined meaning. The patterns or trajectories form geometric shapes, such as moving a sound through an S-shape, A-shape, arc-shape, swirling-shape, straight line shape, etc. The volume of the sound also changes as the sound moves through different zones or different SLPs, and this change in volume designates a particular meaning.

Consider an example in which a "swish" sound approaches a listener from his/her left side, passes through his/her head, and exits from a right side. This sound along with the pattern of its movement designates a special or certain meaning. Example meanings include, but are not limited to, ownership (such as a sound passing through certain SLPs designates a sound logo of a company or an application belonging to a certain company or owner), execution of a particular software application (such as sound passing through certain zones indicates to the listener a certain software application will execute or is executing), a particular action (such as sound commencing at one SLP and ending at a second SLP indicates a telephone call will commence or an IUA will speak, such as at the second SLP).

Consider an example of a sound sequence in which a sound of a virtual train approaches a user and gets louder as the virtual train approaches. When the virtual train arrives at the head of the user, the sound enters the user's head (e.g., as stereo or mono sound) and fades out. This sound sequence endures for about two seconds. Listeners recognize this sound as belonging to company ABC. When a listener hears this binaural sound, he or she knows that the software application being executed belongs to company ABC.

One challenge is that electronically generated or electronically provided binaural sound can emulate natural sound and in some instances be indistinguishable from natural sound. A listener can be confused or unable to determine whether a sound is an electronically generated binaural sound (electronic binaural sound) or a sound in the physical environment of the listener. This confusion or inability to distinguish between real or natural binaural sounds (e.g., sounds occurring in a listener's physical environment) and electronic binaural sounds (e.g., binaural sounds provided to a user through an electronic device) is not desirable in many situations.

Example embodiments enable a user to distinguish between natural binaural sounds and electronic binaural sounds.

In one example embodiment, a predetermined sound plays to the user, and this sound indicates to the user that the sounds are electronic binaural sounds. For example, a designated short sound (like a ping or other sound) informs the listener that the sounds the listener is hearing or the sounds the listener will be hearing are electronic binaural sounds. The listener understands that hearing the designated recognized sound signifies that sounds are electronic binaural sounds. This recognized sound is played periodically to remind the user, and/or upon a certain event, such as playing the designated sound before the electronic binaural sound commences or periodically playing the designated sound while the electronic binaural sound commences. Furthermore, this designated sound is played to localize to one or more external SLPs.

An example embodiment creates and/or reserves one or more zones for electronic binaural sound, such as regions where a user rarely hears sound from the physical environment. For example, a zone within the radius of the head of the user is a zone where physical environment sound is not heard without earphones. As another example, an example embodiment creates and/or reserves a zone above the head of the listener or a vertical cylindrical zone with a radius of two meters, centered under the user and extending downward from the floor. An example embodiment defines a zone as the region in space that is occupied by a physical object, such as a computer monitor, a desk surface, an appliance, a piece of furniture, a wall, a ceiling, or a body. An example embodiment determines the region occupied by an object as discussed herein.

In one example embodiment, a listener is apprised of a sound being an electronic binaural sound based on where the sound externally localizes with respect to the listener. Certain sounds are assigned to certain zones or certain SLPs. When a sound appears in this zone or at this SLP, then this action indicates to the listener that the sound is actually an electronic binaural sound.

Consider an example in which a user wears earphones that enable the user to hear both electronic binaural sound from the earphones and naturally occurring sound captured from the physical environment and amplified through the earphones. The user would be unable to distinguish which sounds are natural and which sounds are electronically generated. The earphones, however, provide a short "ping" sound at the SLP or in the zone before the electronic binaural sound localizes to this SLP or this zone. When the user hears the ping, he or she knows that the next sound will be an electronic binaural sound. The ping thus provides the user with an audio warning or audio notice that the sound is an electronic binaural sound. Alternatively, the audio alert indicates a sound from the physical environment. For example, a user engrossed in a computer game chooses to hear the localized sounds from the computer game without frequent audio alerts. The physical environment that he or she monitors has fewer sounds, so the user selects that the alerts will distinguish the sounds from his physical environment. The functionality of the alert is improved because the user is more sensitive to the less frequent sound of the alerts. An example embodiment localizes an alert at the position of the audial event in the environment, at a designated SLP or zone for the alert, or at both places.

Consider further this example of the user wearing earphones. The user does not like to hear the "ping" sound and prefers to hear another sound instead. The user selects a different sound from his sound user preferences, and this newly selected sound plays as the alert sound.

The alert sound that indicates an electronically originating sound or that indicates a physical environment sound occurs before the sound plays or while the sound plays. For example, the device of the user caches the sound captured from the physical environment and delays the play of the sound in order to include an alert that indicates a naturally occurring sound. As another example, if electronic binaural sound plays for an extended period of time, the user may forget that the sound playing is actually electronic binaural sound. The system sets the alert sound to play at predetermined intervals (such as playing the alert once every 30 seconds, once every minute, once every two minutes, once every three minutes, once every five minutes, etc.). A user establishes these intervals. A computer program (e.g., an IUA) or a manufacturer also sets these intervals. As mentioned, the alert plays at the SLP of the electronic binaural sound and/or at a SLP or zone designated for the alert. Consider an example wherein the user designates a first alert sound in a first zone (e.g., a left side zone) to designate electronically originating sound and also designates a second alert sound in a second zone (e.g., a right side zone) to indicate or highlight physical environment sound.

In an example embodiment, users or software programs select SLPs and zones and select the sounds that appear in these zones. For example, each user personalizes or customizes SLPs, zones, sound that localizes in the SLPs and zones, etc.

In another example embodiment, SLPs and zones are standardized for multiple users. For example, manufacturers of home cooking appliances agree that warnings and alerts are to localize to users to one or more SLPs located in zone 4. This zone 4 is designated for these warnings and alerts. Other companies agree not to localize sounds to zone 4 except for sounds pertaining to cooking appliances issuing warnings or alerts. In this manner, zone 4 becomes a standard or a conventional location where listeners hear warnings and alerts for cooking appliances. When a user hears a sound in this zone 4, he or she immediately knows that this sound is a warning or an alert for a home cooking appliance.

SLPs and zones represent locations where binaural sound can externally localize to the user. This binaural sound localizes to a SLP or zone that is in empty space (e.g., a location void of a tangible object) or localize to a SLP or zone that is occupied with a tangible object (e.g., localize to a location occupied with a real person or another type of physical object). Furthermore, in a VR world or AR world (e.g., when a user wears an OHMD), an empty space is occupied with a VR image or an AR image.

Consider an example in which a listener receives a telephone call, and a voice of the caller localizes to a zone one meter directly in front of a face of the listener. This SLP is in empty space since no tangible object exists at the SLP located one meter in front of the listener. While remaining at this location, the listener dons and activates a head mounted display (HMD). The voice of the caller remains at the SLP, but the HMD displays an image of the caller at the SLP. The addition of the visual image of the caller at the SLP did not change the fact that the location one meter directly in front of the face of the listener is empty space. The listener sees an image at this location, but in reality the location is empty space.

This example illustrates that empty space can be void of a tangible object but at the same time include a VR or AR image to a user. The empty space, from the point-of-view of the listener can be occupied with a VR image or an AR image, such as an image occurring in a VR game or VR software application.

In one or more example embodiments, SLPs and/or zones can be separate from each other, can be distinct from each other, can be similar to each other, can share one or more common boundaries or borders, can have separate boundaries or borders, can have one or more overlapping regions or areas or SLPs, or can have no overlapping regions or areas or SLPs.

The zones and/or SLPs can be visible to a user. For example, the zones and/or SLPs can be viewed in VR or AR (e.g., with a HMD or another wearable electronic device). For instance, boundaries, perimeters, areas, volumes, lines, borders, overlaps, coordinates, points, etc. are presented with color, shading, partial transparency, animated surfaces, or other visual indication to enable the user to see and determine SLP and zone locations.

The zones and/or SLPs can be invisible to a user. For example, the user is not able to see zones and/or SLPs or their boundaries, areas, etc. With binaural sound, however, the user can hear sounds externally localizing to different zones and/or SLPs. As such, in some example embodiments, a user determines a specific or general location of a zone based on hearing sounds localize inside and outside of the zone.

Figure 14:
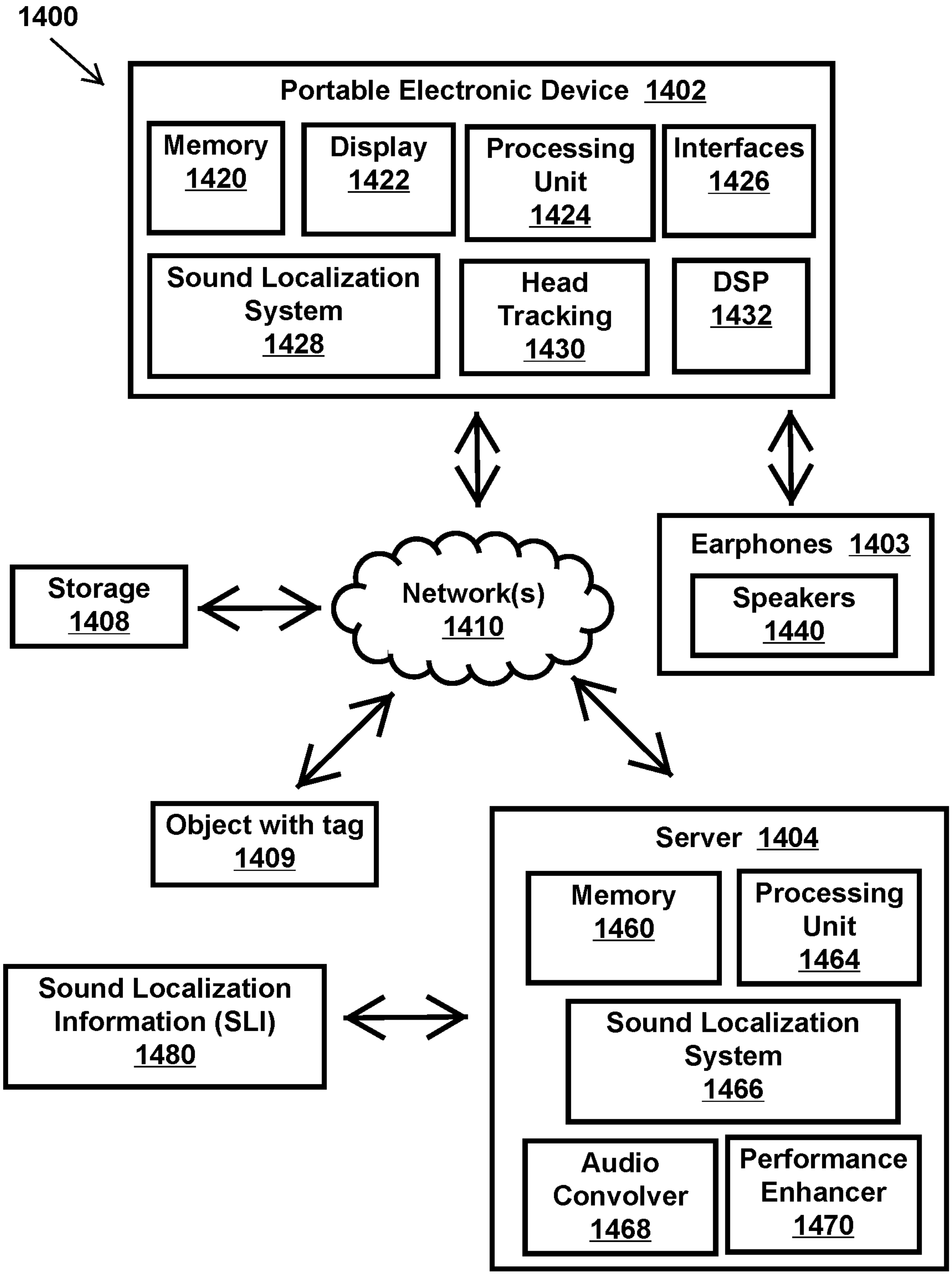
FIG. 14 is a computer system or electronic system in accordance with an example embodiment.

FIG. 14 is a computer system or electronic system 1400 in accordance with an example embodiment. The computer system includes a portable electronic device or PED 1402, one or more computers or electronic devices (such as one or more servers) 1404, storage or memory 1408, and a physical object with a tag or identifier 1409 in communication over one or more networks 1410.

The portable electronic device 1402 includes one or more components of computer readable medium (CRM) or memory 1420 (such as memory storing instructions to execute one or more example embodiments), a display 1422, a processing unit 1424 (such as one or more processors, microprocessors, and/or microcontrollers), one or more interfaces 1426 (such as a network interface, a graphical user interface, a natural language user interface, a natural user interface, a phone control interface, a reality user interface, a kinetic user interface, a touchless user interface, an augmented reality user interface, and/or an interface that combines reality and virtuality), a sound localization system 1428, head tracking 1430, and a digital signal processor (DSP) 1432.

The PED 1402 communicates with wired or wireless headphones or earphones 1403 that include speakers 1440 or other electronics (such as microphones).

The storage 1408 includes one or more of memory or databases that store one or more of audio files, sound information, sound localization information, audio input, SLPs and/or zones, software applications, user profiles and/or user preferences (such as user preferences for SLP/Zone locations and sound localization preferences), impulse responses and transfer functions (such as HRTFs, HRIRs, BRIRs, and RIRs), and other information discussed herein.

Physical objects with a tag or identifier 1409 include, but are not limited to, a physical object with memory, wireless transmitter, wireless receiver, integrated circuit (IC), system on chip (SoC), tag or device (such as a RFID tag, Bluetooth low energy, near field communication or NFC), bar code or QR code, GPS, sensor, camera, processor, sound to play at a receiving electronic device, sound identification, and other sound information or location information discussed herein.

The network 1410 includes one or more of a cellular network, a public switch telephone network, the Internet, a local area network (LAN), a wide area network (WAN), a metropolitan area network (MAN), a personal area network (PAN), home area network (HAM), and other public and/or private networks. Additionally, the electronic devices need not communicate with each other through a network. As one example, electronic devices couple together via one or more wires, such as a direct wired-connection. As another example, electronic devices communicate directly through a wireless protocol, such as Bluetooth, near field communication (NFC), or other wireless communication protocol.

Electronic device 1404 (shown by way of example as a server) includes one or more components of computer readable medium (CRM) or memory 1460, a processing unit 1464 (such as one or more processors, microprocessors, and/or microcontrollers), a sound localization system 1466, an audio convolver 1468, and a performance enhancer 1470.

The electronic device 1404 communicates with the PED 1402 and with storage or memory 1480 that stores sound localization information (SLI) 1480, such as transfer functions and/or impulse responses (e.g., HRTFs, HRIRs, BRIRs, etc. for multiple users) and other information discussed herein. Alternatively or additionally, the transfer functions and/or impulse responses and other SLI can be stored in memory 1420.

Figure 15:
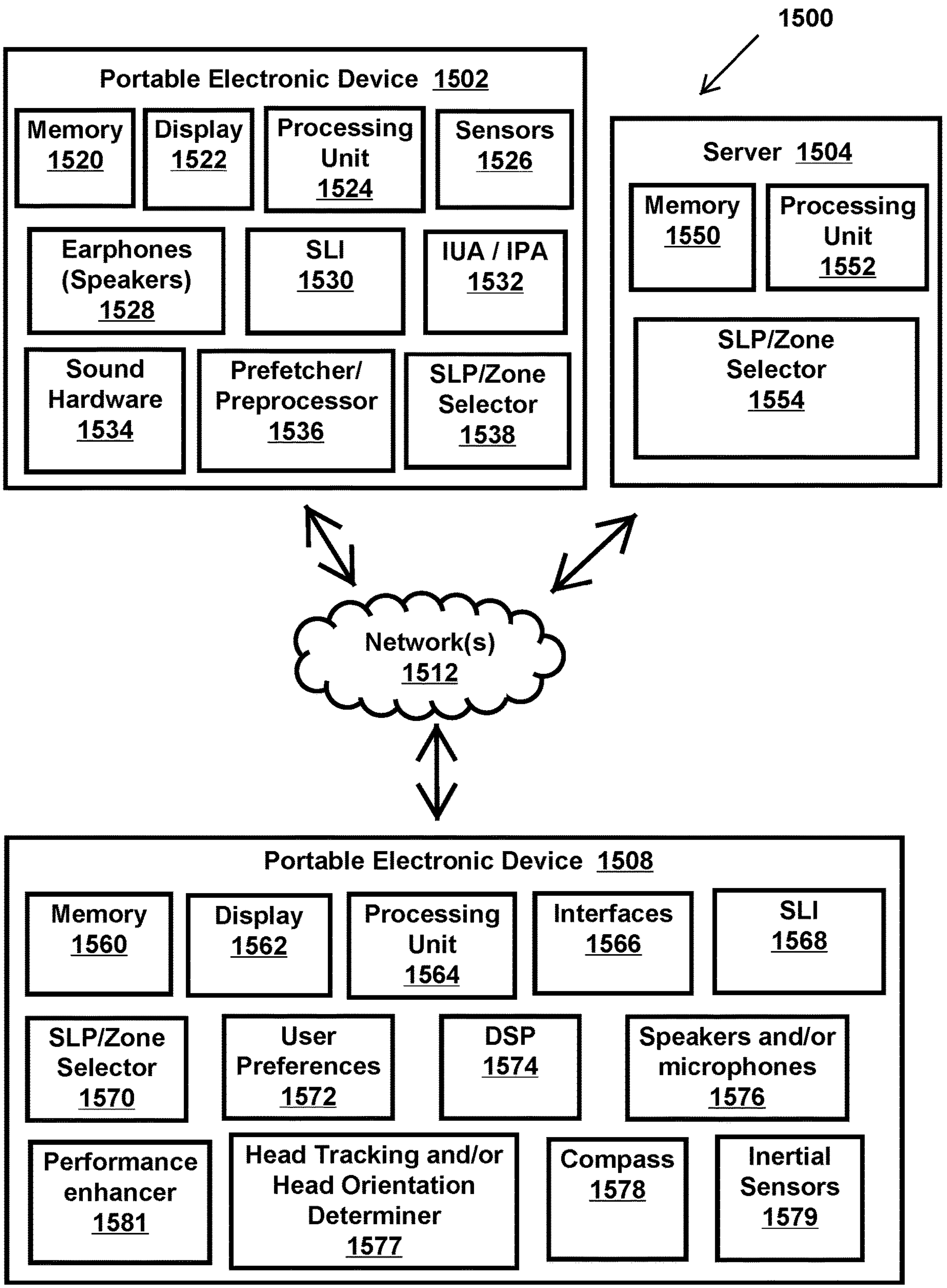
FIG. 15 is a computer system or electronic system in accordance with an example embodiment.

FIG. 15 is a computer system or electronic system in accordance with an example embodiment. The computer system 1500 includes an electronic device 1502, a server 1504, and a portable electronic device 1508 (including wearable electronic devices) in communication with each other over one or more networks Portable electronic device 1502 includes one or more components of computer readable medium (CRM) or memory 1520, one or more displays 1522, a processor or processing unit 1524 (such as one or more microprocessors and/or microcontrollers), one or more sensors 1526 (such as micro-electro-mechanical systems sensor, an activity tracker, a pedometer, a piezoelectric sensor, a biometric sensor, an optical sensor, a radio-frequency identification sensor, a global positioning satellite (GPS) sensor, a solid state compass, gyroscope, magnetometer, and/or an accelerometer), earphones with speakers 1528, a sound localization information (SLI) 1530, an intelligent user agent (IUA) and/or intelligent personal assistant (IPA) 1532, sound hardware 1534, a prefetcher and/or preprocessor 1536, and a SLP and/or zone selector 1538.

Server 1504 includes computer readable medium (CRM) or memory 1550, a processor or processing unit 1552, and a SLP and/or zone selector 1554.

Portable electronic device 1508 includes computer readable medium (CRM) or memory 1560, one or more displays 1562, a processor or processing unit 1564, one or more interfaces 1566 (such as interfaces discussed herein), sound localization information 1568 (e.g., stored in memory), a sound localization point (SLP) selector and/or zone selector 1570, user preferences 1572, one or more digital signal processors (DSP) 1574, one or more of speakers and/or microphones 1576, a performance enhancer 1581, head tracking and/or head orientation determiner 1577, a compass 1578, and inertial sensors 1579 (such as an accelerometer, a gyroscope, and/or a magnetometer).

A sound localization point (SLP) selector and/or zone selector includes specialized hardware and/or software to execute example embodiments that select a SLP and/or zone for where binaural sound localizes to a user.

A performance enhancer, prefetcher, and preprocessor are examples of specialized hardware and/or software that assist in improving performance of a computer and/or execution of a method discussed herein and/or one or more blocks discussed herein. Example functions of a performance enhancer are discussed in connection with FIGS. 8 and 9.

A sound localization system (SLS) includes one or more of a processor, microprocessor, controller, memory, specialized hardware, and specialized software to execute one or more example embodiments (including one or more methods discussed herein and/or blocks discussed in a method). By way of example, the hardware includes a customized integrated circuit (IC) or customized system-on-chip (SoC) to select, assign, and/or designate a SLP and/or zone for sound or convolve sound with SLI to generate binaural sound. For instance, an application-specific integrated circuit (ASIC) or a structured ASIC are examples of a customized IC that is designed for a particular use, as opposed to a general-purpose use. Such specialized hardware also includes field-programmable gate arrays (FPGAs) designed to execute a method discussed herein and/or one or more blocks discussed herein. For example, FPGAs are programmed to execute selecting, assigning, and/or designating SLPs and/or zones for sound or convolving, processing, or preprocessing sound so the sound externally localizes to the listener.

The sound localization system performs various tasks with regard to managing, generating, interpolating, extrapolating, retrieving, storing, and selecting SLPs and can function in coordination with and/or be part of the processing unit and/or DSPs or can incorporate DSPs. These tasks include generating audio impulses, generating audio impulse responses or transfer functions for a person, dividing an area around a head of a person into zones or areas, determining what SLPs are in a zone or area, mapping SLP locations and information for subsequent retrieval and display, selecting SLPs and/or zones for a user, selecting sets of SLPs according to circumstantial criteria, selecting objects to which sound will localize to a user, designating a sound type, audio segment, or sound source to a SLP, generating user interfaces with binaural sound information, detecting binaural sound, detecting human speech, isolating voice signals from sound such as the speech of a person who captures binaural sound by wearing microphones at the left and right ear, and executing one or more other blocks discussed herein. The sound localization system can also include a sound convolving application that convolves and deconvolves sound according to one or more audio impulse responses and/or transfer functions based on or in communication with head tracking.

By way of example, an intelligent personal assistant or intelligent user agent is a software agent that performs tasks or services for a person, such as organizing and maintaining information (such as emails, messaging (e.g., instant messaging, mobile messaging, voice messaging, store and forward messaging), calendar events, files, to-do items, etc.), initiating telephony requests (e.g., scheduling, initiating, and/or triggering phone calls, video calls, and telepresence requests between the user, IPA, other users, and other IPAs), responding to queries, responding to search requests, information retrieval, performing specific one-time tasks (such as responding to a voice instruction), file request and retrieval (such as retrieving and triggering a sound to play), timely or passive data collection or information gathering from persons or users (such as querying a user for information), data and voice storage, management and recall (such as taking dictation, storing memos, managing lists), memory aid, reminding of users, performing ongoing tasks (such as schedule management and personal health management), and providing recommendations. By way of example, these tasks or services can be based on one or more of user input, prediction, activity awareness, location awareness, an ability to access information (including user profile information and online information), user profile information, and other data or information.

By way of example, the sound hardware includes a sound card and/or a sound chip. A sound card includes one or more of a digital-to-analog (DAC) converter, an analog-to-digital (ATD) converter, a line-in connector for an input signal from a sound source, a line-out connector, a hardware audio accelerator providing hardware polyphony, and one or more digital-signal-processors (DSPs). A sound chip is an integrated circuit (also known as a "chip") that produces sound through digital, analog, or mixed-mode electronics and includes electronic devices such as one or more of an oscillator, envelope controller, sampler, filter, and amplifier.

The sound hardware can be or include customized or specialized hardware that processes and convolves mono and stereo sound into binaural sound.

By way of example, a computer and an portable electronic device include, but are not limited to, handheld portable electronic devices (HPEDs), wearable electronic glasses, watches, wearable electronic devices (WEDs) or wearables, smart earphones or hearables, voice control devices (VCD), voice personal assistants (VPAs), network attached storage (NAS), printers and peripheral devices, virtual devices or emulated devices (e.g., device simulators, soft devices), cloud resident devices, computing devices, electronic devices with cellular or mobile phone capabilities, digital cameras, desktop computers, servers, portable computers (such as tablet and notebook computers), smartphones, electronic and computer game consoles, home entertainment systems, digital audio players (DAPs) and handheld audio playing devices (example, handheld devices for downloading and playing music and videos), appliances (including home appliances), head mounted displays (HMDs), optical head mounted displays (OHMDs), personal digital assistants (PDAs), electronics and electronic systems in automobiles (including automobile control systems), combinations of these devices, devices with a processor or processing unit and a memory, and other portable and non-portable electronic devices and systems (such as electronic devices with a DSP).

The SLP/zone selector and/or SLS can also execute predictions including, but not limited to, predicting an action of a user, predicting a location of a user, predicting an event, predicting a desire or want of a user, predicting a query of a user (such as a query to an intelligent personal assistant), predicting and/or recommending a SLP, zone, or RIR/RTF or an object to a user, etc. Such predictions can also include predicting user actions or requests in the future (such as a likelihood that the user or electronic device localizes a type of sound to a particular SLP or zone). For instance, determinations by a software application, an electronic device, and/or user agent can be modeled as a prediction that the user will take an action and/or desire or benefit from moving or muting an SLP, changing a zone, from delaying the playing of a sound, from a switch between binaural, mono, and stereo sounds or a change to binaural sound (such as pausing binaural sound, muting binaural sound, selecting an object at which to localize sound, reducing or eliminating one or more cues or spatializations or localizations of binaural sound). For example, an analysis of historical events, personal information, geographic location, and/or the user profile provides a probability and/or likelihood that the user will take an action (such as whether the user prefers a particular SLP or zone as the location for where sound will localize, prefers binaural sound or stereo, or mono sound for a particular location, prefers a particular listening experience, or a particular communication with another person or an intelligent personal assistant). By way of example, one or more predictive models execute to predict the probability that a user would take, determine, or desire the action. The predictor also predicts future events unrelated to the actions of the user, such as the prediction of the times, locations, SLP positions, type or quality of sound, sound source, or identities of incoming callers or requests for sound localizations to the user.

Example embodiments are not limited to HRTFs but also include other sound transfer functions and sound impulse responses including, but not limited to, head related impulse responses (HRIRs), room transfer functions (RTFs), room impulse responses (RIRs), binaural room impulse responses (BRIRs), binaural room transfer functions (BRTFs), headphone transfer functions (HPTFs), etc.

Examples herein can take place in physical spaces, in computer rendered spaces (such as computer games or VR), in partially computer rendered spaces (AR), and in combinations thereof.

The processor unit includes a processor (such as a central processing unit, CPU, microprocessor, microcontrollers, field programmable gate arrays (FPGA), application-specific integrated circuits (ASIC), etc.) for controlling the overall operation of memory (such as random access memory (RAM) for temporary data storage, read only memory (ROM) for permanent data storage, and firmware). The processing unit and DSP communicate with each other and memory and perform operations and tasks that implement one or more blocks of the flow diagrams discussed herein. The memory, for example, stores applications, data, programs, algorithms (including software to implement or assist in implementing example embodiments) and other data.

Consider an example embodiment in which the SLS or portions of the SLS include an integrated circuit FPGA that is specifically customized, designed, configured, or wired to execute one or more blocks discussed herein. For example, the FPGA includes one or more programmable logic blocks that are wired together or configured to execute combinational functions for the SLS, such as assigning types of sound to SLPs and/or zones, assigning software applications to SLPs and/or zones, selecting a SLP and/or zone for sound to externally localize as binaural sound to the user, etc.

Consider an example in which the SLS or portions of the SLS include an integrated circuit or ASIC that is specifically customized, designed, or configured to execute one or more blocks discussed herein. For example, the ASIC has customized gate arrangements for the SLS. The ASIC can also include microprocessors and memory blocks (such as being a SoC (system-on-chip) designed with special functionality to execute functions of the SLS).

Consider an example in which the SLS or portions of the SLS include one or more integrated circuits that are specifically customized, designed, or configured to execute one or more blocks discussed herein. For example, the electronic devices include a specialized or custom processor or microprocessor or semiconductor intellectual property (SIP) core or digital signal processor (DSP) with a hardware architecture optimized for convolving sound and executing one or more example embodiments.

Consider an example in which the HPED includes a customized or dedicated DSP that executes one or more blocks discussed herein (including processing and/or convolving sound into binaural sound). Such a DSP has a better power performance or power efficiency compared to a general-purpose microprocessor and is more suitable for a HPED, such as a smartphone, due to power consumption constraints of the HPED. The DSP can also include a specialized hardware architecture, such as a special or specialized memory architecture to simultaneously fetch or pre-fetch multiple data and/or instructions concurrently to increase execution speed and sound processing efficiency. By way of example, streaming sound data (such as sound data in a telephone call or software game application) is processed and convolved with a specialized memory architecture (such as the Harvard architecture or the Modified von Neumann architecture). The DSP can also provide a lower-cost solution compared to a general-purpose microprocessor that executes digital signal processing and convolving algorithms. The DSP can also provide functions as an application processor or microcontroller.

Consider an example in which a customized DSP includes one or more special instruction sets for multiply-accumulate operations (MAC operations), such as convolving with transfer functions and/or impulse responses (such as HRTFs, HRIRs, BRIRs, et al.), executing Fast Fourier Transforms (FFTs), executing finite impulse response (FIR) filtering, and executing instructions to increase parallelism.

Consider an example in which the DSP includes the SLP selector and/or an audio diarization system. For example, the SLP selector, audio diarization system, and/or the DSP are integrated onto a single integrated circuit die or integrated onto multiple dies in a single chip package to expedite binaural sound processing.

Consider an example in which the DSP additionally includes a voice recognition system and/or acoustic fingerprint system. For example, an audio diarization system, acoustic fingerprint system, and a MFCC/GMM analyzer and/or the DSP are integrated onto a single integrated circuit die or integrated onto multiple dies in a single chip package to expedite binaural sound processing.

Consider another example in which HRTFs (or other transfer functions or impulse responses) are stored or cached in the DSP memory or local memory relatively close to the DSP to expedite binaural sound processing.

Consider an example in which a smartphone or other PED includes one or more dedicated sound DSPs (or dedicated DSPs for sound processing, image processing, and/or video processing). The DSPs execute instructions to convolve sound and display locations of zones/SLPs for the sound on a user interface of the HPED. Further, the DSPs simultaneously convolve multiple SLPs to a user.

These SLPs can be moving with respect to the face of the user so the DSPs convolve multiple different sound signals and sources with HRTFs that are continually, continuously, or rapidly changing.

As discussed, SLI includes multiple types of information to provide the computer system or electronic system data that localizes sound to a user. Managing the multiple information required to localize sound and managing the resources to obtain the information pose a challenge to providing users and software applications with a convenient way to localize sound. In some cases, a minimal amount of SLI is required to localize sound (e.g., an ITD and a sound). In other cases, more SLI is required to localize sound, such as multiple types of information (e.g., user specific HRTFs, a SLP trajectory, BRIRs, zones, remote sound data that streams). How can a user or software application determine which resources are needed for an intended localization? How and where can the resources be accessed and/or stored? How can the resources be shared in a cohesive way?

An example embodiment addresses these problems and provides solutions that improve functionality for listeners and software applications that process localizations.

Figure 16:
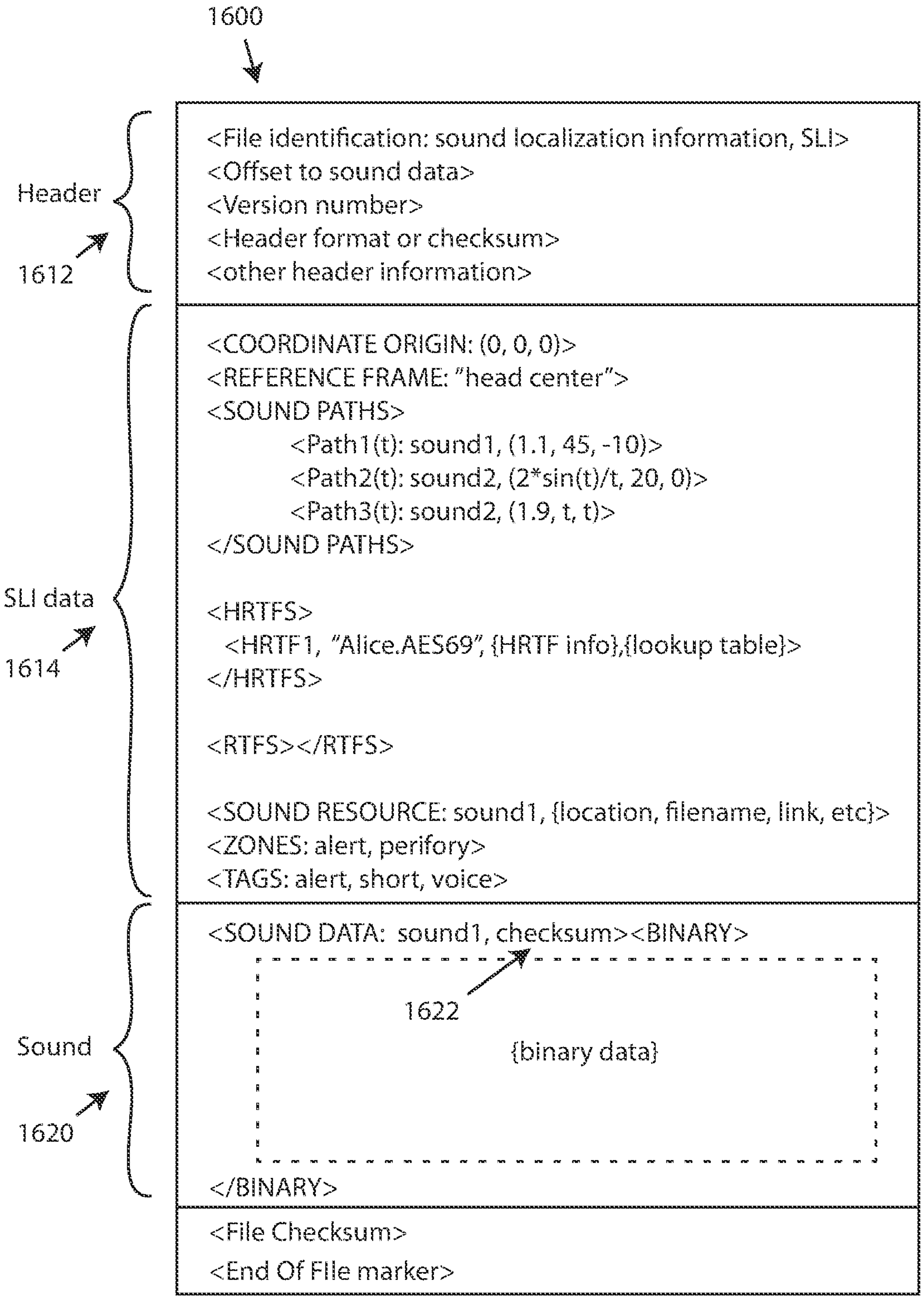
FIG. 16 is an example of sound localization information in the form of a file in accordance with an example embodiment.

FIG. 16 is an example of sound localization information in the form of a file in accordance with an example embodiment.

The SLI can be packaged as a standard file format. For example, the file format is a sound localization information file that stands apart from sound data, or the file format is an audio file format that includes the sound that is localized.

FIG. 16 shows an example sound localization file 1600 that includes a header 1612, SLI data 1614, and a sound for localization 1620. The example SLI file 1600 is a single file that includes multiple SLI resources and/or references or pointers to the resources. The file header 1612 includes an identification of the type of file that it is (an SLI file), a header format definition and/or checksum, a version number of the file type, an offset to the binary sound that is included in the file, and other data indicated by the header format.

The file identification provides an identity of the file type as the SLI file type. The file identification is located at the top or beginning of the file so that the file identification is encountered first or early in a sequential reading of the file. The header format or definition provides information about the header 1612, such as providing a header length, information to delimit the header, the information format of the header, and/or other information to orient the user or software application accessing the SLI file 1600 in the navigation of and information included in the header 1612. The version number indicates the version of the file format to assist the user or software application in knowing the composition and layout of the SLI file 1600. The offset to the binary sound data included in the sound data 1620 allows a software application to skip to the reading of the binary sound data. For example, the software application is a media player, other software application, or electronic device that is not able to process localization, but is able to play the sound data without localization. The media player reads forward in the SLI file 1600 by the value of the offset and then reads and plays the binary sound data found there. As another example, the software application is a media player that processes the SLI file 1600 to localize to the user and the player reads both the SLI data 1614 and the binary sound data simultaneously to expedite the localization. Other information is included in the header 1612 to orient the user or software application accessing the SLI file in the navigation of and information included in the SLI file 1600.

The SLI data 1614 includes designation of the location in space where the sound is to be localized. For example, the location is a static SLP, such as is shown expressed in the "<sound paths>" tag as (1.1, 45, −10) indicating that the localization of sound 1620 should occur at (1.1 m, 45°, −10°) for the duration of the localization. As another example, the SLP of the sound 1620 moves and the location expresses a time-based trajectory or function of time (t) (e.g., shown as "(1.9, t, t)"). The SLI data 1614 specifies multiple sound paths for the sound including a default sound path, a reference origin for the sound path coordinates, and one or more frames of reference of the sound paths.

The SLI data 1614 includes one or more HRTFs such as the HRTF of a user shown within the "<HRTFS>" tag. An HRTF1 labels an HRTF of a user Alice including a lookup table with the HRTF pairs, other HRTF1 info, and a pointer to an alternative resource for the HRTF1 data (a filename, "Alice.AES69"). A software application processing the SLI file 1600 and/or SLI data 1614 has the option to load and/or parse the HRTF1 data from the lookup table or fetch the HRTF1 data from the alternative resource. For example, the lookup table is corrupted so the software application executing the SLI file 1600 retrieves the HRTF1 data from Alice- .AES69 instead of from the lookup table. As another example, the software application reading the SLI file 1600 identifies from the alternative resource name that HRTF1 is already loaded or cached, so the software application reading the SLI file 1600 skips the reading of the lookup table. The SLI info also includes one or more other transfer functions, such as room transfer functions or binaural room transfer functions. The transfer functions are stored as text to improve functionality for a user and/or stored in an encoded or other machine-readable format for expedited reading by the software application accessing the SLI file 1600 to provide improved performance.

The SLI info 1614 includes a pointer to an alternative resource for the sound 1620, such as a URL or filename for a sound file in a different storage location.

A software application processing the SLI file 1600 and/or SLI data 1614 has the option to load the sound from the sound data 1620 and/or fetch the sound from the alternative resource. For example, the binary sound data of the sound 1620 is corrupted, and the computed checksum does not match the checksum 1622, so the software application retrieves the sound from the alternative resource. As another example, the software application reading the SLI file 1600 identifies from the alternative resource name or the sound data 1620 that the sound is already stored locally, loaded, or cached, so software application skips the reading of the binary sound data. As another example, the alternative resource is a sound stream of undetermined length, and the sound 1620 is the first or beginning part of the sound stream. The software application processing the SLI file 1600 immediately loads the binary sound data for playing, while caching the sound stream. This improves performance by expediting the localization. The sound is stored as a character block to improve functionality for a user and/or in binary format for expedited reading by software application to provide improved performance.

Consider an example of a SLI file format identified with a file extension of ".SLI" and/or a unique file identification code in the first field or bytes of a header of the file. Such an SLI file is assembled with a hybrid or combination of a text-based markup language (e.g., extensible markup language (XML) or YAML (YAML Ain't Markup Language)) to support object definitions and/or objects, together with a format that supports binary data and component or object nesting (e.g. Resource Interchange File Format (RIFF)). This example format provides including as human readable some localization information and storing other SLI as binary data sets. Both formats are stored together in order to provide a number of improvements.

A media player application recognizing the SLI file format parses the SLI from the SLI file 1600 and applies the localization information 1614 to the sound 1620 at or before the time of playing of the sound 1620. A sound-playing application that does not recognize the SLI data 1614 ignores the SLI data 1614 and plays the sound 1620 without localization.

The option to load as chunks both sound data 1620 and other SLI data 1614 (e.g., encoded lookup tables such as HRTFs) from a single resource improves the performance of a player application. A savings in load time of the bulk data in binary form also improves the performance. Further, the human readable form of the SLI data 1614 allows other applications and users, including humans, to read and/or alter the SLI data 1614 and/or the sound 1620. This improves the functionality of sound localization for the user, other users, and applications. For example, an SLI component such as HRTFs are stored as textual data to improve the functionality for users, and/or stored as encoded data to improve the access performance for software applications. Additionally, by encapsulating the sound 1620 with the SLI data 1614 in a single file, software applications processing the SLI file that would otherwise be required to manage multiple resources separately (such as sound data, localization designations, and HRTF pairs) are relieved of the processing of the management of the resources, improving overall performance. For example, a media player commanded to play a sound localization stored remotely opens one connection to the remote storage to retrieve the SLI file 1600 rather than requiring multiple sessions to retrieve multiple localization resource files. After the playing, a single SLI playing task, and a single file (SLI file 1600) are disposed, so that a single disposal task triggers the closure and/or clean-up of multiple resource allocations.

Figure 17:
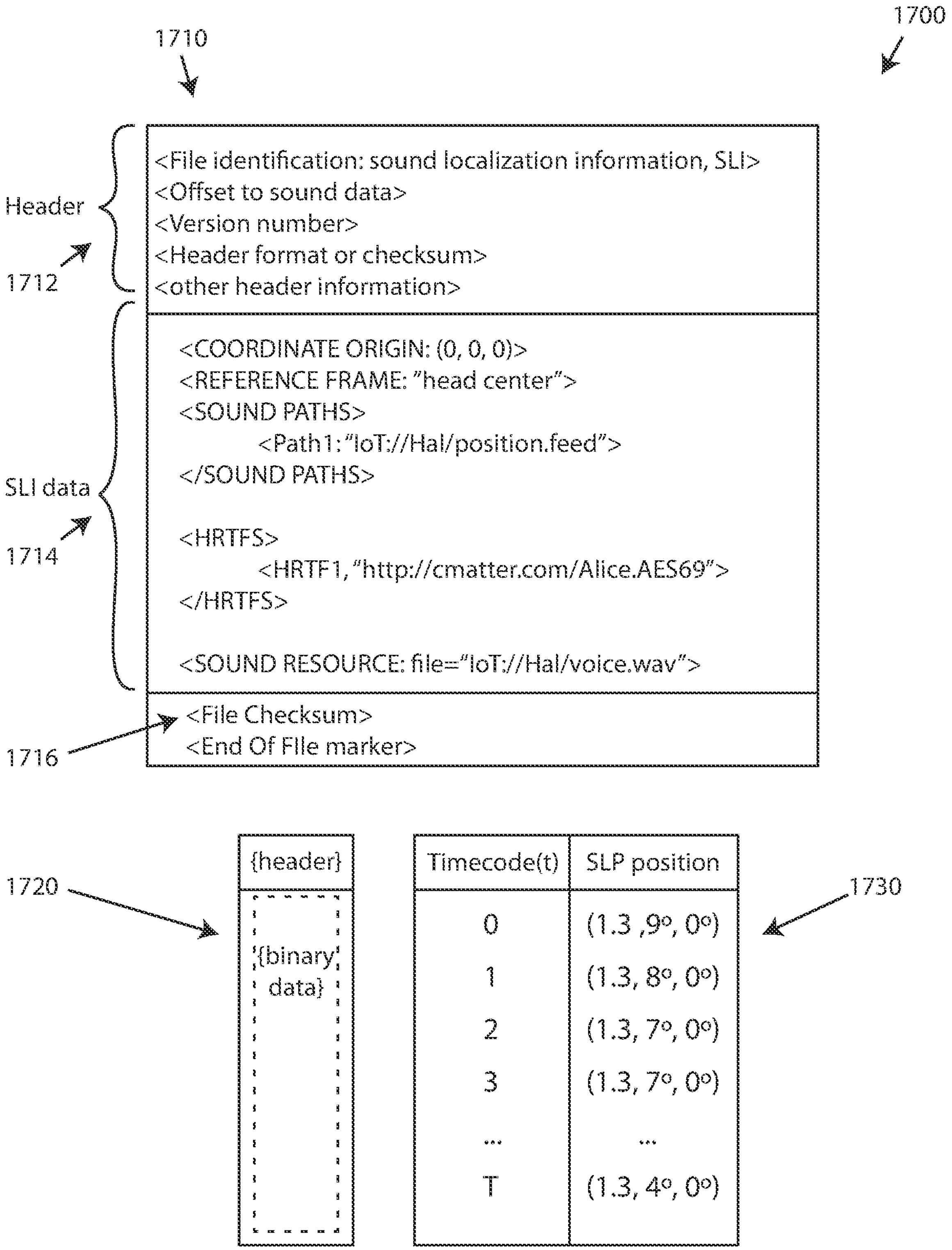
FIG. 17 is an example of a sound localization information configuration in accordance with an example embodiment.

FIG. 17 is an example of a sound localization information configuration in accordance with an example embodiment.

FIG. 17 shows a sound localization information configuration 1700 that includes a sound localization information file 1710 that does not include a sound to localize. The sound file 1720 that localizes to the user and a positional information feed 1730 are stored in separate files or retrieved from separate locations. The SLI file 1710 includes a header 1712, SLI data 1714, and a SLI file checksum 1716. The header 1712 includes information about the SLI file 1710 as discussed regarding header 1612. The SLI data 1714 includes a resource link to transfer functions as discussed regarding SLI data 1614. The SLI data 1714 does not include a designation of the location in space where the sound is to be localized, and instead includes a pointer to an alternative resource for positional designation (shown as "loT://Hal/position.feed"). The alternative resource provides a positional information feed 1730 that includes localization designation, such as SLP or HRTF coordinates and a timecode corresponding to the time at which the sound should be localized to a corresponding location. The SLI data 1714 includes a link to a sound resource (shown as "loT://Hal/voice.wav"), the sound resource or sound file shown as 1720. Although the SLI file 1710 does not include sound data, positional data, or means to localize sound (e.g., HRTFs), a software application reading the SLI file 1710 finds in the SLI file 1710 complete information for executing a specific localization of a specific sound to a specific user.

Consider an example in which a software application executes on the HPED or phone of Alice and provides the voice output of an IPA named Hal. The software application uses SLI file 1710 to direct the localization of the voice of Hal. Alice preconfigures the SLI file 1710 with a pointer to her HRTFs (shown as "http://cmatter.com/Alice.AES69"). The software application includes instructions that execute to open the SLI file 1710, to read-in the file contents, to calculate a checksum, and to confirm that the calculated checksum matches the SLI file checksum 1716. The software application further executes to parse the tags in the file to identify paths to the sound file 1720, the HRTF file, and the positional information feed 1730, and to open connections to the sound file 1720 and the positional feed 1730. The software application examines the pointer or file path to the HRTFs and recognizes that the HRTFs are already cached so the application is not required to retrieve the HRTF file again. These actions improve computer performance since the cached data saves time in retrieving the HRTF file and loading the file to memory.

The software application also discovers from the header received from the sound file 1720 that the sound resource is a sound stream. The software application proceeds to execute the localization of the voice of Hal to Alice at the coordinates specified by Hal from moment to moment. The software application receives the voice of Hal from the sound resource 1720 at t=0, and receives or retrieves from the positional feed 1730 the coordinates for the present moment t=0 (1.3 m, 9°, 0°). The software application parses the SLI data 1714 and retrieves the reference frame (shown as "head center") and origin (0, 0°, 0°) specified for the localization. The software application requests the OS of the HPED to convolve the sound source of the voice of Hal to the SLP at (1.3 m, 9°, 0°) relative to a point (0, 0°, 0°) at the center of the head of Alice, using the corresponding HRTFs from the file Alice.AES69. The OS forwards these particular SLI in a request to the SLS for localization. The SLS recognizes the sound source (the voice of Hal) as one that is allowed, recognizes the HRTF file as allowed, and requests the SLP coordinates from the SLP selector. The SLP selector confirms that (1.3 m, 9°, 0°) is an available SLP and confirms that the zones that include at (1.3 m, 9°, 0°) do not prohibit the sound source (Hal) and do not prohibit the sound type of voice. The SLP selector approves the localization request, and this approval triggers the SLS to allow convolution. The SLS directs the convolver to convolve the voice of Hal to (1.3 m, 9°, 0°) with Alice's HRTFs. The voice of the IPA Hal originates to Alice at (1.3 m, 9°, 0°).

The SLI file provides additional functionality to the user. For example, to experience the localization again, the user issues a single command to trigger the execution of the localization. The "self-contained" nature of the SLI file that includes both SLI and sound (or links to their resources) improves the functionality for transmission and sharing of the sound localization to other locations and/or users or software applications. For example if another user shares compatibility (can experience localization) with the same HRTFs of the first user, then the first user can easily share the localization experience with the other user by sending a single file to the other user. As another significant functionality improvement, human readability of the format aids alteration of the file. For example the user edits the human readable portion of the SLI file, finds the HRTF component, and pastes or replaces the HRTF data with that of a third user. The user can send the altered file with the new HRTF data to the third user and know that the third user will experience the same localization that the user experienced. This robust functionality also permits assigning a localization of one sound to another sound, by replacing the sound component of the file, or replacing or inserting the SLI component(s) into the SLI section of another SLI sound file.

Some SLI or SLI files include no SLPs/zones or location designations or links to their alternative provision. For example, a media player that executes localization according to an SLI file parses the SLI file and cannot retrieve an SLP or sound path or an alternative resource of location designation information. The media player takes another action as designated in the SLI file header, such as playing the sound without executing localization, not playing the sound, playing the sound with a default localization, a recent or cached localization, or a localization that indicates a failure to find the SLP.

Some SLI or SLI files include no transfer functions or impulse responses or other information for adjusting audial cues, and no pointers to alternative resource locations for them. For example, a media player that executes localization specified by an SLI file parses the SLI file and does not locate an HRTF. The media player takes another action as designated in the SLI file header, such as playing the sound without executing localization, not playing the sound, executing the localization by adjusting other audial cues (e.g., ITD/ILD), or playing an alert sound.

For example a media player that executes localization for an SLI file parses the SLI file and does not identify sound data or a link to a sound. The media player examines the header file to determine a next action, such as playing an alert, halting the execution of the SLI file, playing a default sound or retrieving and playing the sound from a default file link.

In some example embodiments, the methods illustrated herein and data and instructions associated therewith, are stored in respective storage devices that are implemented as computer-readable and/or machine-readable storage media, physical or tangible media, and/or non-transitory storage media. These storage media include different forms of memory including semiconductor memory devices such as NAND flash non-volatile memory, DRAM, or SRAM, Erasable and Programmable Read-Only Memories (EPROMs), Electrically Erasable and Programmable Read-Only Memories (EEPROMs), solid state drives (SSD), and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to a manufactured single component or multiple components.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

The methods in accordance with example embodiments are provided as examples, and examples from one method should not be construed to limit examples from another method. Tables and other information show example data and example structures; other data and other database structures can be implemented with example embodiments. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

As used herein, the word "about" indicates that a number, amount, time, etc. is close or near something. By way of example, for spherical or polar coordinates of a SLP and/or zone (r, θ, φ), the word "about" means plus or minus (±) three degrees for θ and φ and plus or minus 5% for distance (r).

As used herein, "distinct" means different in a way that you can see or hear. For example, SLP 1 is distinct from SLP 2 when a listener can audibly determine that the location of sound originates from two different locations that are externally located away from the listener.

As used herein, a "telephone call," or a "phone call" is a connection over a wired and/or wireless network between a calling person or user and a called person or user. Telephone calls can use landlines, mobile phones, satellite phones, HPEDs, voice personal assistants (VPAs), computers, and other portable and non-portable electronic devices. Further, telephone calls can be placed through one or more of a public switched telephone network, the internet, and various types of networks (such as Wide Area Networks or WANs, Local Area Networks or LANs, Personal Area Networks or PANs, Campus Area Networks or CANs, etc.). Telephone calls include other types of telephony including Voice over Internet Protocol (VoIP) calls, internet telephone calls, in-game calls, telepresence, etc.

As used herein, "empty space" is a location that is not occupied by a tangible object.

As used herein, "field-of-view" is the observable world that is seen at a given moment. Field-of-view includes what a user sees in a virtual or augmented world (e.g., what the user sees while wearing a HMD).

As used herein, "proximate" means near. For example, a sound that localizes proximate to a listener occurs within two meters of the person.

As used herein, "separate" means not joined or physically touching. For example, Zone A and Zone B have separate azimuth coordinates if Zone A has azimuth coordinates of $0° \leq \theta \leq 30°$ and Zone B has azimuth coordinates of $90° \leq \theta \leq 180°$.

As used herein, "similar" means having characteristics in common but not being the same or identical.

As used herein, "sound localization information" is information that is used to process or convolve sound so the sound externally localizes as binaural sound to a listener.

As used herein, a "sound localization point" or "SLP" is a location where a listener localizes sound. A SLP can be internal (such as monaural sound that localizes inside a head of a listener), or a SLP can be external (such as binaural sound that externally localizes to a point or an area that is away from but proximate to the person or away from but not near the person). A SLP can be a single point such as one defined by a single pair of HRTFs or a SLP can be a zone or shape or volume or general area. Further, in some instances, multiple impulse responses or transfer functions can be processed to convolve sounds to a place within the boundary of the SLP. In some instances, a SLP may not have access to a particular HRTF necessary to localize sound at the SLP for a particular user, or a particular HRTF may not have been created. A SLP may not require a HRTF in order to localize sound for a user, such as an internalized SLP, or a SLP may be rendered by adjusting an ITD and/or ILD or other human audial cues.

As used herein, "three-dimensional space" or "3D space" is space in which three values or parameters are used to determine a position of an object or point. For example, binaural sound can localize to locations in 3D space around a head of a listener. 3D space can also exist in virtual reality (e.g., a user wearing a HMD can see a virtual 3D space).

As used herein, a "user" or a "listener" is a person (i.e., a human being). These terms can also be a software program (including an IPA or IUA), hardware (such as a processor or processing unit), an electronic device or a computer (such as a speaking robot or avatar shaped like a human with microphones in its ears).

As used herein, a "user agent" is software that acts on behalf of a user. User agents include, but are not limited to, one or more of intelligent user agents and/or intelligent electronic personal assistants (IPAs, VPAs, software agents, and/or assistants that use learning, reasoning and/or artificial intelligence), multi-agent systems (plural agents that communicate with each other), mobile agents (agents that move execution to different processors), autonomous agents (agents that modify processes to achieve an objective), and distributed agents (agents that execute on physically distinct electronic devices).

As used herein, a "zone" is a portion of a 1D, 2D or 3D region that exists in 3D space with respect to a user. For example, 3D space proximate to a listener or around a listener can be divided into one or more 1D, 2D, 3D and/or point or single coordinate zones. As another example, 3D space in virtual reality can be divided into one or more 1D, 2D, 3D and/or point zones.

What is claimed is:

1. A method comprising:

dividing a space around a user wearing a head mounted display (HMD) into three-dimensional (3D) zones that include zones of physical objects where the user is located and zones of empty space where the user is located;

determining different room impulse responses (RIRs) for the 3D zones;

displaying, with a display of the HMD worn on a head of the user, a virtual image on one of the physical objects where the user is located; and processing, by a processor in the HMD worn on the head of the user, sound with the RIRs such that the sound originates as binaural sound with a sound localization point (SLP) at the virtual image located on the one of the physical objects where the user is located.

2. The method of claim 1 further comprising:

displaying, with the display of the HMD, virtual images of the 3D zones that include boundaries of the 3D zones.

3. The method of claim 1 further comprising:

displaying, with the display of the HMD, the virtual image as a virtual monitor on the one of the physical objects where the user is located; and processing, by the processor in the HMD, the sound such that the binaural sound continues to externally localize to the SLP of the virtual monitor while the head of the user moves.

4. The method of claim 1 further comprising:

halting the processing of the sound with the RIRs in response to the user moving outside of the 3D zones.

5. The method of claim 1 further comprising:

improving performance of the processing of the sound by the HMD by storing the RIRs and coordinates of the 3D zones in a lookup table.

6. The method of claim 1 further comprising:

improving performance of the processing of the sound by the HMD by prefetching the RIRs assigned to the 3D zones.

7. The method of claim 1 further comprising:

assigning different ones of the 3D zones to different software applications that play the binaural sound to the user.

8. The method of claim 1 further comprising:

designating sounds from appliances to externally localize to the user as the binaural sound to one of the zones.

9. A method comprising:

scanning, with a wearable electronic device (WED) worn on a head of a user, physical objects in an area around the user to generate zones that include zones with physical objects located around the user and zones of empty space located around the user;

assigning different room impulse responses (RIRs) to the zones;

displaying, with the WED worn on the head of the user, a virtual image on top of one of the physical objects; and processing, by a processor, sound with the RIRs such that the sound originates as binaural sound with a sound localization point (SLP) at the virtual image on top of the one of the physical objects.

10. The method of claim 9 further comprising:

displaying, with the WED worn on the head of the user, boundaries of the zones around the user with augmented reality (AR).

11. The method of claim 9 further comprising:

designating sounds from appliances to externally localize to the user as the binaural sound to a first one of the zones; and designating a voice from a second user to externally localize to the user as the binaural sound to a second one of the zones.

12. The method of claim 9 further comprising:

designating one of the zones as a default location where the binaural sound originates for a Voice over Internet Protocol (VoIP) chat application.

13. The method of claim 9 further comprising:

designating music to externally localize to the user as the binaural sound to a first one of the zones; and designating speech from advertisements to externally localize to the user as the binaural sound to a second one of the zones.

14. The method of claim 9 further comprising:

displaying, with the WED worn on the head of the user, a visual warning that notifies the user of the physical objects in the area around the user.

15. The method of claim 9 further comprising:

displaying, with the WED worn on the head of the user, the virtual image as a virtual speaker on the top of the one of the physical objects; and processing, by the processor, the sound such that the binaural sound continues to externally localize to the SLP of the virtual speaker while the head of the user moves.

16. A wearable electronic device (WED) worn on a head of a user, the WED comprising:

a display that displays a virtual image on a physical object located in an area around the user;

speakers that play sound as binaural sound that originates from the virtual image on the physical object located in the area around the user; and one or more processors that scan the area around the user to locate the physical object, divide the area around the user into different zones, assign room impulse responses (RIRs) to the zones, and process the sound with the RIRs such that the sound played with the speakers originates from the virtual image on the physical object located in the area around the user.

17. The WED of claim 16, wherein the one or more processors designates one of the zones as a default location where the binaural sound originates for a Voice over Internet Protocol (VoIP) chat application.

18. The WED of claim 16 further comprising:

a memory that stores coordinate locations of the RIRs so the coordinate locations are known before the binaural sound processes locations in the zones.

19. The WED of claim 16, wherein the one or more processors designates a voice to originate from the virtual image located on the physical object located in a first one of the zones and designates music to originate in empty space located in a second one of the zones.

20. The WED of claim 16 further comprising:

one or more sensors that determine a location of the user, wherein the one or more processors halt processing of the sound with the RIRs in response to the one or more sensors determining the location of the user is outside the zones.

* * * * *